United States Patent
Yoshizawa et al.

(10) Patent No.: US 6,388,671 B1
(45) Date of Patent: *May 14, 2002

(54) INFORMATION PROCESSING APPARATUS AND METHOD FOR PROCESSING THREE-DIMENSIONAL GRAPHICS USING A SECOND INFORMATION PROCESSING UNIT FOR PROCESSING PROCESSED-RELATED INFORMATION

(75) Inventors: Hideki Yoshizawa; Tatsushi Otsuka; Shigeru Sasaki; Ritsuko Tatematsu, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,759

(22) Filed: Nov. 25, 1997

Related U.S. Application Data

(63) Continuation of application No. 08/527,640, filed on Sep. 13, 1995, now abandoned.

(30) Foreign Application Priority Data

Dec. 1, 1994 (JP) .............................................. 6-298552
Jul. 7, 1995 (JP) .............................................. 7-172593

(51) Int. Cl.[7] .............................................. G06F 15/80
(52) U.S. Cl. ...................... 345/505; 345/506; 345/419; 345/582
(58) Field of Search ................................ 345/502, 505, 345/506, 507–509, 511, 512, 419, 429, 432, 422, 426, 427, 530–531, 536–538, 541, 552, 545, 561, 562, 582

(56) References Cited

U.S. PATENT DOCUMENTS

| | | | | |
|---|---|---|---|---|
| 4,878,190 A | * | 10/1989 | Darley et al. | 708/605 |
| 5,148,161 A | * | 9/1992 | Sako et al. | 341/93 |
| 5,394,524 A | * | 2/1995 | DiNicola et al. | 395/506 |
| 5,790,881 A | * | 8/1998 | Nguyen | 712/34 |

FOREIGN PATENT DOCUMENTS

| | | |
|---|---|---|
| JP | 63-140381 | 6/1988 |
| JP | 5-307610 | 11/1993 |

OTHER PUBLICATIONS

Ueda et al, "A multiprocessor system utilizing enhanced DSP's for image processing", International Conference on Systolic Arrays, IEEE Computer Soc. Press, Conf. Date, May 25–27, 1988, pp. 611–620.

(List continued on next page.)

*Primary Examiner*—Kee M. Tung
(74) *Attorney, Agent, or Firm*—Staas & Halsey LLP

(57) ABSTRACT

An information processing apparatus includes a dedicated graphic hardware part dedicated to execution of a specific process function under a pipeline process scheme, and a microprogram execution part executing a process using a microprogram. When three-dimensional graphic information is processed, a process for determining endpoints is executed by the microprogram execution part, and an interpolation process started from an endpoint is executed by the dedicated graphic hardware part for each endpoint process. While the dedicated graphic hardware part is executing the interpolation process, the microprogram execution part is operated in parallel so as to execute the endpoint process for a next endpoint.

38 Claims, 56 Drawing Sheets

OTHER PUBLICATIONS

"Computer Graphics: Principles and Practice", $2^{nd}$ Edition, by Foley Et Al, 1987, pp. 866–871.*

Proceedings COMP. CON '84, "Chip–Oriented Data–Flow Image Processor: TIP–3", T. Temma Et Al. pp 245–254, Dec. 1984.*

Report to Institute of Information Processing, Graphics and CAD 35–7 (88–CG–35) pp. 1–8, "High Speed Image Generating Apparatus—MAGIC" by Akimoto et al.

"Parallel Graphics Processing" by Sagishima et al., published by Corona Publishing Company (1991).

Report to Institute of Electronics, Information and Communication Engineers Technical Study Group CPSY87–57, pp. 55–60, "Hidden Surface and Shading Processor" by Ohgi et al.

* cited by examiner

READ TIMING

WRITE TIMING

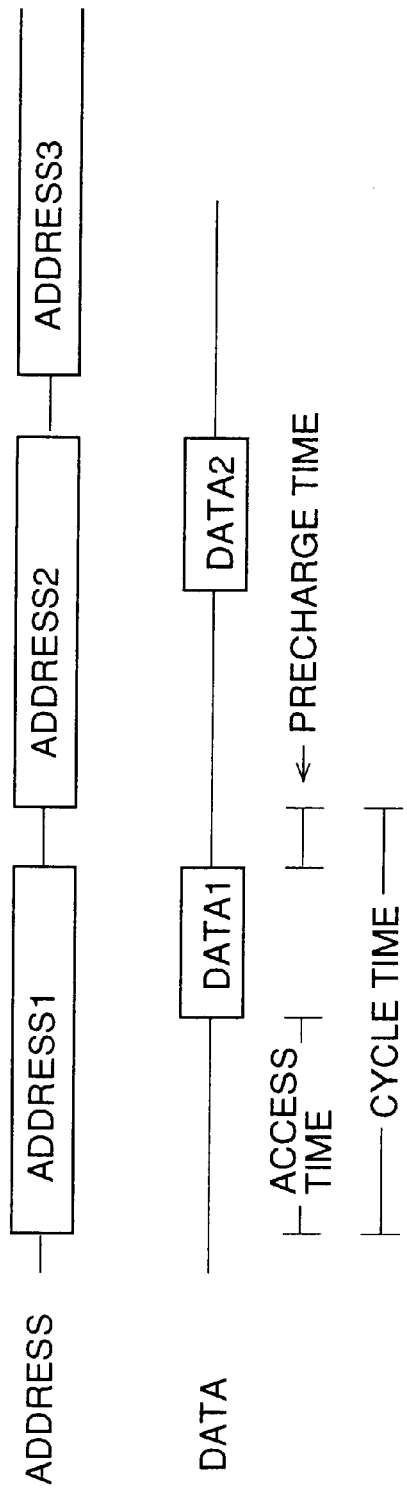
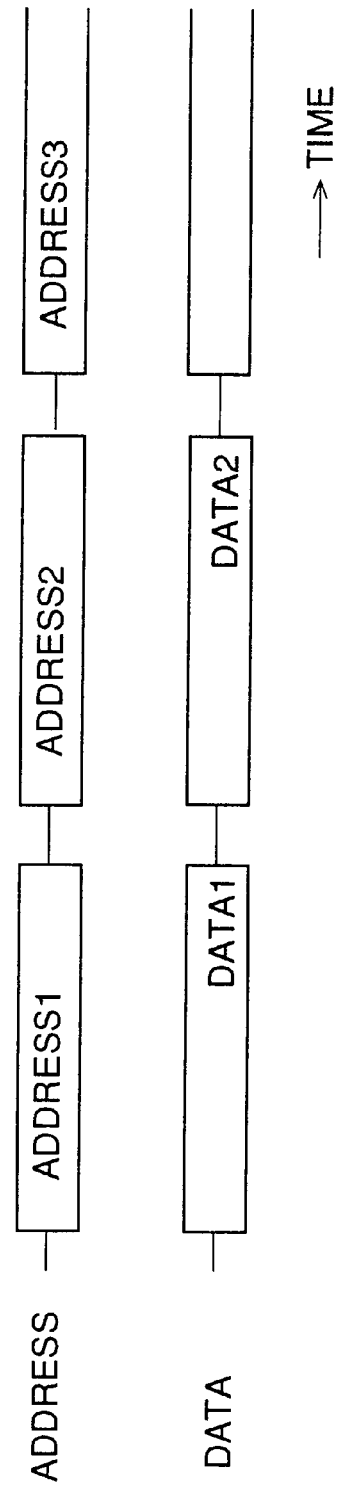

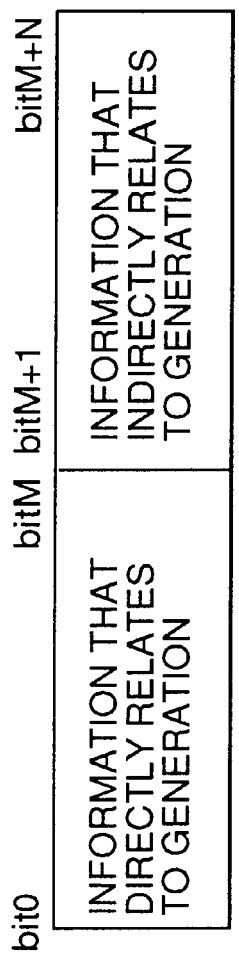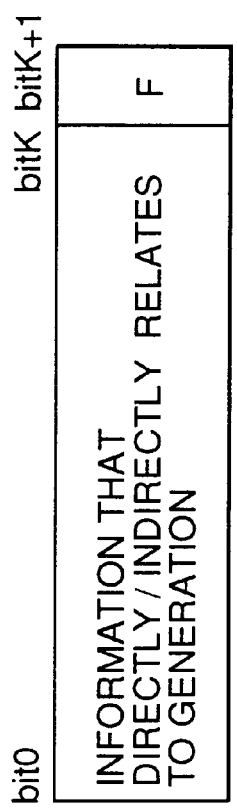

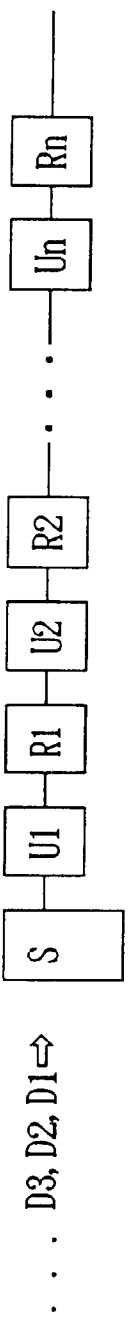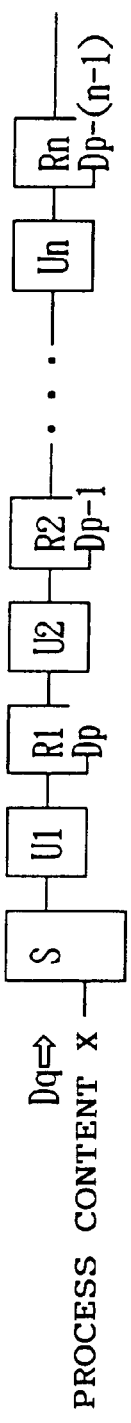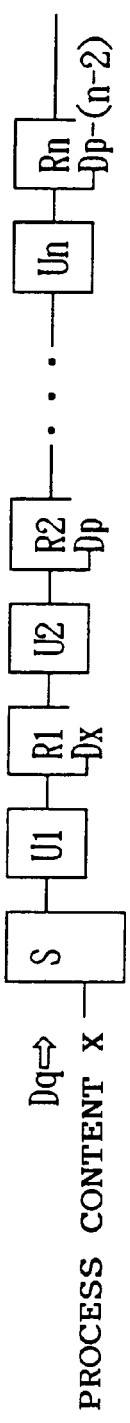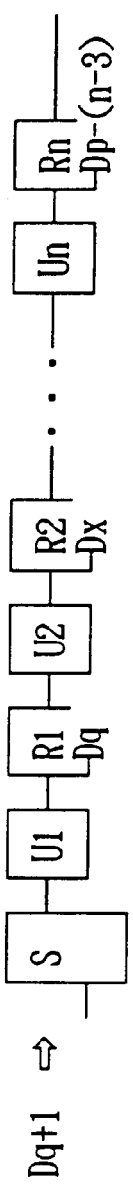
FIG. 40A
FIG. 40B
FIG. 40C
FIG. 40D

INFORMATION PROCESSING APPARATUS AND METHOD FOR PROCESSING THREE-DIMENSIONAL GRAPHICS USING A SECOND INFORMATION PROCESSING UNIT FOR PROCESSING PROCESSED-RELATED INFORMATION

This application is a continuation, of application Ser. No. 08/527,640, filed Sep. 13. 1995, now abandoned.

BACKGROUND OF THE INVENTION

1. Field of the Invention

The present invention relates to information processing apparatuses and information processing methods, and more particularly to an information processing apparatus and an information processing method for performing information processing of three-dimensional graphics.

Recently, development of semiconductor integrated circuits for realizing a multimedia information processing apparatus is actively undertaken. In the field of multimedia, it is required that various types of data including movie data, audio data, CG data or the like be handled by a single apparatus. With the development of semiconductor integrated circuits, a single element nowadays realizes the function hitherto realized by a plurality of semiconductor integrated circuits. However, it is quite difficult to handle an extensive variety of data, or to incorporate all the necessary functions in a semiconductor integrated circuit having a limited scale.

Hence, a general practice is that a desired function is realized by writing a program for achieving a variety of combinations of basic logic operation functions that the semiconductor integrated circuit is equipped with, in accordance with a stored program control method (a method whereby a necessary logic function is realized by a generally used microprogram).

In the above described method, the logic function equal to the desired function can be realized as a whole. However, since the number of instructions combined varies, there are cases in which the process cannot be completed in a predetermined period of time. From the perspective of the uniform execution of processes, realization of process functions (algorithms) in each and every field by a set of logic functions (instruction sets) does not actually meet the requirement.

An approach to resolve this problem is to define a frequently used logic function that serves a purpose as a single instruction and an optimization is performed so that the defined function can be executed at a high speed using hardware.

Here, it is noted that, if a relatively simple process and a relative complex auxiliary process for facilitating the process are executed in combination, a high-speed execution of three-dimensional graphics processing is effectively achieved. For this purpose, it is necessary to employ a processing apparatus where the process in accordance with the stored program method and the process using hardware are combined.

2. Description of the Prior Art

FIG. 1 is a block diagram of a conventional information processing apparatus. A host computer 41 is connected to a display device 44 via a graphic processing part 42 and a frame memory 43. three-dimensional image data produced in the host computer 41 is developed into 2-D data by the graphic processing part 42, stored in the frame memory 43 and displayed in the display device 44.

The graphic processing part 42 comprises a DDA (linear interpolation process) part 42a which interpolates data on the basis of data representing vertices of a polygon and transferred from the host computer 41; a texture process part 42b for pasting a pattern to the polygon; a rendering condition determination part 42c for making a determination as to whether or the data should be used in rendering on the basis of the data function or the like; and a blender part 42d for performing a blending process where colors of adjacent pixels are blended. The process of each part is executed according to a pipeline process scheme.

The data processed by the graphic processing part 42 is developed in the frame memory 43. The display device 44 displays image that corresponds to the data developed in the frame memory 43.

Under the pipeline process scheme, the graphic processing part 42 is so constructed as to execute only a process for which it is designed. Correction of data required for the process in the graphic processing part 42 is executed in the host computer 41. For example, an auxiliary process including matching of the coordinates of the polygon to be rendered to the coordinates of the pixels on the display, is executed in the host computer 41.

In the conventional information processing apparatus, calculation of endpoints between the vertices of the polygon is executed by the host computer characterized by its flexibility in the processing, because the calculation needs a complex process including the correction of data. Therefore, the load imposed on the host computer becomes large. In addition to that, there is a problem in that changing of viewpoints cannot be performed at a high speed because the data must be read from the host computer. Hence, efficient execution of three-dimensional image process is impossible.

SUMMARY OF THE INVENTION

Accordingly, an object of the present invention is to provide a novel and useful information processing apparatus and an information processing method in which the aforementioned problems are eliminated.

Another and more specific object of the present invention is to provide an information processing apparatus and an information processing method in which the information processing can be done efficiently.

The aforementioned objects of can be achieved by an information processing apparatus which executes a process according to input information, the information processing apparatus comprising:

first information processing means for executing a process set exclusively with respect to the input information; and second information processing means which is capable of executing a process parallel with the first information processing means, for executing a process according to process-related information with respect to the input information. According to the information processing apparatus of the present invention, while the first information processing means is executing input information processes to which it is dedicated, an auxiliary process is performed by the second information processing means in a parallel manner. Thus, it is possible to process information at a high speed.

In a preferred embodiment, the second information processing means has process-related information storing means for storing the process-related information. According to this aspect, it is possible to control the process executed by the second information processing means and information input/output of the second information processing means. Therefore, it is possible to prevent a contention for information from occurring between the first information processing means and the second information processing means. Thus, it is possible to execute information process efficiently.

In another preferred embodiment, the second information processing means has communicating means for communicating with a host system. According to this aspect, it is possible to supply information to the second information processing means from the master system irrespective of the process in the first information processing means. Therefore, the process in the second information processing means is conducted smoothly and efficiently, thus improving the speed of the process.

In another preferred embodiment, the information processing means comprises: a first operation part processing information in accordance with the process-related information; and a second operation part which processes information in accordance with the process-related information and is capable of executing a process parallel with the first operation part. According to this aspect, the first operation part processes information in accordance with the process-related information and the second operation part controls the operation of the first information processing means. In this way, the first information processing means can be controlled to execute the process in an optimal manner, thus enabling the information process to be executed efficiently.

In another preferred embodiment, the second information processing means has shared storing means accessible both from the first operation part and from the second operation part. According to this aspect, it is possible for the first and second operation parts to share information so that the first and second operation parts is able to process the information efficiently.

In still another preferred embodiment, the second information processing means sets the number of times that the first information processing means executes a process, in accordance with the process-related information, the first information processing means comprising: counting means for subtracting from a count of the counter each time a process is executed by the first information processing means; and end-of-process information generating means for ending the process of the first information processing means when the count of the counting means reached zero, and supplying end-of-process information to the second information processing means. According to this aspect, the process in the first information processing means can be automatically terminated and the processing load of the second information processing means can be reduced, thereby enabling the information process to be carried out efficiently.

In yet another preferred embodiment, the first information processing means has a three-dimensional image information processing part dedicated to processing of three-dimensional image information. According to this aspect, most of the three-dimensional image information is processed by the three-dimensional image information processing part and the auxiliary process is executed by the second information processing means. In this way, the three-dimensional image information can be processed at a high speed.

In still another preferred embodiment, the three-dimensional image information processing part of the first information processing means comprises: an interpolation calculation part executing interpolation calculations; a texture calculation part processing interpolated information processed by the interpolation calculation part, in accordance with externally supplied texture information; a rendering condition determination part determining whether or not information processed by the texture calculation part meets a predetermined rendering condition; a transparency calculation part setting a predetermined coefficient for the information determined by the rendering condition determination part to meet the predetermined rendering condition, so as to calculate a transparency; and an output part outputting information obtained by calculation of the transparency calculation part. According to this aspect, most of the three-dimensional image information process is executed by the first information processing means. By carrying out the auxiliary process by the second information processing means, the three-dimensional image process can be executed at a high speed.

In another preferred embodiment, the information processing apparatus further comprises storing means which is accessible both from the first information processing means and the second information processing means, and stores information necessary for processes in the first information processing means and the second information processing means. According to this aspect, it is possible for the first and second information processing means to share information so that parallel processing of the information can be carried out. In this way, efficient information processing is achieved.

In yet another preferred embodiment, the information storing means comprises: first information storing means for storing control information which controls processes in the first information processing means and the second information processing means, as well as storing the process-related information; second information storing means for storing predetermined information used during the processes in the first information processing means and the second processing means; and third information storing means for storing information relating to result of the processes in the first information processing means and the second information processing means. According to this aspect, it is possible to prevent contention for an access between the first and second information processing means from taking place, thereby enabling the process to be executed efficiently.

In still another preferred embodiment, the first information processing part stores all results of three-dimensional image processes executed by the first information processing means and the second information processing means, and wherein the third information storing means stores only color information and transparency information of the results of three-dimensional image processes executed by the first information processing means and the second information processing means. According to this aspect, the storage capacity of the third information storing means can be small because the third information storing means need only store color information and transparency information required for the display. Further, reading of information from the third information storing means can be performed at a high speed.

In yet another preferred embodiment, the second information processing means has execution control means for controlling, on the basis of the process-related information, the first operation part, the second operation part and the first information processing means to execute respective processes in a synchronous manner. According to this aspect, the process by the first information processing means and the process by the second information processing means can be coupled in different combinations.

In still another preferred embodiment, the execution control means comprises: a first execution control part which controls an operation of the first operation part on the basis of the process-related information and generates control information; a second execution control part which controls an operation of the second operation part on the basis of the process-related information and generates control information; a third execution control part which controls an operation of the first information processing means; and pipeline control means for controlling operations of the first through third execution control parts so that a whole operation proceeds as one pipeline operation, on the basis of the control information generated by the first and second execution control parts. According to this aspect, the processes in the first operation part, the second operation and the first information processing means can be synchronized. Therefore, complex processes can be executed efficiently. Further, the stand-by state can be controlled according to the process-related information. Thus, it is possible to adapt for various processes by modifying the process-related information.

In another preferred embodiment, when the process-related information includes stop information which causes processes to stop, the first execution control part or the second execution control part detects the stop information so as to issue an execution stop request to the pipeline control means, and wherein the pipeline control means controls operations of the first and second operation parts and the first information processing means. According to this aspect, it is easy to set a procedure for the process in the first operation part, the second operation part and the first information processing means, by setting stop information in the process-related information.

The aforementioned objects can also be achieved by an information processing method for an information processing apparatus which executes a process according to input information, the information processing apparatus including: first information processing unit for executing a process set exclusively with respect to the input information; and second information processing unit which is capable of executing a process parallel with the first information processing unit, for executing a process according to process-related information with respect to the input information, wherein rendering information for rendering a three-dimensional image is generated in accordance with vertex information of a figure constituting a three-dimensional image, said information processing method comprising the steps of:
a) obtaining a set of endpoints interpolated between predetermined vertices in accordance with said vertex information, using the second information processing unit;
b) rendering lines interpolated between the set of said endpoints obtained by the first information processing unit and opposite sides, using the first information processing unit; and
c) obtaining a next set of endpoints while said first information processing unit is rendering said lines, using the second information processing unit.

According to the information processing method of the present invention, the relatively complex process of obtaining endpoints of a figure is executed, and the relatively simple interpolation process of interpolation process based on the endpoints is executed. In further accordance with this information processing method, it is possible to reduce the information processing load of the host system. Further, it is not necessary to wait for the supply of information from the host system. Since the endpoint process and the interpolation process can be executed parallel with each other, the information processing efficiency is improved.

The aforementioned objects of the present invention can be achieved by an information processing apparatus connectable to a texture memory storing texture data provided to paste a pattern or the like to a three-dimensional image and including color data and an α value, to a frame memory storing color data for a three-dimensional image to be displayed, and to a local memory storing rendering data including color data, an α value and a z value relating to a depth, as well as storing a microprogram and user data, the information processing apparatus comprising: texture processing means for reading the texture data from the texture memory so as to paste a pattern to associated pixels; rendering condition determination means for reading depth data or the like from the local memory so as to make a determination as to whether or not associated pixels should be rendered, blending means for reading depth data or the like for pixels that are already rendered from the local memory so as to blend read data with color data for pixels to be rendered and to obtain data that should be finally written in the frame memory, only writing of data being made from the blending means to the frame memory, same data are written in the frame memory and the local memory, a process of the rendering condition determination means which makes access to the local memory and a process of the texture processing means which makes access to the texture memory being executed in parallel with each other. Preferably, the information processing apparatus further comprises linear interpolation calculation means supplied by a host apparatus with data for a starting point of horizontally rendered pixels and with variations from the starting point, the linear interpolation calculation means calculating values for pixels to be rendered, on the basis of information supplied from the host apparatus, and supplying calculated values to the texture processing means and to the rendering condition determination means in a parallel manner. According to this aspect, a high-speed rendering can be achieved even in the case where the frame memory is embodied by a VRAM. The process in each stage can be performed without being affected by a access delay characteristic of the memory.

In another preferred embodiment, the information processing apparatus further comprises: first buffer means for temporarily storing results of a process in the rendering condition determination means; and second buffer means for temporarily storing results of a process in the texture processing means, the rendering condition determination means and the texture processing means executing respective processes in an asynchronous manner, the determination means and the texture processing means operating asynchronously with respect to each other while maintaining synchronism with the blending means so that data is properly processed in the blending means. According to this aspect, means that are operated parallel with each other can be operated asynchronously. Thereby, an effect of a delay occurring in one means on the process in another means can be minimized.

In another preferred embodiment, an access speed of the local memory, at least, is greater than an access speed of the frame memory. According to this aspect, it is possible to embody the frame memory by a VRAM, which is used in the existing system. Therefore, it is possible to achieve a high-speed rendering while the compatibility with the existing system is maintained.

In still another preferred embodiment, the rendering condition determination means, the texture processing means and the blending means constitute a rendering pipeline executing a pipeline process. According to this aspect, it is possible to carry out a high-speed pipeline process.

The aforementioned objects of the present invention can also be achieved by an information processing apparatus connectable to memory means for storing first information indirectly relating to generation of information for an image to be displayed, the information processing apparatus comprising a rendering pipeline subjecting the first information and second information directly relating to generation of information for an image to be displayed to a pipeline process, and supplying generated image information to the memory means, wherein the rendering pipeline is constructed of a total of n (=natural number) stages formed by alternately disposed process units and registers, the process unit having operating means responsible for operation of the second information as well as having interpretation means responsible for interpretation of the first information, and the register storing an output of the process unit. Preferably, the information processing apparatus further comprises selector means which is exclusively connected to a control line carrying a process content for each process unit in the n stages, and imports the second information from a host apparatus. Preferably, the information processing apparatus further comprises means for supplying, to the rendering pipeline, information that includes an information item that handles both the first information and the second information and a tag indicating whether the first information or the second information is carried, each process unit in the rendering pipeline detects the tag so as to determine whether to process supplied information using the operating means or using interpretation means. According these aspects, it is possible to modify the function of each process unit without stopping the operation of the rendering pipeline.

In a preferred embodiment, the information processing apparatus further comprises outputting means which, provided in a stage preceding the rendering pipeline, adds a terminal point tag indicating a terminal point is added to information relating to an terminal point of a polygon while reducing polygon information from a host apparatus into points, and outputs the second information; and a lock unit provided in the rendering pipeline in a stage thereof preceding a process unit that requires the first information from the memory means, the lock unit assuming the second information to be relating to the terminal point of the polygon, in case the terminal point tag added to the second information input is set ON, and then halting subsequent input of information until all information that remain in the rendering pipeline, including the second information, has been output from the rendering pipeline. Preferably, the outputting means has means outputting the terminal point tag only when a queuing process is necessary. Preferably, the lock unit has a lock mechanism halting input of information until all information that remain in the rendering pipeline has been output from the rendering pipeline, and means for activating the lock mechanism in response to the terminal point tag only when there is queuing process. According to these aspects, it is possible to operate the rendering pipeline without producing improper image information, even when the image information relates to an image having an overlapped portion.

In another preferred embodiment, the rendering pipeline has a first process unit which is used only as an address presenting unit for supplying an address to the memory means, a second process unit which is used as a data import unit for importing data from the memory means, and a plurality of pipeline registers absorbing a delay that corresponds to latency between the first and second process units. Preferably, the information processing apparatus further comprises means for reducing loss of time due to switching between a writing operation and a reading operation, by giving a preference to a request in a read queue while the memory means is being used in a reading mode so that the reading operation is executed in a continuous manner, and by giving a preference to a request in a write queue while the memory means is being used in a writing mode so that the writing operation is executed in a continuous manner. The memory means may be constructed of a synchronous memory. The memory means may comprise a first memory constructed of a synchronous memory and connected to an arbitration circuit and a second memory connected to display means, the rendering pipeline being enabled to read from and write to the first memory, the rendering pipeline being enabled to write to the second memory, and an access request from the display means being issued to the second memory. Preferably, the first memory has a first storage area storing main information, and a second storage area storing control information provided in one-to-one correspondence to the main information. Preferably, the rendering pipeline has an address presenting unit connected to the arbitration circuit and a data import unit, each, of the address presenting unit and data import unit includes means for caching the control information. Preferably, the address presenting unit includes means for latching information that indicates which address of the second storage area is subjected to caching, and wherein if the control information is already cached, an address in which the main information is stored is presented to the first memory, if the control information is not cached, or if non-cached control information having a address different from that of the cached control information is necessary, the address in which the non-cached control information is presented to the first memory, in case the control information is set to a first value, the data import unit transmits; data imported from the first memory to a unit in a subsequent stage in the rendering pipeline, and in case the control information is set to a second value, the data import unit transmits a predetermined value to a unit in a subsequent stage in the rendering pipeline. Preferably, the rendering pipeline has a process unit; built therein in a final stage and equipped with a caching function for caching the control information. According to these aspects, it is possible to operate the rendering pipeline at a high speed when a high-speed memory such as a synchronous memory is used.

The aforementioned objects of the present invention can also be achieved by an information processing method in an information processing apparatus connectable to a texture memory storing texture data provided to paste a pattern or the like to a three-dimensional image and including color data and an α value, to a frame memory storing color data for a three-dimensional image to be displayed, and to a local memory storing rendering data including a color data, an α value and a z value relating to a depth, as well as storing a microprogram and user data, the information processing method comprising the steps of: a) reading the texture data from the texture memory so as to paste a pattern to associated pixels; b) reading depth data or the like from the local memory so as to make a determination as to whether or not associated pixels should be rendered; and c) reading depth data or the like for pixels that are already rendered from the local memory so as to blend read data with color data for pixels to be rendered and to obtain data that should be finally written in the frame memory, wherein writing of data to the frame memory is enabled in step c) but reading of data is not, same data is written both in the frame memory and in the local memory, and step 2) effected by accessing the local memory and step 1) effected by accessing the texture memory are executed parallel with each other. According to this aspect, a high-speed rendering can be achieved even in the case where the frame memory is embodied by a VRAM. The process in each stage can be performed without being affected by a access delay characteristic of the memory.

The aforementioned objects of the present invention can also be achieved by an information processing method of an information processing apparatus connectable to memory means for storing first information indirectly relating to generation of information for an image to be displayed, the information processing method comprising a step of: a) subjecting the first information and second information directly relating to generation of information for an image to be displayed to a pipeline process, and supplying generated image information to the memory means, wherein step a) uses a rendering pipeline constructed of a total of n (=natural number) stages formed by alternately disposed process units and registers, the process unit having operating means responsible for operation of the second information as well as having interpretation means responsible for interpretation of the first information, and the register storing an output of the process unit. According this information processing method, it is possible to modify the function of each process unit without stopping the operation of the rendering pipeline.

BRIEF DESCRIPTION OF THE PREFERRED EMBODIMENTS

Other objects and further features of the present invention will be apparent from the following detailed description when read in conjunction with the accompanying drawings, in which:

FIGS. 37A and 37B are diagrams which explain reading and writing operations in the frame memory;

FIGS. 39A and 39B are diagrams which explain information which directly relates to generation of image and is supplied to the rendering pipeline according to the third embodiment, and information which indirectly relates to generation of image and is supplied to the rendering pipeline according to the third embodiment;

FIGS. 40A through 40D are diagrams that explain the pipeline process in the third embodiment;

DESCRIPTION OF THE PREFERRED EMBODIMENTS

Figure 1:
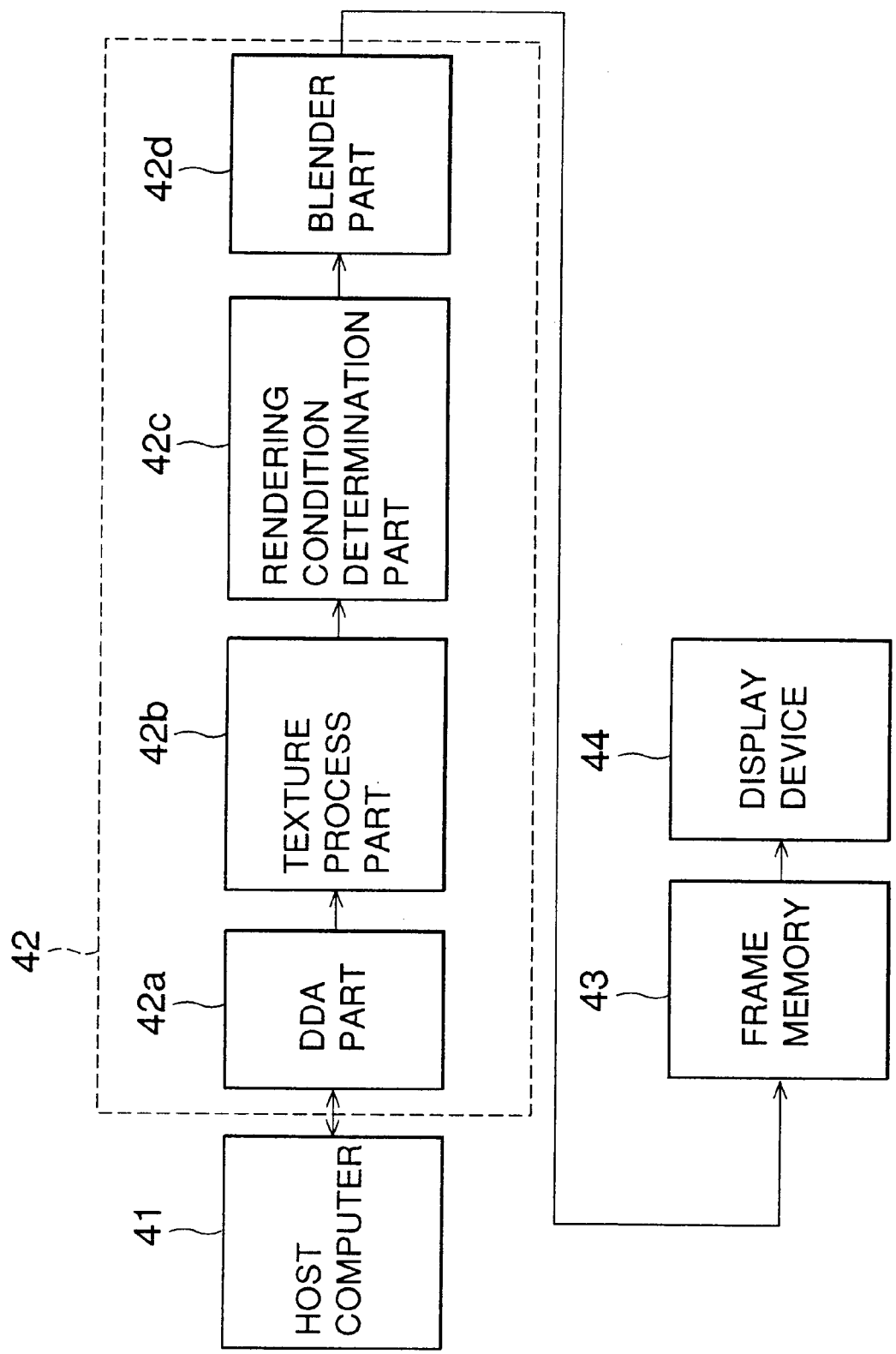
FIG. 1 is a block diagram of an example of a conventional information processing apparatus.
Figure 2:
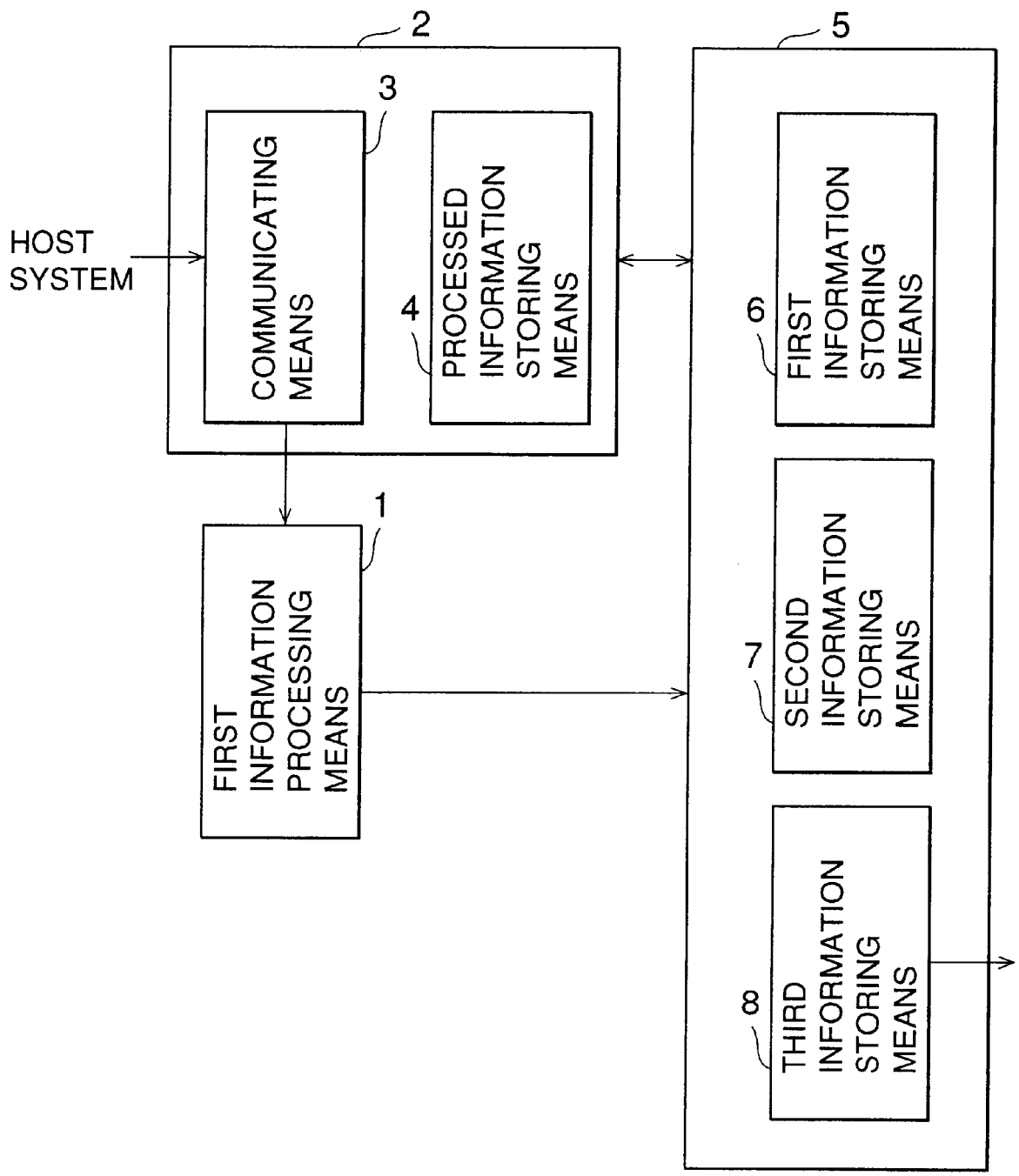
FIG. 2 is a block diagram which explains an operation of the present invention.

FIG. 2 is a block diagram which explains an operation of the present invention. First information processing means 1 is dedicated to execution of a predetermined processing of input information. Second information processing means 2, capable of executing a process parallel with the first information processing means 1, executes a processing of the same input information in accordance with control information. The information processing means 2 has communicating means 3 that communicates with a host system and also has process-related information storing means 4 for storing process-related information. Information storing means 5 connected to and accessible from the first information processing means 1 and the second information processing means 2 store information necessary for the processing in the first and second information processing means. The information storing means 5 includes: first information storing means 6 that stores the input information and control information for controlling the process by the first and second information processing means; second information storing means 7 which stores predetermined information used in the processing in the first and second information processing means; and third information storing means 8 for storing information relating to the result of the processes executed by the first and second information processing means.

A description will now be given of the embodiments of the present invention.

Figure 3:
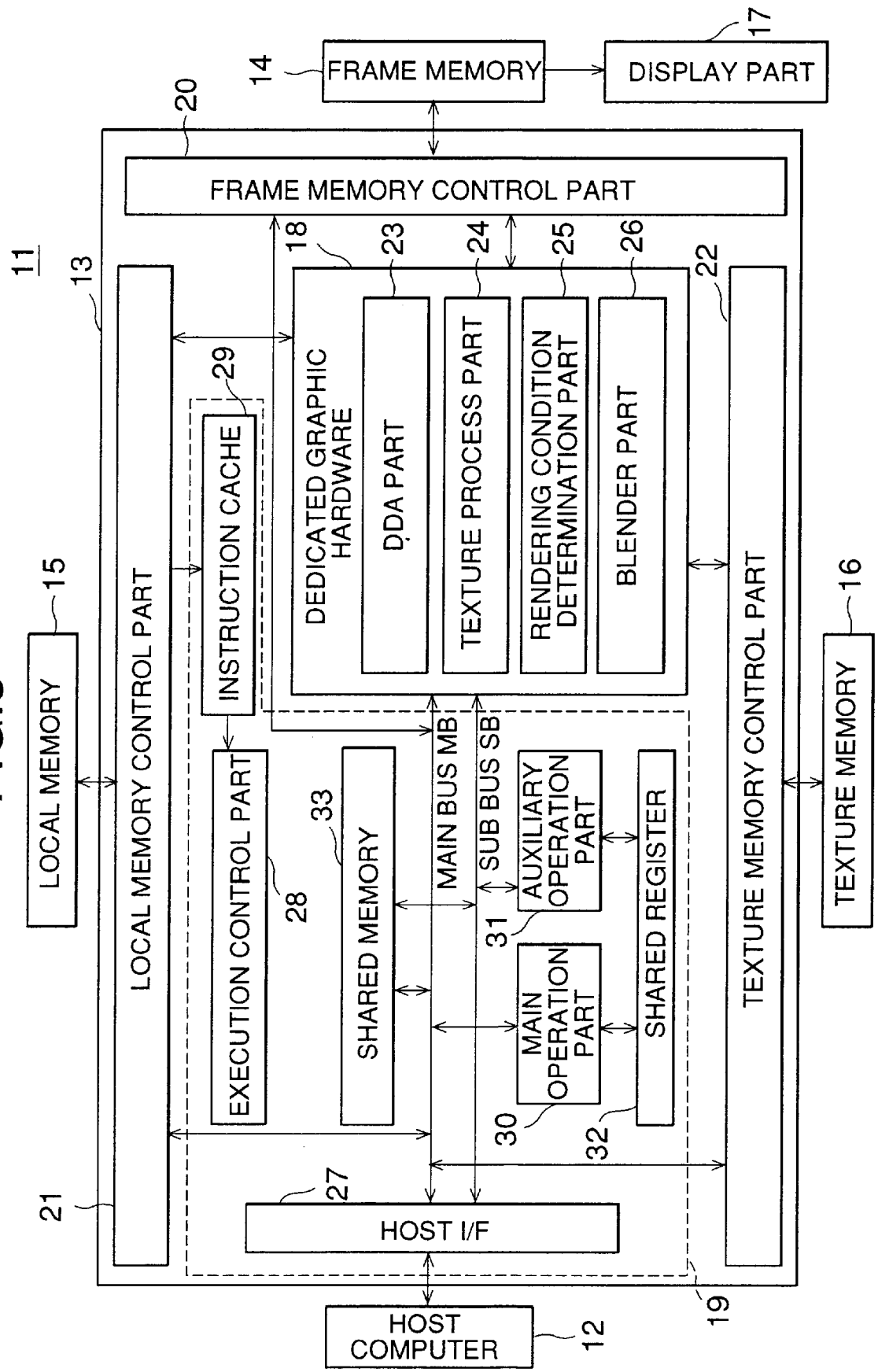
FIG. 3 is a block diagram of a first embodiment of the information processing apparatus according to the present invention.

FIG. 3 is a block diagram of a first embodiment of the information processing apparatus according to the present invention. An information processing system 11 to which the present invention is applied converts three-dimensional image data into data that can be displayed in a display part 17 and outputs the converted data. The information processing system 11 comprises a host computer 12 that supplies three-dimensional image data and functions as a host system; an information processing apparatus 13 which processes the data supplied by the host computer 12 and develops the supplied data into data for the image to be rendered; a frame memory 14 for storing the image data developed by the image processing apparatus 13; a local memory for storing a processing program used by the information processing apparatus 13 or three-dimensional image data to be displayed; a texture memory 16 for storing texture data of a pattern pasted the surface of the displayed object; and a display part 17 for reading 2-D image data stored in the frame memory 14 and displaying the same.

The host computer 12 reduces the three-dimensional image data into picture elements and performs geometric conversion on the data. Thereafter, the host computer 12 supplies the data to the information processing apparatus 13 as packet data.

The information processing apparatus 13 executes a predetermined process on the three-dimensional image data supplied from the host computer 12 so as to produce the data for the image to be rendered and develop the same data in the frame memory 14. The information processing apparatus 13 corresponds to first information processing means as; claimed. The information processing apparatus 13 comprises: a dedicated graphic hardware part 18 for processing the supplied image data using predetermined dedicated hardware; a microprogram ($\mu$P) execution part 19 that corresponds to the second information processing means as claimed and executes processes in accordance with a program by operating parallel with the dedicated graphic hardware part 18; a frame memory control part 20 for controlling writing and reading of the image data to and from the frame memory 14 in accordance with instructions from the dedicated graphic hardware part 18 and the microprogram execution part 19; a local memory control part 21 for controlling writing and reading of a microprogram and processed image data to and from the local memory 15; and a texture memory control part 22 for controlling writing and reading of texture data to and from the texture memory 16.

The frame memory 14 comprises a video random access memory (VRAM) or the like that corresponds to third information storing means and stores 8-bit RGB color data and an 8-bit α value. The local memory 15 comprises an SDRAM and corresponds to first information storing means. The local memory 15 stores user data and rendering data including a microprogram, RGB color data, an α value relating to blending, and a z value relating to depth.

The texture memory 16 comprises an SDRAM, SRAM, PROM or the like and corresponds to second information storing means. The texture memory 16 stores texture data constructed of RGB color data and an α value.

The texture memory 16 manages texture pattern data in units of pages. Since the data can be referred to page by page, access to the texture memory 16 can be done at a high speed.

The dedicated graphic hardware part 18 is a dedicated hardware part for performing three-dimensional graphics rendering. The dedicated graphic hardware part 18 comprises; a linear interpolation calculation (DDA) part 23 for executing a process of interpolating pixels that form the interior of a figure (polygon) constituting the three-dimensional graphics; a texture process part 24 for executing a process of setting a pattern for a portion interpolated by the linear interpolation calculation part 23 on the basis of the data in the texture memory 16; a rendering condition determination part 25 for making a determination as to whether or not a given pixel should be rendered on the basis of pixel-by-pixel data; and a blender part 26 for mixing a color value of the pixel to be rendered with a color value of the pixel beneath which pixel is already rendered. By activating the dedicated graphic hardware part 18 after setting a necessary parameter, a process independent of the microprogram execution part 19 can be performed.

The linear interpolation calculation part 23 is supplied with coordinates (X, Y, Z), color values (R, G, B, α), texture coordinates (S, T, Q), depth cue value (D) of a starting point of interpolation, increments (αX, αY, αZ, αR, αG, αB, αA, αS, αT, αQ, αD) given to the values toward the starting point of the interpolation, and a set number of times that the interpolation calculation is carried out. The linear interpolation calculation part 23 adds the increment to the initial value the predetermined times and outputs the interpolated value.

The microprogram execution part 19 comprises: a host interface (I/F) part 27 which analyzes packet data supplied by the host computer 12 and controls access to the frame memory 14, the local memory 15 and the texture memory 16 connected to the information processing apparatus 13; an execution control part 28 for controlling the entirety of the information processing apparatus 13 in accordance with the program stored in the local memory 15; an instruction cache 29 which corresponds to the process-related information storing means as claimed and temporarily stores an instruction block interpreted and executed by the execution control part 28; a main operation part 30 which corresponds to a first operation part as claimed and executes various operations in accordance with an instruction from the execution control part 28; an auxiliary operation part 31 which executes various operations parallel with the main operation part 30 in accordance with an instruction from the execution control part 28; a shared register which corresponds to shared storing means as claimed and reads data from and writes data, to the main operation part 30 and the auxiliary operation part 31 in a parallel manner; and a shared memory 33.

The host interface part 27 has a buffer (not shown) which temporarily stores data for the polygon to be rendered. The data is read sequentially from the host interface part 27.

The main operation part 30 has a program execution function, and the auxiliary operation part 31 has a function of controlling the dedicated graphic hardware part 18. The main operation part 30 and the auxiliary operation part 31 are configured to operate in synchronism using a parallel instruction code.

The microprogram execution part 19 is configured to adapt to the RISC instruction set compatible with various processes by combining basic instructions. In this way, the process is controlled by the microprogram.

The frame memory control part 20 is connected to the frame memory 14, the dedicated graphic hardware 18 and the main bus of the microprogram execution part 19. In accordance with a request from the dedicated graphic hardware part 18 and the microprogram execution part 19, the frame memory control part 20 controls writing of image data from the dedicated graphic hardware part 18 and the microprogram execution part 19 to the frame memory 14 and controls reading of image data from the frame memory 14 to the dedicated graphic hardware part 18 and the microprogram execution part 19.

When an three-dimensional image is rendered, the frame memory control part 20 allows only the writing of data into the frame memory 14 so that the access speed of the frame memory 14 is improved.

The local memory control part 21 is connected to the local memory 15, the dedicated graphic hardware part 18 and the microprogram execution part. 19. The local memory control part 21 controls writing of various data including a microprogram, color data. (R, G, B, α), a Z value, a window ID from the dedicated graphic hardware part 18 and the microprogram execution part 19 to the local memory 15. The local memory control part 21 also controls reading of various data from the local memory 15 to the dedicated graphic hardware part 18 and the microprogram execution part:

When a three-dimensional image is rendered, the local memory control part 21 allows not only color data (R. G, B, α) but texture data (Z. S, T, Q, D) to be copied to the local memory. For this reason, the storing of the texture data in the frame memory 14 is unnecessary, causing the access speed of the frame memory 14 to improve. In this way, a high-speed processing is realized.

The texture memory control part 22 is connected to the texture memory 16, the dedicated graphic hardware part 18 and the microprogram execution part 19. In accordance with a request from the dedicated graphic hardware part 18 and the microprogram execution part 19, the texture memory control part 22 controls reading of texture data from the texture memory 16 to the dedicated graphic hardware part 18 and the microprogram execution part 19. In accordance with a request from the microprogram execution part 19, the texture memory control part 22 controls writing of texture data from the microprogram execution part 19 to the texture memory 22.

Since the frame memory control part 20, the local memory control part 21 and the texture memory control part 22 allow the dedicated graphic hardware part 18 and the microprogram execution part 19 to access the frame memory 14, the local memory 15 and the texture memory 16, respectively, no contention for the access to the memory is produced and there is no data wait time during the process. Therefore, it is possible to process data efficiently.

The execution control part 28 controls the execution by controlling an instruction fetch (F), an instruction interpretation (D), a data read (R) and a calculation execution and data storage (E) in that: order, in accordance with a four-stage pipeline scheme.

The execution control part 28 has a three-field instruction system for controlling the process in the main operation part 30, the auxiliary operation part 31 and the dedicated graphic hardware part 18, the control of the process being done in each field.

The display part 17 displays an image on the basis of the color data (R, G, B, α) stored in the frame memory 14.

Figure 4:
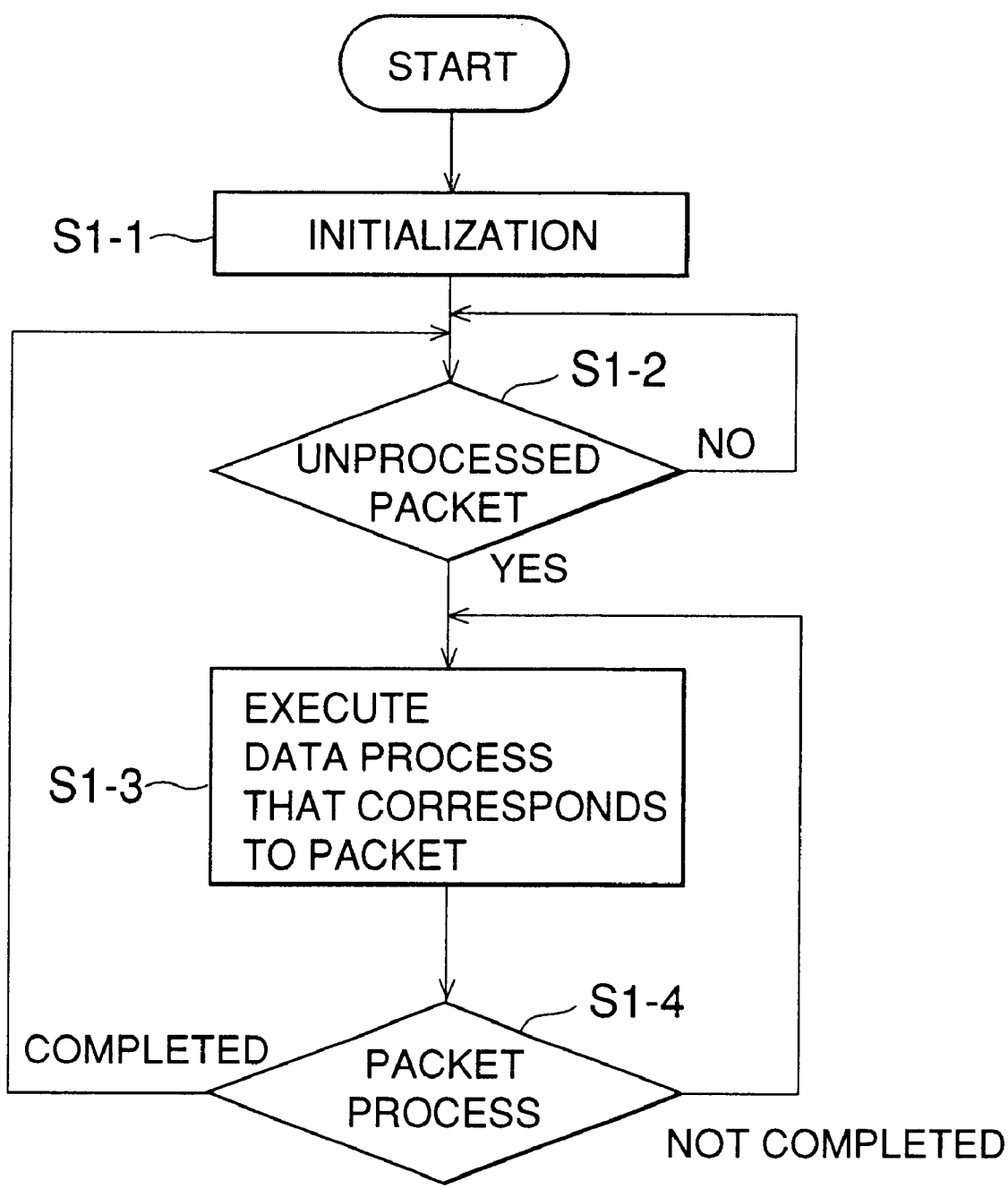
FIG. 4 is a flowchart showing an overall flow of the information processing in the first embodiment.

FIG. 4 is a flowchart showing an overall flow of the information processing in the first embodiment.

The information processing apparatus 13 of this embodiment performs an initialization when executing the information processing (step S1-1).

A determination is then made as to whether or not there is an unprocessed packet. When there is an unprocessed packet, a data process that corresponds to the packet is executed (steps S1-2, S1-3).

When a packet process that corresponds to the packet is completed (step S1-4), the data process that corresponds to the next unprocessed packet is carried out (steps S1-2 and S1-3).

When there is no unprocessed packet, the information processing apparatus 13 stands by for the next packet (step S1-2).

As described above, the information processing apparatus 13 of this embodiment receives data to be processed from the host computer 12 in the form of a packet so that the process is executed for each packet.

A description will now be given of the rendering process of specific three-dimensional graphic information.

Figure 5:
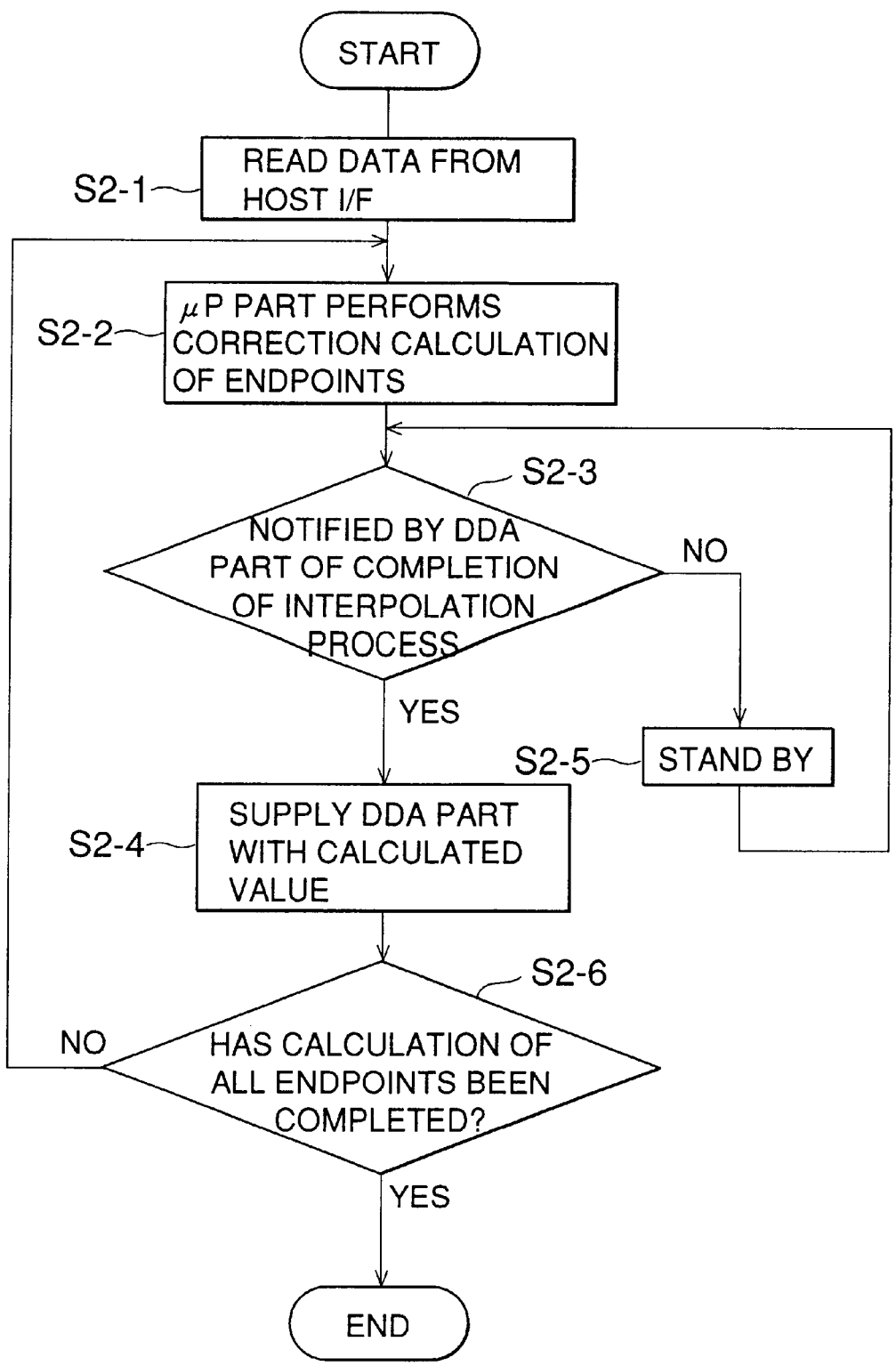
FIG. 5 is a flowchart showing an operation of a microprogram execution part of the first embodiment during a rasterization process.

FIG. 5 is a flowchart showing an operation of the microprogram execution part 19 of the first embodiment during a rasterization process.

The microprogram execution part 19 reads, from the host interface part 27, initial data (X, Y, Z, R, G, B, α, D, S, T, Q) necessary for rendering an image, the initial data comprising coordinates (X, Y, Z), color values (R, G, B, α), texture coordinates (S, T, Q), and a depth cue value (D). The microprogram execution part 19 also reads increments (dX, dY, dZ, dR, dG, dB, dα, dD, dS, dT, dQ) given to the values between the vertices (step S2-1).

The endpoints that constitute the sides of the polygon are then calculated (step S2-2). Since the side of the polygon does not necessarily reside on the pixels, correction calculation is carried out so that the polygon is properly rendered.

A determination is then made as to whether or not the microprogram execution part 19 is notified by the dedicated graphic hardware part 18 of a completion of an interpolation process relating to one endpoint (step S2-3).

When the microprogram execution part 19 is supplied by the dedicated graphic hardware part 19 with a notification that the interpolation process is completed, the microprogram execution part 19 supplies endpoint pixel data (X, Y, Z, R, G, B, α, D, S, T, Q) calculated in step S2-2 to the DDA part 23 of the dedicated graphic hardware part 18 (step S2-4). The DDA part 23 is hardware dedicated to execution of a linear interpolation process.

If the microprogram execution part 19 is not supplied by the dedicated graphic hardware part 18 with a notification that the interpolation process is completed; that is, if the interpolation process in the DDA part 23 of the dedicated graphic hardware part 18E has not been completed, the microprogram execution part 19 does not carry out a next process and is put into a stand-by state (step S2-5).

The steps S2-2 through S2-5 are repeated until one polygon is formed (step S2-6).

Figure 6:
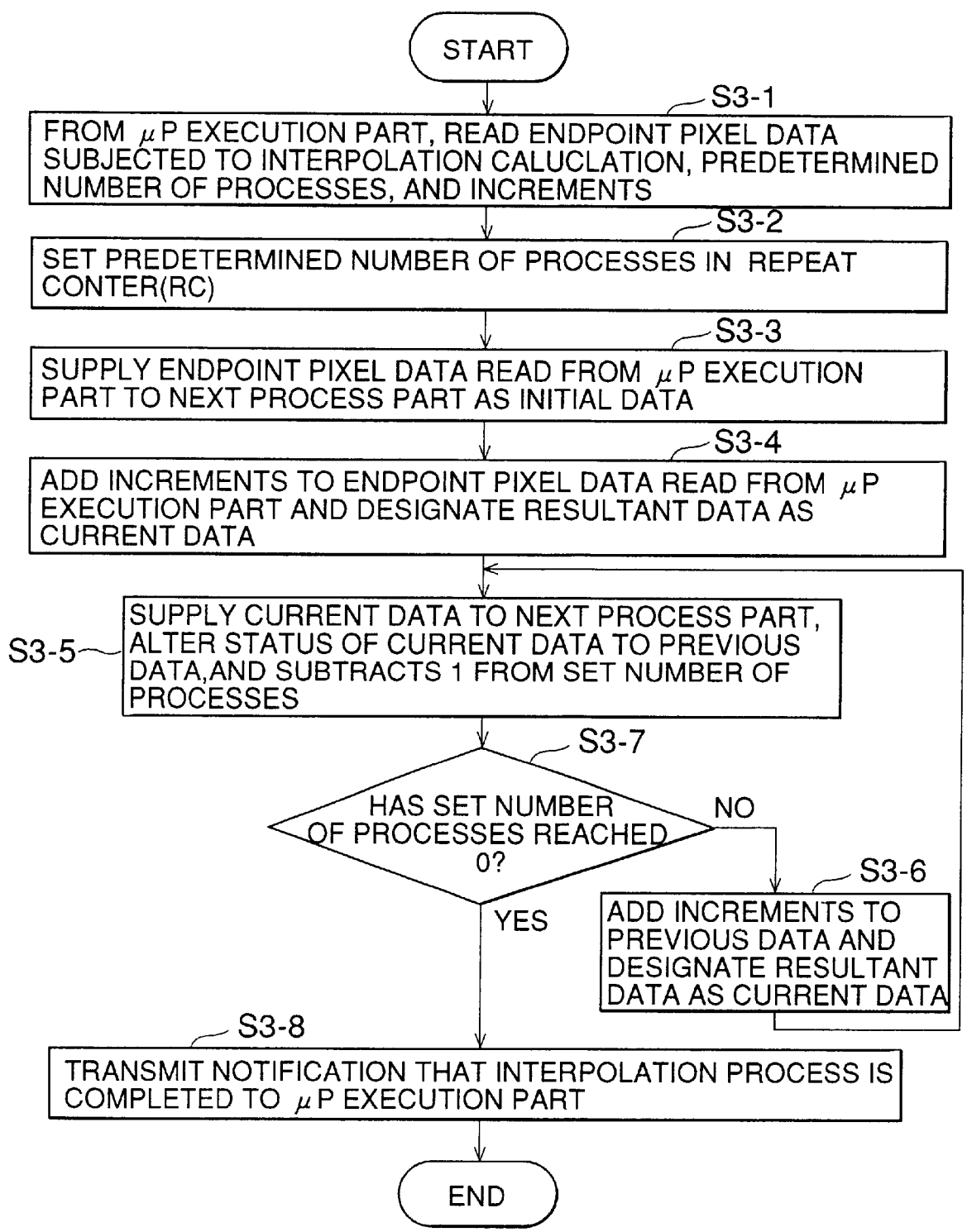
FIG. 6 is a flowchart showing the 4 operation of a DDA part of a dedicated graphic hardware part according to the first embodiment during the rasterization process.

FIG. 6 is a flowchart showing the operation of the DDA part 23 of the dedicated graphic hardware part 18 according to the first embodiment during the rasterization process.

The dedicated graphic hardware part 18 reads, from microprogram execution part 19, endpoint pixel data (X, Y, Z, R, G, B, α, D, S, T, Q) subjected to correction calculation, the number n of interpolation processes required for the interpolation of one line, and increments (dX, dY, dZ, dR, dG, dB, dα, dD, dS, dT, dQ) given to the data (X, Y, Z, R, G, B, α, D, S, T, Q) between adjacent pixels (step S3-1).

The number n of the interpolation processes read by the dedicated graphic hardware part 18 is set in a repeat counter (RC) built in the dedicated graphic hardware part 18 (step S3-2).

The dedicated graphic hardware part 18 then supplies endpoint pixel data ($X_0$, $Y_0$, $Z_0$, $R_0$, $G_0$, $B_0$, $α_0$, $D_0$, $S_0$, $T_0$, $Q_0$) read from the microprogram execution part 19 to the texture process part 24 as initial data in the DDA part 23 (step S3-3).

The DDA part 23 of the dedicated graphic hardware part 18 adds increments (dX(=1), dY(=0), dZ;, dR, dG, dB, dα, dD, dS, dT, dQ) read in step S2-1 to the initial data ($X_0$, $Y_0$, $Z_0$, $R_0$, $G_0$, $B_0$, $α_0$, $D_0S_0$), $T_0$, $Q_0$) and designates resultant data ($X_0+1$, $Y_0$, $Z_0+dZ$, $R_0+dR$, $G_0+dG$, $B_0+dB$, $α_0+dα$, $D_0+dD$, $S_0+dS$, $T_0+dT$, $Q_0+dQ$) as current pixel data (step S3-4).

The DDA part 23 then supplies the current pixel data ($X_0+1$, $Y_0$, $Z_0+dZ$, $R_0+dR$, $G_0+dG$, $B_0+dB$, $α_0+dα$, $D_0+dD$, $S_0+dS$, $T_0+dT$, $Q_0+dQ$) $t_0$the texture process part 24. The DDA part 23 then activates the repeat counter RC and subtracts 1 from the set number n indicating the number of times that the interpolation process is conducted so that set the number of times that the interpolation process is carried out is changed to n-1 (step S3-5).

The dedicated graphic hardware part 18 then adds the increments (1, 0, dZ, dR, dG, dB, dα, dD, dS, dT, dQ) to the previous pixel data ($Xn_{-1}$, $Yn_{-1}$, $Zn_{-1}$, $Rn_{-1}$, $Gn_{-1}$, $Bn_{-1}$, $αn_{-1}$, $Dn_{-1}$, $Sn_{-1}$, $Tn_{-1}$, $Qn_{-1}$) and designates the resultant data as the current pixel data. The dedicated graphic hardware part 18 supplies the current pixel data to the texture process part 24 and subtracts 1 from the number of times that the interpolation process is carried out (step S3-6).

The steps S3-5 and S3-6 are repeated until the count in the repeat counter RC is 0. When the count of the repeat counter RC is 0, the microprogram execution part 19 is provided with a notification that the interpolation process is completed (steps S3-7, S3-8). As described above, by repeating the interpolation process a predetermined times, starting with the endpoints, interpolation of the data representing the interior of the polygon can be effected. Thus, the interpolation process is simplified using a simple pipeline process scheme.

Figure 7:
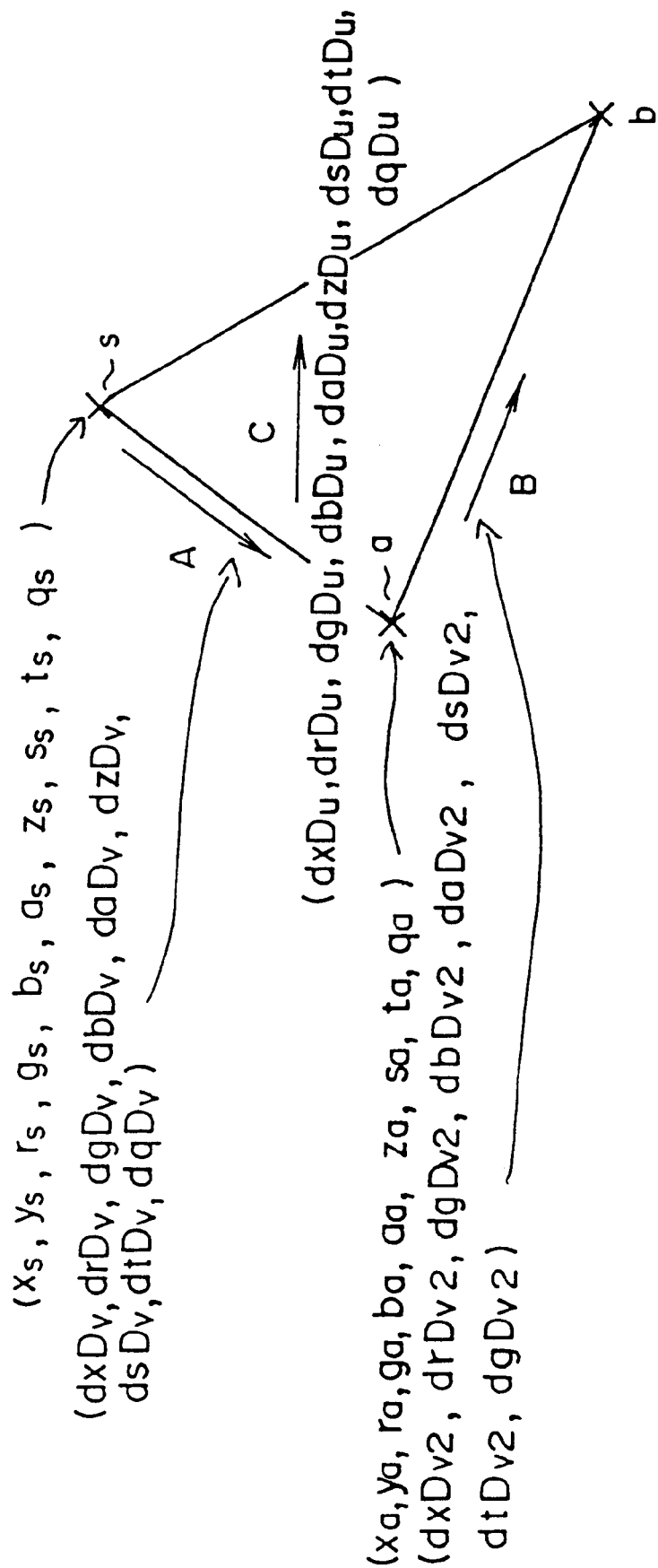
FIG. 7 is a diagram which explains the operation in the first embodiment during the rasterization process.

FIGS. 7 through 10 explain an operation according to the first embodiment during the rasterization process. FIG. 7 is a diagram which explains data supplied when a triangle is rendered and a procedure of processing the data.

As shown in FIG. 7, when a triangle is rendered, pixel data (xs, ys, rs, gs, bs, αs, zs, ss, ts, qs) and (xa, ya, ra, ga, ba, za, sa, ta, qa) for two vertices s and a are provided. Also provided are: increments (dxDv, drDv, dgDv, dαDv, dzDv, dsDv, dtDv, dqDv) given in the A direction indicated by the arrow, that is, from the vertex s toward the vertex a; increments (dxDv$_2$, drDv$_2$, dgDv$_2$, dbDv$_2$, dzDv$_2$, dsDv$_2$l dtDv$_2$, dqDv$_2$) given in the B direction indicated by the arrow, that is, from the vertex a to the third vertex b; and increments (dxDu, drDu, dgDu, dbDu, daDu, dzDu, dsDu, dtDu, dqDu) given to the endpoints in the C direction indicated by the arrow, the endpoints being determined by the pixel data for the vertices s and a and by the increments in the A direction. Drawing of the triangle is achieved by interpolating the pixels on the basis of these values.

The microprogram execution part 19 calculates the endpoints between the vertex s and the vertex a (in the A direction indicated by the arrow) on the basis of the pixel data for the vertex s and on the basis of the increments. For each calculation of an endpoint, the DDA part 23 of the dedicated graphic hardware part 18 determines pixel data for the interior of the polygon on the basis of the pixel data for the endpoint calculated by the microprogram execution part 19 and on the basis of the increments in the C direction indicated by the arrow.

After calculating the endpoints between the vertex s and the vertex a, the microprogram execution part 19 calculates the endpoints between the vertex a and the vertex b on the basis of the pixel data for the vertex a and the increments in the B direction indicated by the arrow. For each calculation of an endpoint, the DDA part 23 of the dedicated graphic hardware part 18 determines pixel data for the interior of the polygon for which the interpolation process is executed, on the basis of the pixel data of the endpoints and on the basis of the increments in the C direction indicated by the arrow.

Figure 8:
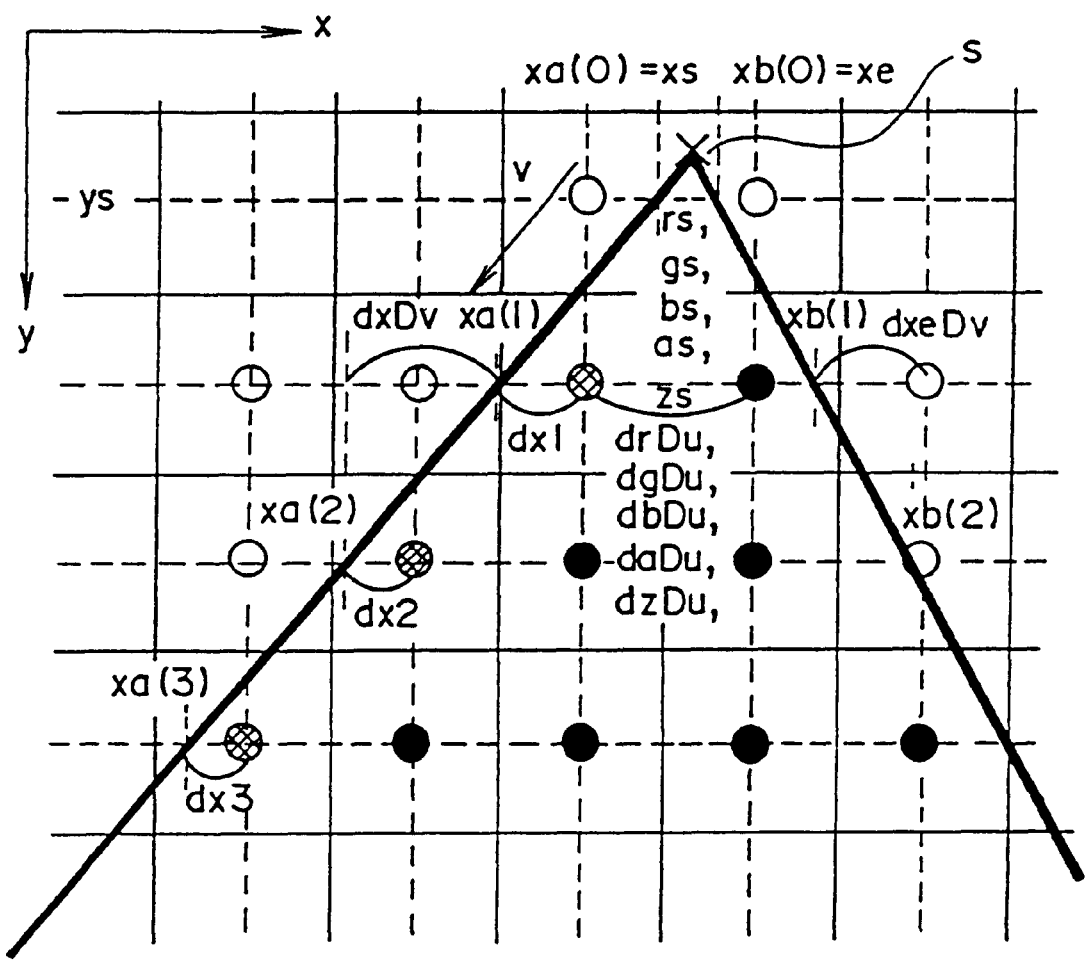
FIG. 8 is a diagram which explains the operation in the first embodiment during the rasterization process.

FIG. 8 is a diagram which explains an endpoint calculation process and an interpolation process.

When it is requested that sides indicated by the solid line shown in FIG. 8 in relation to the coordinate system be rendered, the data for the vertices and the data for the pixels do not coincide with each other. In this case, correction calculation is required so that the pixels inside the sides are rendered.

Such a correction calculation is executed when the microprogram execution part 19 calculates the endpoints.

The calculation of the endpoints is described below.

Coordinates xa and xb that are adjacent to the X coordinate (Sx) of the vertex s are determined.

xa (0)=xs xb (0)=xe

Since xa(0) and xb(0) are outside the polygon, they are not rendered. The endpoints below the vertex s are determined in the following manner.

The y coordinate is ys(n)=ys(n−1)+1

This value is sequentially incremented so that coordinate points at which a pixel resides are obtained.

The X coordinate of a point removed from the vertex s in a positive direction is given by xb(n) xb(n−1)+dxeDv The X coordinate of a point removed from the vertex s in a negative direction is given by xa(n)=xa(n−1)+dxDv The other coordinate values are obtained in a similar manner.

ra(n)=ra(n−1)+drDv
ga(n)=ga(n−1)+dgDv
ba(n)=ba(n−1)+dbDv
aa(n)=aa(n−1)+daDv
za(n)=za(n−1)+dzDv
sa(n)=sa(n−1)+dsDv
ta(n)=ta(n−1)+dtDv
qa(n)=qa(n−1)+dqDv

On the basis of the corrected endpoint values calculated in the above equations, data for the interpolated pixels is obtained.

The endpoint pixel data (initial value) is given by xu(n) (0)=xa(n)
ru(n) (0)=ra(n)
gu(n) (0)=ga(n)
bu(n) (0)=ba(n)
au(n) (0)=ba(n)
zu(n) (0)=za(n)
su(n) (0)=sa(n)
tu(n) (0)=ta(n)
qu(n) (0)=qa(n)

The data for the interpolated pixels obtained on the basis of the initial value is xu(n) (m)=xa(n) (m−1)+1
ru(n) (m)=ra(n) (m−1)+duDr
gu(n) (m)=ga(n) (m−1)+duDg
bu(n) (m)=gb(n) (m−1)+duDb
au(n) (m)=aa(n) (m−1)+duDa
zu(n) (m)=za(n) (m−1)+duDz
su(n) (m)=sa(n) (m−1)+duDs
tu(n) (m)=ta(n) (m−1)+duDt
qu(n) (m)=qa(n) (m−1)+duDq The pixels wherein xu(n) (m)<xb(n) are rendered.

Figure 9:
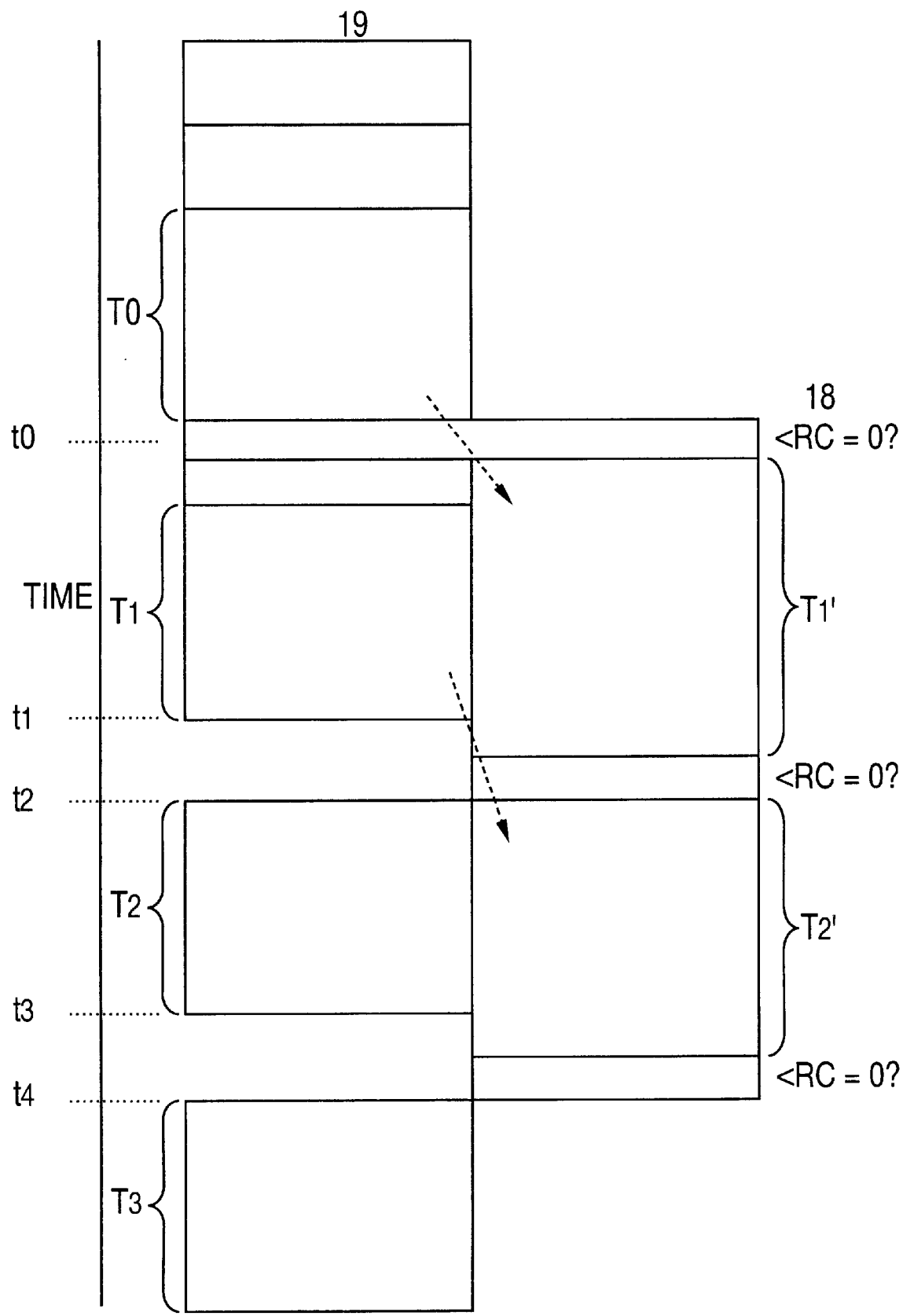
FIG. 9 is a diagram which explains the operation in the first embodiment during the rasterization process.

FIG. 9 is a timing chart for a DDA process during the rasterizing process.

It takes a period of time $T_0$ for the microprogram execution part 19 to complete an endpoint correction calculation. At a time $t_0$ at which the calculation is completed, pixel data for the first endpoint is supplied to the dedicated graphic hardware part 18. On the basis of the endpoint pixel data supplied by the microprogram execution part 19, calculation of data for interpolated pixels is started at the time $t_0$ and takes a period of time $T_1'$. When supplying the dedicated graphic hardware part 18 with the pixel data for the first endpoint, the microprogram execution part 19 starts to out a next endpoint correction calculation at the time $t_0$. Supposing that the microprogram execution part 19 completes the calculation at a time $t_1$, the microprogram execution part 19 stands by for a completion of the interpolation process by the dedicated graphic hardware 18. At a time $t_2$ when the process by the dedicated graphic hardware part 18 is completed and a notification of the completion of the interpolation process is provided, the microprogram execution part 19 supplies endpoint pixel data calculated during a period of time $T_1$ from the time $t_0$ to the time $t_1$ to the dedicated graphic hardware part 18.

Thereafter, similarly to the above-described sequence, while the dedicated graphic hardware part 18 calculates the data for the interpolated pixels on the basis of the endpoint pixel data calculated during the previous process by the microprogram execution part 19, the endpoint pixel data used by the dedicated graphic hardware part 18 during the next process is calculated by the microprogram execution part 19.

Figure 10:
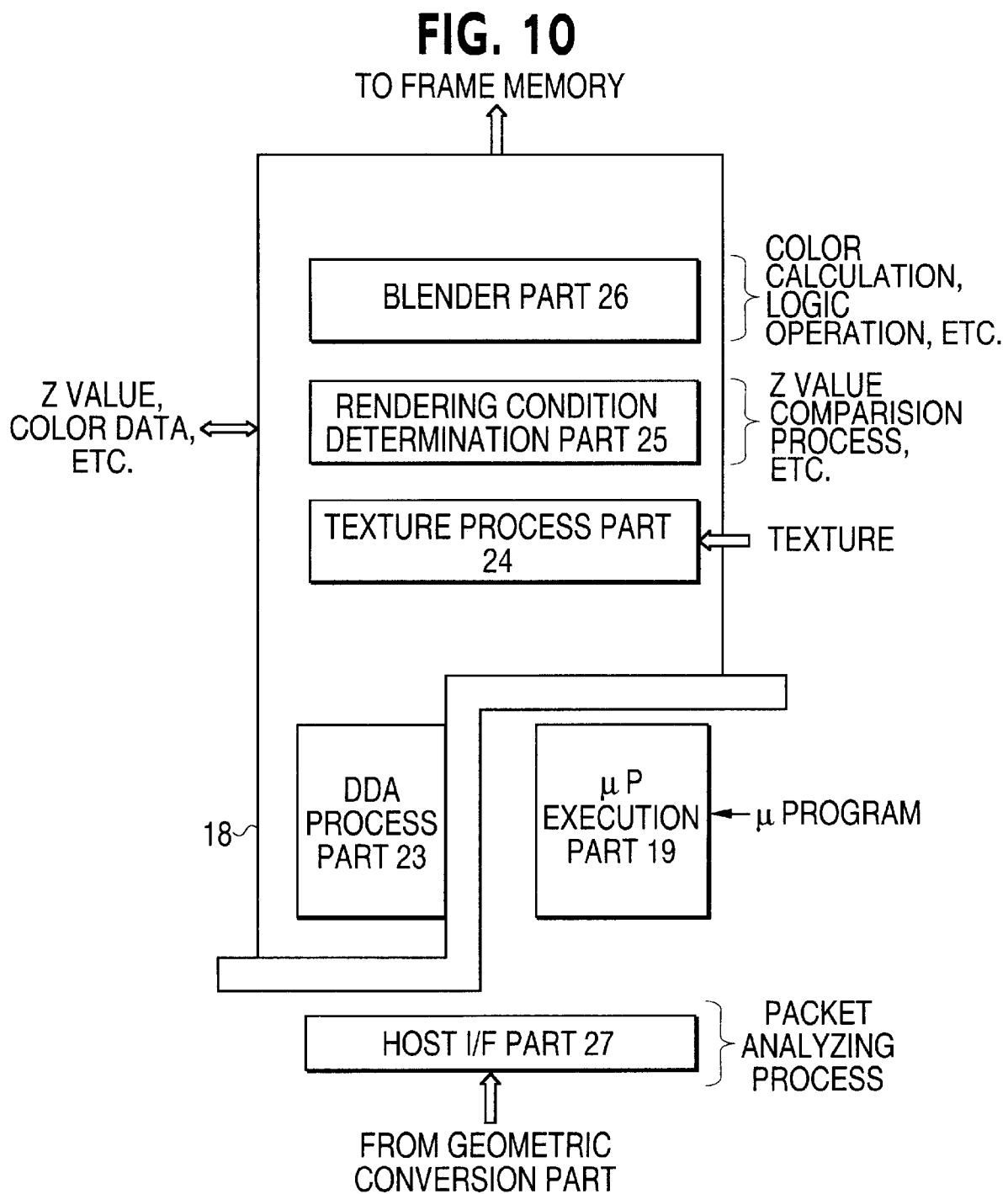
FIG. 10 is a diagram which explains the operation in the first embodiment during the rasterization process.

FIG. 10 is a diagram showing a data flow according to the first embodiment. Packet data which has only been subjected to geometric conversion is supplied by the host computer 12 and subjected to packet analysis by the host I/F part 27. While the microprogram execution part 19 carries out the endpoint correction calculation, the DDA part 23 calculates the corrected endpoint and executes a calculation for interpolation.

The data for the interpolated pixels is used by the texture process part 24 to execute the texture process. After the rendering condition determination part 25 makes a rendering condition determination including the Z value comparison process etc., the blender part 26 executes a color calculation and a logic operation. The pixel data thus obtained (X, Y, Z, R, G, B, α, D, S, T, Q) is stored in the local memory 15. Only the color data (R, G, B, α) is; stored in a portion of the frame memory 14 which portion corresponds to the coordinates (X, Y).

By causing the microprogram execution part 19 and the dedicated graphic hardware part 18 parallel with each other so as to perform the endpoint calculation and the interpolation process, rendering of an image can be done efficiently.

While it is assumed in the embodiment described above that the microprogram execution part 19 executes the endpoint correction calculation, the function of the microprogram execution part 19 is not, limited to this. A microprogram stored in the local memory 15 can process audio data or the like so that the information processing apparatus is adapted for multimedia.

Figure 11:
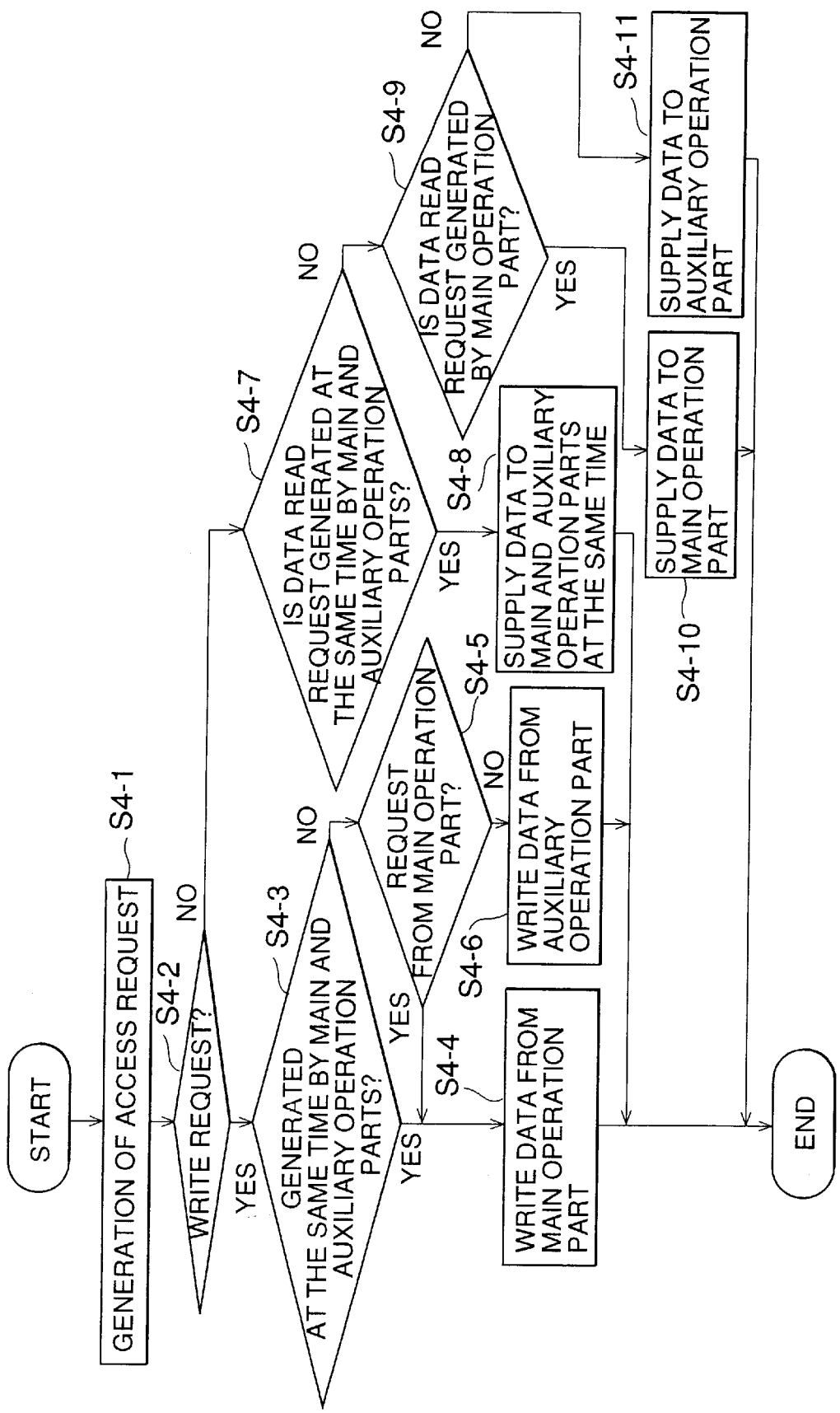
FIG. 11 is a flowchart showing an operation of the main and auxiliary operation parts of accessing a shared register according to the first embodiment.

FIG. 11 is a flowchart showing an operation of the main and auxiliary operation parts of accessing the shared register according to the first embodiment.

The access to the shared register is controlled such that, when an access request is generated, a determination is made as to whether it is a write request or a read request (steps S4-1, 4-2).

When a write request is generated by the main and auxiliary operation parts 30 and 31 at the same time, data from the main operation part 30 is written to the shared register 32, and data from the auxiliary operation part 31 is ignored (steps S4-3, 4-4).

If the write request is only from the main operation part 30, data from the main operation part 30 is written to the shared register 32 (steps S4-5, S4-4). If the write request is only from the auxiliary operation part 31, data from the auxiliary operation part 31 is written to the shared register:32 (step S4-6).

When a read request is generated by the main and auxiliary operation parts 30 and 31 at the same time, data written in the shared register 32 is supplied to both the main and auxiliary operation parts 30 and 31. When the read quest is from one of the operation parts, the data in the shared register 32 is supplied to the requesting operation part (steps S4-7, S4-11).

Figure 12A:
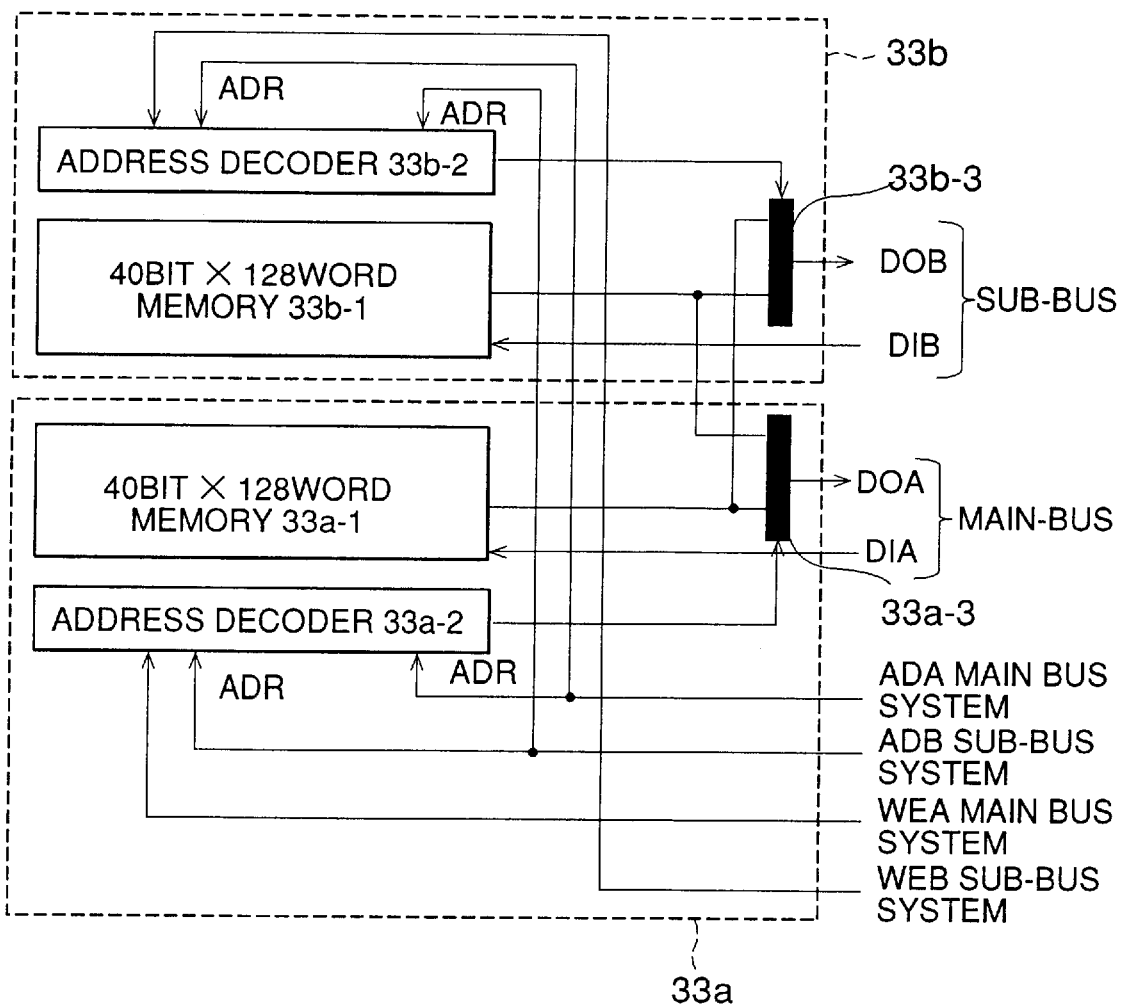
FIGS. 12A through 12D are diagrams which explain a shared memory according to the first embodiment.
Figure 12B:
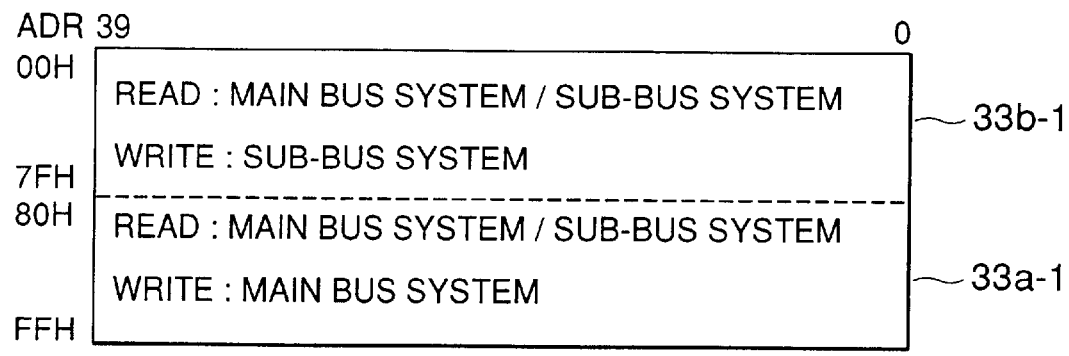
Figure 12C:
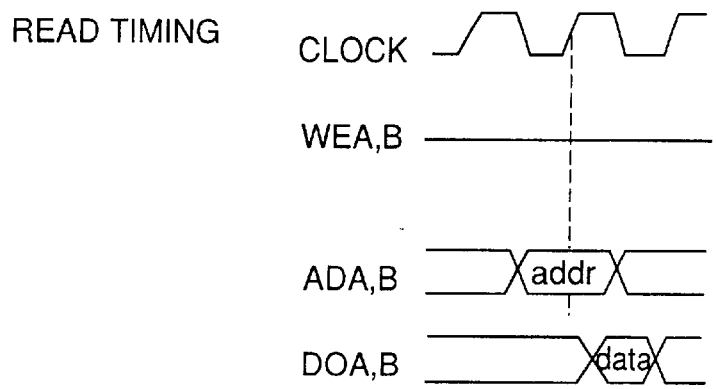
Figure 12D:
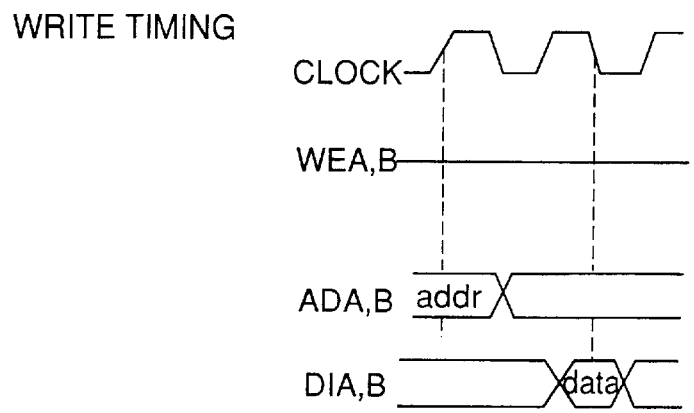

FIGS. 12A through 12D are diagrams which explain the shared memory 33 according to the first embodiment. FIG. 12A shows a construction of the shared memory 33. FIG. 12B shows a distribution of data in the shared memory 33. FIG. 12C shows a read timing in the shared memory 33. FIG. 12D shows a write timing in the shared memory 33.

The shared memory 33 comprises a main bus system memory part 33a which is connected to the main bus MB and enables writing of data processed via the main bus MB, and a sub-bus system memory part 33b which is connected to the sub-bus SB and enables writing of data processed via the sub-bus SB.

For example, the main bus system memory part 33a comprises a 40-bit, 128-word memory 33a-1, an address decoder 33a-2 for controlling access to the memory 33a-1. The sub-bus system memory part 33b comprises a 40-bit, 128-word memory 33b-1, an address decoder 33b-2 for controlling access to the memory 33b-1. The main bus system memory 33a also comprises a gate part 33a-3 and the sub-bus system memory 33b also comprises a gate part 33b-3. The gate part 33a-3 and 33b-3 switch their output from the data read from the memory 33a-1 to the data read from the memory 33b-1 and vice versa, in accordance with a control signal from the address decoders 33a-2 or 33b-2.

The address decoders 33a-2 and 33b-2 are supplied with an actuator from the main bus MB and the sub-bus SB. The address decoder 33a-2 is supplied with a write control signal WEA of the main bus system. The address decoder 33b-2 is supplied with a write control signal WEB of the sub-bus system. The address decoder 33a-2 is configured to control writing of data from the main bus MB only. The address decoder 33b-2 is configured to control writing of data from the sub-bus SB only.

Assuming that addresses 00H–FFH (in hexadecimal) are set in the shared memory 33, the addresses 00H–7FH are assigned to the memory 33b-1 as shown in FIG. 12B, and the addresses 80H–FFH are assigned to the memory 33a-1. The write data from the main bus MB is supplied to the memory 33a-1, and the write data from the sub-bus SB is supplied to the memory 33b-1. The read data is supplied to the main bus MB and the sub-bus SB via the gates 33a-3 and 33b-3.

The timing of data writing and reading is as shown in FIGS. 12C and 12D.

The gates 33a-3 and 33b-3 are supplied with an output switch signal from the address decoders 33a-2 and 33b-2, respectively. When the target address is not the one managed by the address decoder 33a-2, the address decoder 33a-2 controls the gates 33a-3 to output data of the memory 33b. When the target address is not the one managed by the address decoder 33b-2, the address decoder 33b-2 controls the gates 33b-3 to output data of the memory 33a.

The memory 33a is configured to enable writing from the main bus (MB) system only, and the memory 33b is configured to enable writing from the sub-bus (SB) system only. Reading of data from the memories 33a and 33b is possible both from the main bus MB and the sub-bus SB.

With this construction, no contention occurs between writing of data from the main bus MB and writing of data from the sub-bus SB. Since reading of data can be performed both in the memory 33a and the memory 33b, there occurs no contention between an access to the memory 33a and an access to the memory 33b. In this way, data processing can be executed efficiently both in the main operation part 30 and in the auxiliary operation part 31.

The shared memory 33 is able to access corresponding parts of the main and auxiliary operation parts 30 and 31 to read data therefrom. Hence, it is possible to supply the data operated in the main operation part 30 to the auxiliary operation part 31, and to supply the data operated in the auxiliary operation part 31 to the main operation part 30.

Thus, it is possible for the main operation part 30 and the auxiliary operation part 31 to share the data, thus enabling an efficient data processing.

Figure 13:
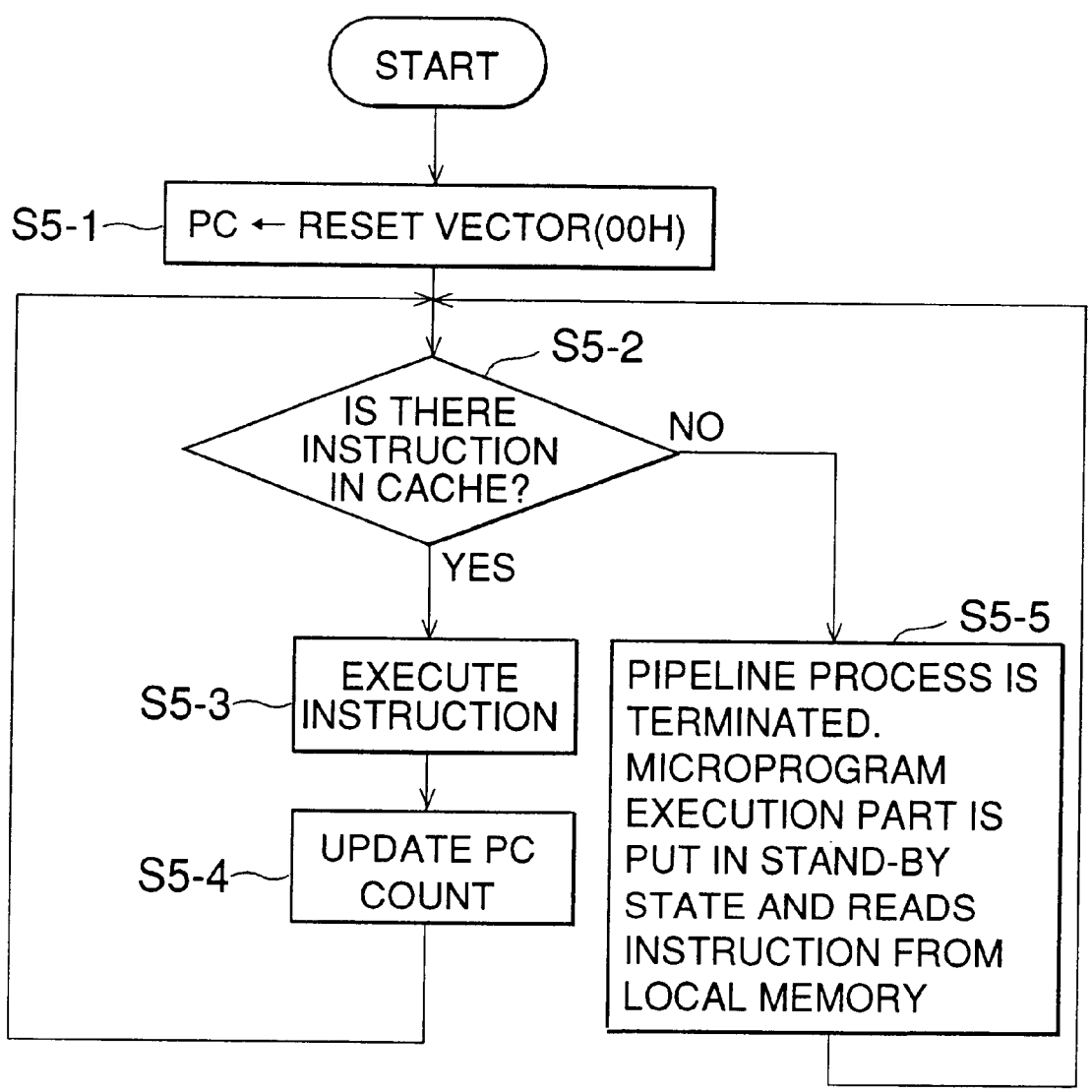
FIG. 13 is a flowchart showing a program execution operation of the microprogram execution part according to the first embodiment.

FIG. 13 is a flowchart showing a program execution operation of the microprogram execution part 19 according to the first embodiment.

The microprogram execution part 19 resets a program counter PC (step S5-1). If there is an instruction in the instruction cache 29, the instruction in the instruction cache 29 is executed, whereupon the count of the PC is updated (steps S5-2–S5-4).

When the instruction cache 29 no longer contains an instruction, the pipeline process is terminated so that the microprogram execution part 19 is put in a stand-by state and reads an instruction from the local memory 15 (step S5-5).

By allowing the instruction cache 29 to retain a program, it is unnecessary to access the local memory 15 for each instruction and read the program therefrom. Therefore, there occurs no contention between reading of the microprogram and the access from the dedicated graphic hardware part 18 to the local memory 15 during an execution of the program. In this way, data process can be efficiently carried out.

Figure 14:
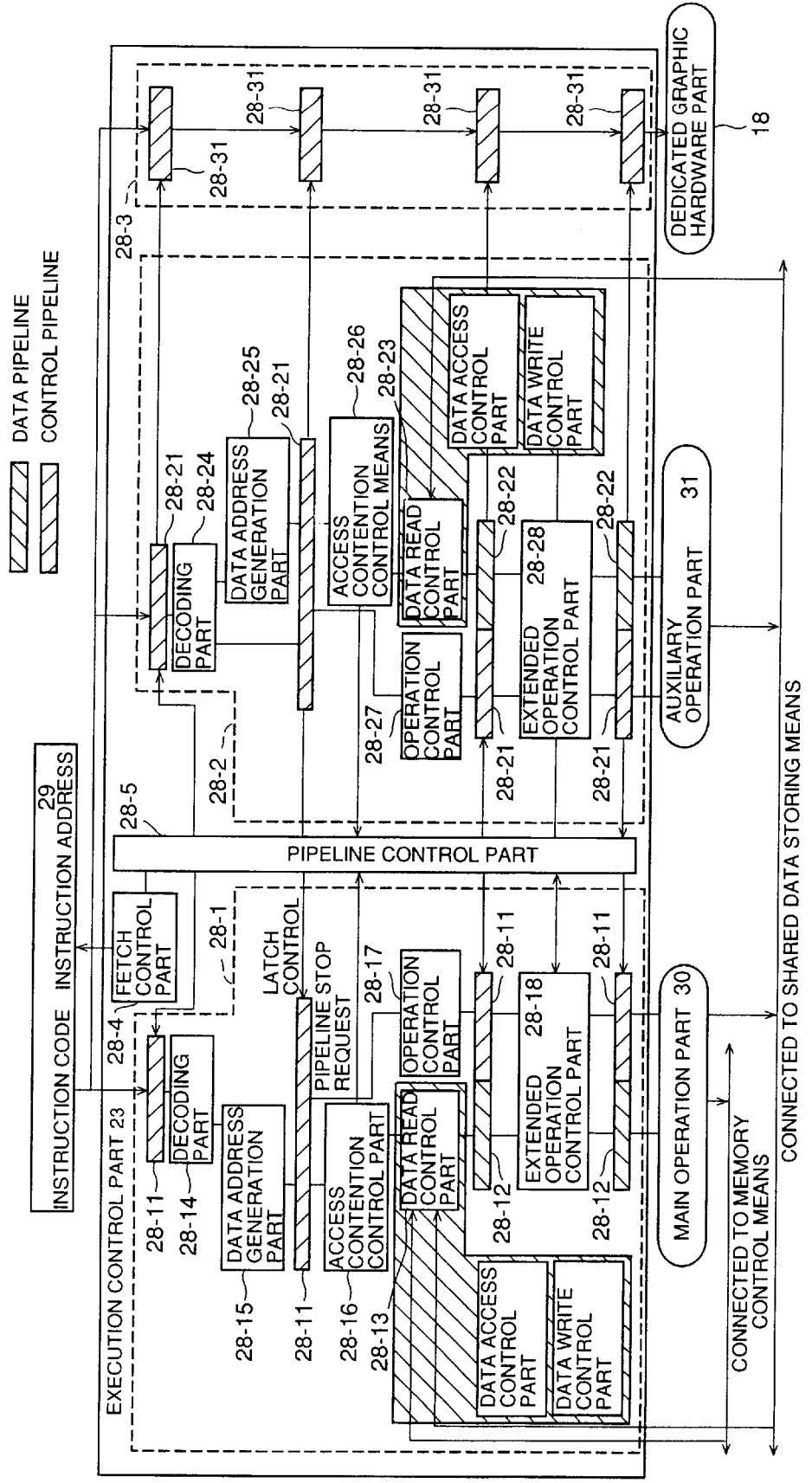
FIG. 14 shows a construction of the execution control part of the first embodiment.

FIG. 14 shows a construction of the execution control part 28 of the first embodiment.

The execution control part 28 corresponds to execution control means and comprises a main operation control part 28-1 that corresponds to first execution control means, an auxiliary operation control part 28-2 that corresponds to second execution control means, a dedicated graphic hardware control part 28-3 that corresponds to third execution control means, a fetch control part 28-4 for controlling fetching of an instruction from the instruction cache 29, and a pipeline control part 28-5 for controlling the operation of the dedicated graphic hardware control part 28-3.

The main operation control part 28-1 comprises a control pipeline part 28-11 for controlling the flow of information, a decoding part 28-14 for decoding an instruction code from the instruction cache 29, a data pipeline 28-12 for controlling the flow of data, a data access control part 28-13 for controlling access to the shared register 32 and the shared memory 33, a data address generation part 28-15 for generating data address, an access contention control part 28-16 for generating a pipeline stop request signal for controlling contention of accesses in accordance with the data address generated by the data address generation part 28-15, an operation control part 28-17 for controlling the operation in accordance with the instruction code, and an extended operation control part 28-18 for controlling the flow of data during an extended operation. The auxiliary operation control part 28-2 comprises a control pipeline part 28-21 for controlling the flow of information, a decoding part 28-24 for decoding an instruction code from the instruction cache 29, a data pipeline 28-22 for controlling the flow of data, a data access control part 28-23 for controlling access to the shared register 32 and the shared memory 33, a data address generation part 28-25 for generating data address, an access contention control part 28-26 for generating a pipeline stop request signal for generating contention of accesses in accordance with the data address generated by the data address generation part 28-25, an operation control part 28-27 for controlling the operation in accordance with the instruction code, and an extended operation control part 28-28 for controlling the flow of data during an extended operation. The dedicated graphic hardware control part 28-3 is constituted of control pipelines 28-31.

The main operation control part 28-1, the auxiliary operation control part 28-2 and the dedicated graphic hardware control part 28-3 control the flow of instructions and data in accordance with a signal from the pipeline control part 28-5 so that the overall operation is synchronized.

The pipeline control part 28-5 arbitrates between pipeline stop requests (pipeline extension requests) generated by the fetch control part 28-4, the access contention control parts 28-16 and 28-26, the extended operation control parts 28-18 and 28-28. The pipeline control part 28-5 supplies a latch control signal to the control pipeline part 28-11 and stops the pipeline until all the extension requests are canceled.

The stop request is generated by the fetch control part 28-4 when a necessary program is not found in a cache memory, and when a read operation is activated from an external memory (in other words, when a so-called cache mis-hit occurs).

The stop request is generated by the access contention control part 28-16 or 28-26 when there is an extension in time for an execution of an access to the external memory, or when a read operation and a write operation occur at the same time in the R and E stages, respectively.

The stop request is generated by the extended operation control part 28-18 or 28-28 when an instruction whose execution is not completed in one cycle, such as a conditional instruction, a store instruction or a multiplication instruction, is executed.

Figure 15:
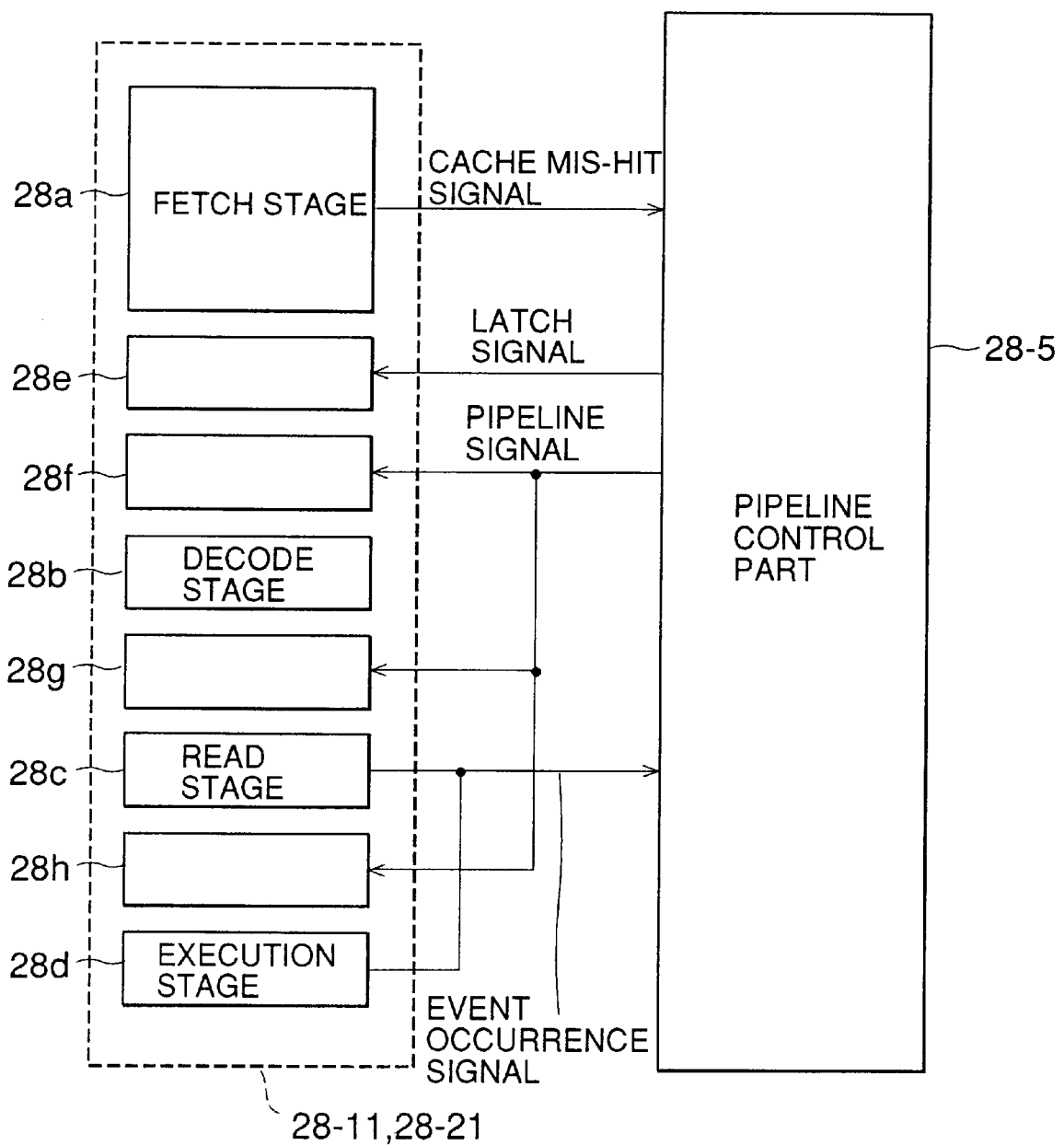
FIG. 15 is a diagram which explains the pipeline control operation of the execution control part according to the first embodiment.

FIG. 15 is a diagram which explains the operation of the pipeline control part 28-5. FIG. 15 is a functional block diagram that corresponds to a part of the block diagram of FIG. 14. The fetch control part 28-4 of FIG. 14 corresponds to a fetch stage 28*a*; the decoding parts 28-14 and 28-24, and the data address generation parts 28-15 and 28-25 correspond to a decode stage 28*b*; the access contention control parts 28-16 and 28-26, and the data access control parts 28-13 and 28-23 correspond to a read stage 28*c*; the operation control parts 28-17 and 28-27, the extended operation control parts 28-18 and 28-28, the main operation part 30, and the auxiliary operation part 31 correspond to an execution stage 28*d*; the control pipeline part 28-11 corresponds to control pipelines 28*e*, 28*f*, 28*g* and 28*h*, the control pipelines 28*e* and 28*f* being provided between the stages 28*a* and 28*b*, the control pipelines 28*g* being provided between the stages 28*b* and 28*c*, and the control pipeline 28*h* being provided between the stages 28*c* and 28*d*.

The fetch stage 28*a* reads an instruction from an address indicated by the PC (program counter).

The decode stage 28*b* executes a generation of the address for instruction execution and for data access.

The read stage 28*c* reads data from a register, a memory etc.

The execution stage 28*d* executes an operation and writing of data to the register, the memory etc.

Between the fetch stage 28*a* and the decode stage 28*b* are disposed the control pipeline 213e comprising a transparent latch, and the control pipeline 28*f* comprising a D flip-flop. The instruction fetched by the fetch stage 28*a* is latched by a latch control signal (Latch EN) from the pipeline control part 28-5. In response to the pipeline stop request from the pipeline control part 28-5, the instruction supplied to the decode stage 28*b* is placed in a preceding state.

Between the decode stage 28*b* and the read stage 28*c* is disposed the control pipeline 28*g* comprising a D flip-flop. Between the read stage 28*c* and the execution stage 28*d* is disposed the control pipelines 28*h* comprising a D flip-flop. In response to the pipeline stop request from the pipeline control part 28-5, the instruction supplied to the read stage 28*c* and the execution stage 28*d* is placed in a preceding state by the control pipelines 28*g* and 28*h*, respectively.

Figure 16:
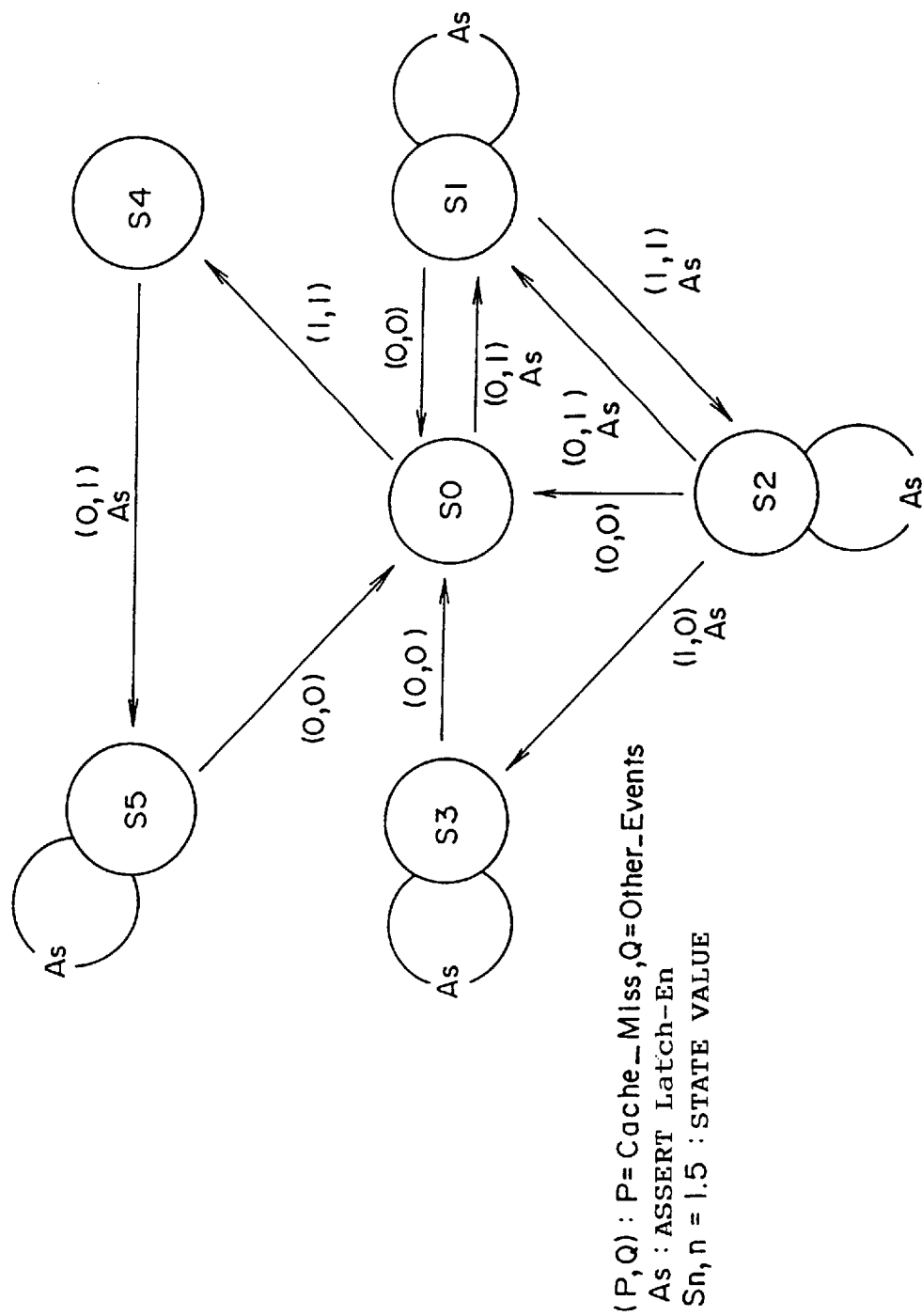
FIG. 16 is a diagram which explains the operation of the execution control part according to the first embodiment.

FIG. 16 is a diagram showing phase transition of the execution control part 28. FIGS. 17 through 20 are diagrams which explain the operation of the execution control part 28. Referring to FIG. 16, S0–S5 denotes different functions. The left entry in the parentheses (0, 0), (0, 1), (1, 0), (1, 1) denotes the value of P, and the right entry denotes the value of Q. That P is 0 indicates an absence of a cache miss and that P is 1 indicates a presence of a cache miss. That Q is 0 indicates an absence of an event and that Q is 1 indicates a presence of an event. AS denotes a state where the latch control signal (Latch EN) is asserted.

A state S0 is a state where (P, Q)=(0, 0). A state Si is a state where (P, Q)=(0, 1) resulting from a transition from the state (P, Q)=(0, 0). A state S2 is a state where (P, Q)=(1, 1) resulting from a transition from the state (P, Q)=(0, 1). A state S3 is a state where (P, Q)=(1, 0) resulting from a transition from the state (P, Q)=(1, 1). A state S4 is a state where (P, Q)=(1, 1) resulting from a transition from the state (P, Q)=(0, 0). A state S5 is a state where (P, Q)=(0, 1) resulting from a transition from the state (P, Q)=(1, 1).

Figure 17A:
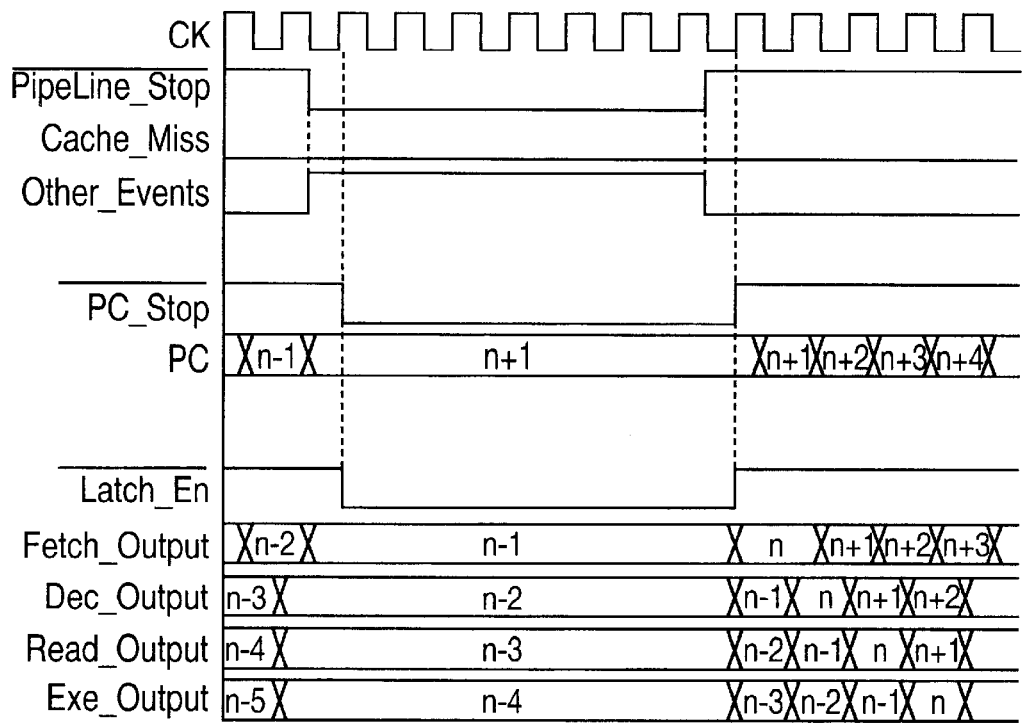
FIGS. 17A and 17B are diagrams which explain the operation of the execution control part according to the first embodiment.

FIG. 17A shows a case where only an extension request other than a cache miss is generated, that is, where the state transition to (P, Q)=(0, 1) occurs (state S0→S1). In this case, an inverted latch control signal (inverted Latch EN) becomes low so that the control pipeline 28e is stopped and put in the AS state. At the same time, an inverted pipeline stop request becomes low and the control pipelines 28f, 28g and 28h are stopped.

Figure 17B:
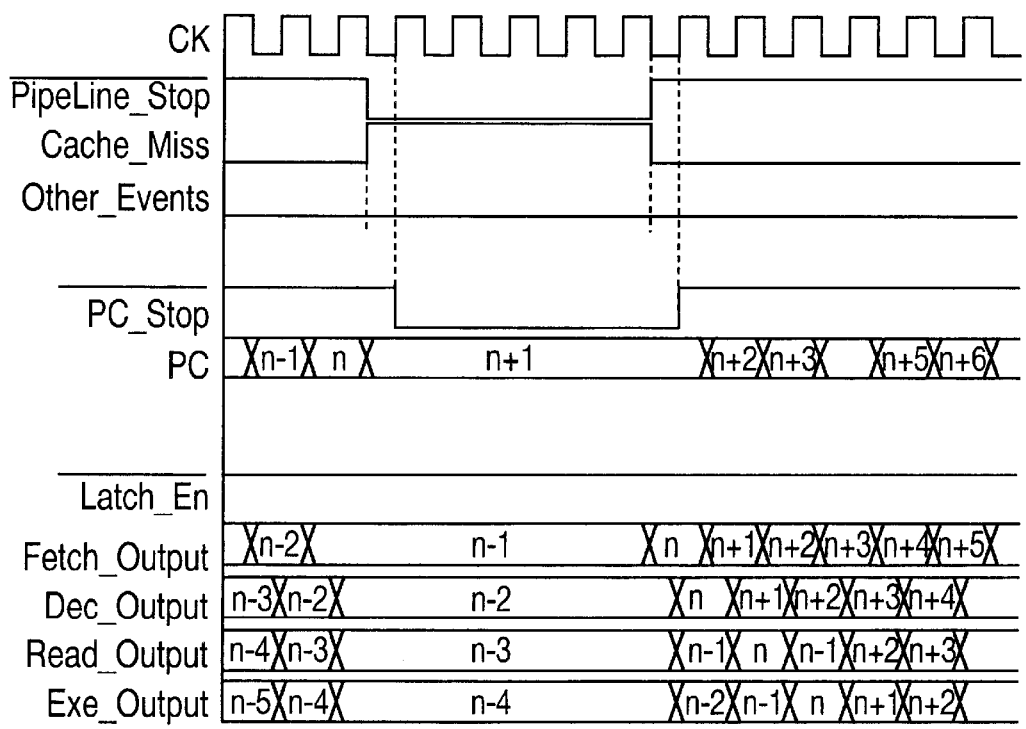

FIG. 17B shows a case where an extension request due to a cache miss is generated, that is, where the state transition to (P, Q)=(1, 0) occurs. In this case, the inverted pipeline stop request becomes low and the control pipelines 28f, 28g and 28h are stopped.

Figure 18A:
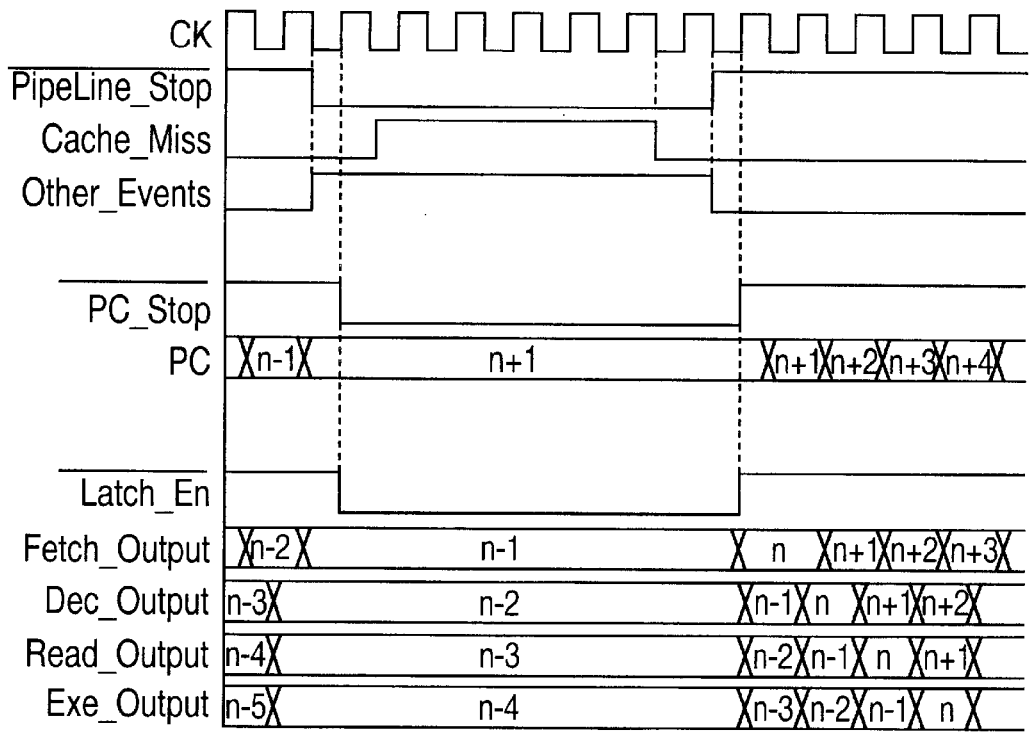
FIGS. 18A and 18B are diagrams which explain the operation of the execution control part according to the first embodiment.

FIG. 18A shows a case where an extension request other than a cache miss is generated preceding an occurrence of the cache miss by one cycle, and where the cache miss is cleared later, that is, where the state transition (P, Q)=(0, 1)→(1, 1)→(0, 1) occurs (S1→S2→S1). In this case, the same state as the state S1 is maintained. That is, the inverted pipeline stop request becomes low, the inverted latch control signal (inverted Latch EN) becomes low and the control pipelines 28e–28h are all stopped.

Figure 18B:
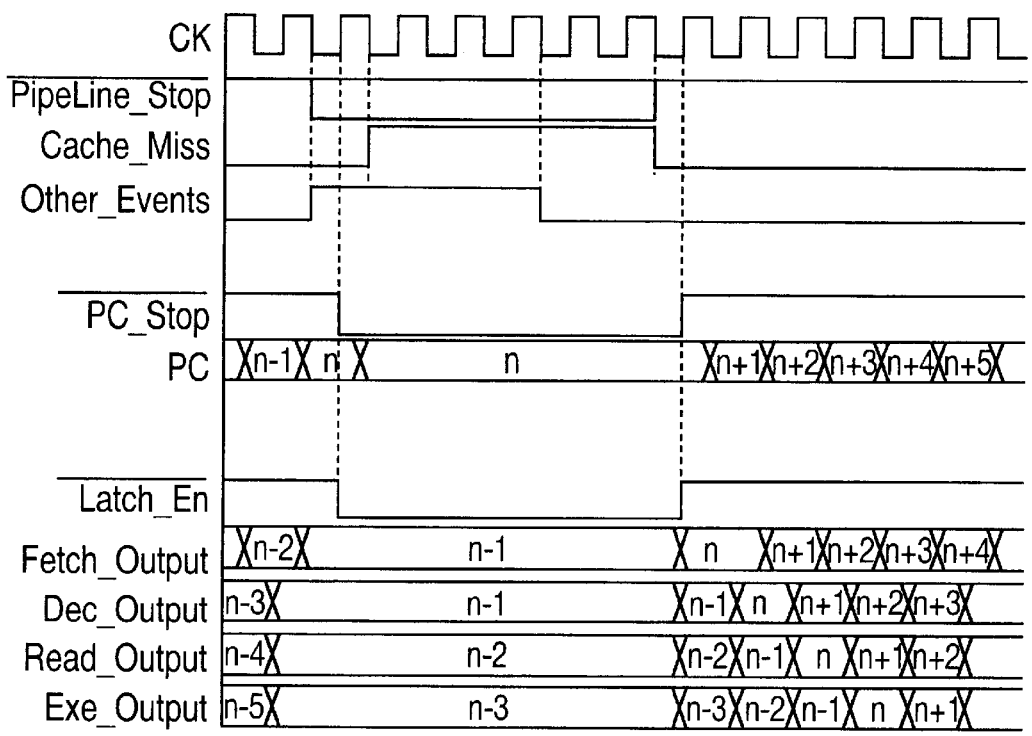

FIG. 18B shows a case where an extension request other than a cache miss is generated precedes an occurrence of the cache miss by one cycle, and where the extension request is cleared later, that is, where the state transition (P, Q)=(0, 1)→(1, 1)→(1, 0) occurs (S1→S2→S3). In this case, the same state as the state of FIG. 18A is maintained.

Figure 19A:
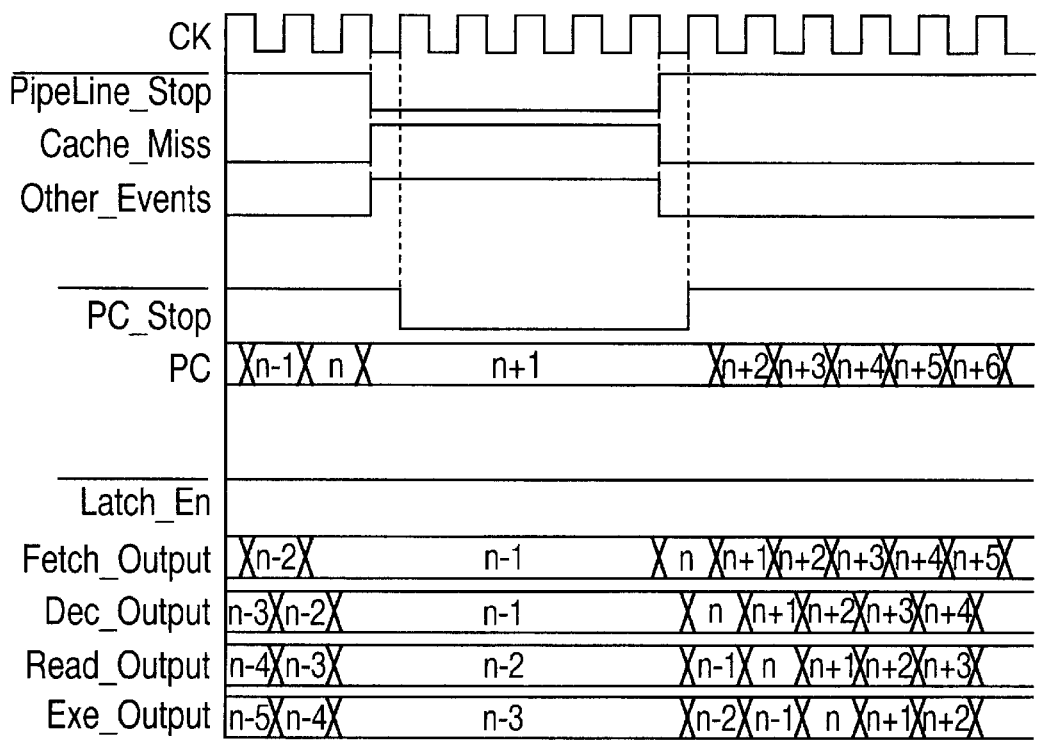
FIGS. 19A and 19B are diagrams which explain the operation of the execution control part according to the first embodiment.

FIG. 19A shows a case where a cache miss and an extension request other than the cache miss are generated at the same time and cleared at the same time, that is, where the state transition (P, Q),=(0, 0)→(1, 1)→(0, 0) occurs. In this case, only the inverted pipeline stop request becomes low, the control pipelines 28f–28h are stopped and put in a state (0, 0). At the same time, the inverted pipeline stop request becomes high, and the stop state of the control pipelines 28f–28h is cleared.

Figure 19B:
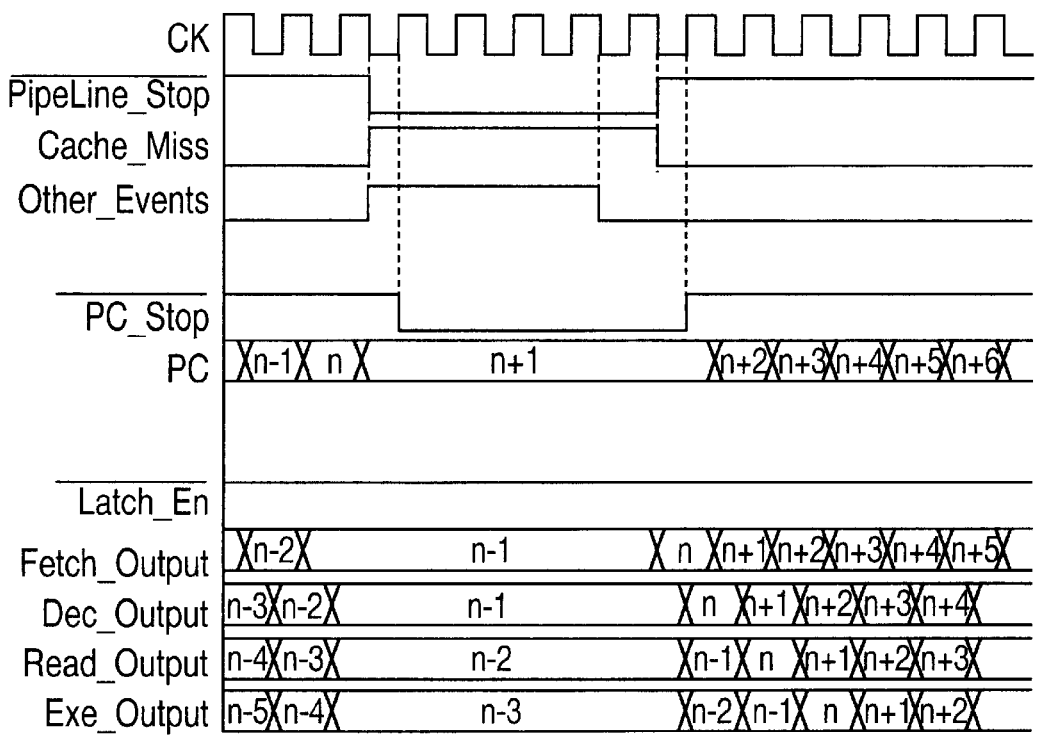

FIG. 19B shows a case where a cache miss and an extension request other than the cache miss are generated at the same time and the extension request is cleared, that is, where the state transition (P, Q)=(0, 0)→(1, 1)→(0, 1)→(0, 0) occurs. In this case, the same state as the state of FIG. 19A is maintained, the returning taking place immediately when the state (0, 0) is reached.

Figure 20A:
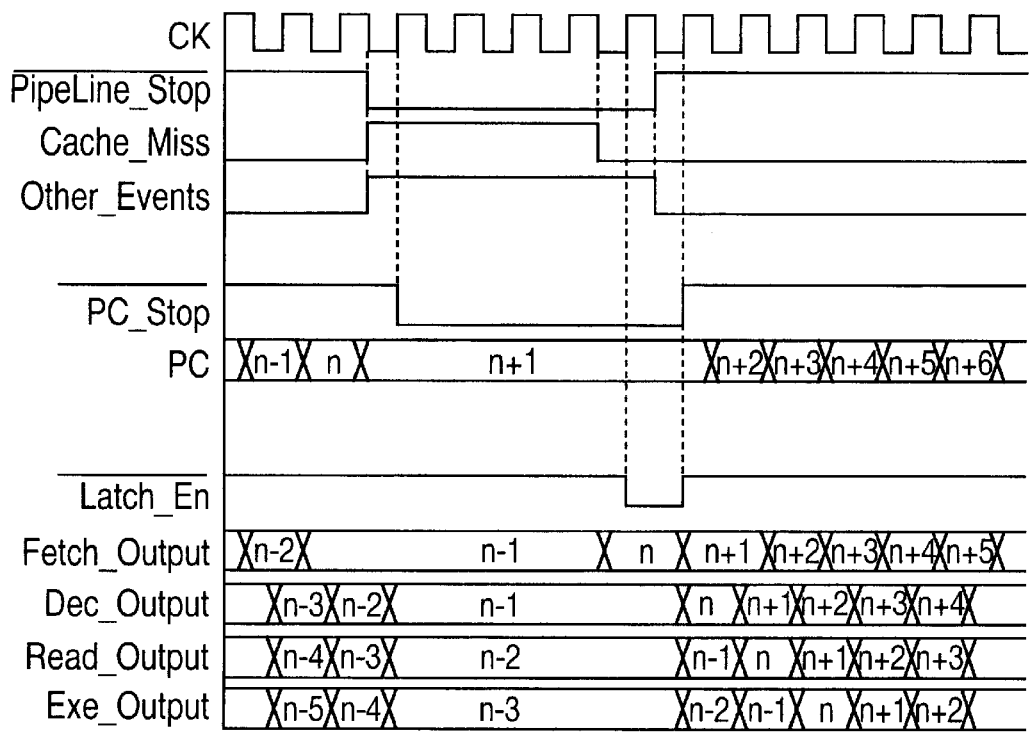
FIGS. 20A and 20B are diagrams which explain the operation of the execution control part according to the first embodiment.

FIG. 20A shows a state where a cache miss and an extension request other than the cache miss are generated at the same time, the cache miss is first cleared, and then the extension request is cleared. That is, FIG. 20A shows a case where the state transition (P, Q)=(0, 0)→(1, 1)→(0, 1)→(0, 0) occurs. In this case, when the state (P, Q)=(1, 1) is reached, the inverted pipeline stop request becomes low, and the control pipelines 28f–28h are stopped. When the state (P, Q)=(1, 1)→(0, 1) is reached, the inverted latch control signal becomes low while the control pipelines 28f–28h are still stopped. In this state, the control pipeline 28e is controlled to be latched. The returning takes place when the state (0, 0) is reached.

Figure 20B:
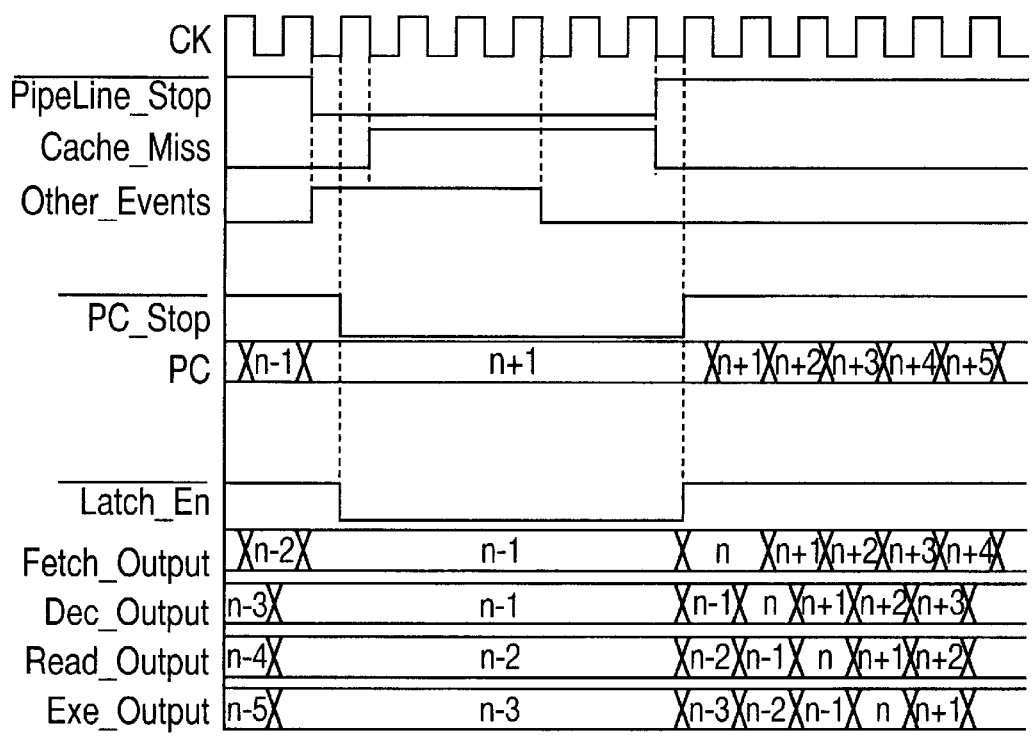

FIG. 20B shows a case where an extension request other than a cache miss is generated preceding the cache miss by one cycle, and where the cache miss and the extension request are cleared at the same time later. That is, FIG. 20B shows a case where the state transition (P, Q)=(0, 0)→(0, 1)→(1, 1)→(0, 0) occurs. In this case, when the state (P, Q)=(0, 1) is reached, the inverted latch control signal and the inverted pipeline stop request become low. The control pipelines 28e–28h are controlled to be latched. This state is maintained even when (P, Q)=(1, 1), the returning taking place when (P, Q)=(0, 0).

As has been described, the control pipelines 28f–28h can maintain the decode stage 28h, the read stage 28c and the execution stage 28d in a stand-by state. Further, it is possible for the control pipeline 28e to cause an instruction fetched by the fetch stage 28a to stand by so that the fetch stage 28a can fetch a next instruction.

Thus, it is possible for the control pipelines 28e–28h to maintain the process status of the control parts 28-1, 28-2 and 28-3 synchronized while the processes are being executed. For example, it is possible to execute three-dimensional graphic process at a high speed while the process of the above-described microprogram execution part 19 is maintained in synchronism with the process by the dedicated graphic hardware part 18.

According to this embodiment, it is possible to control the dedicated graphic hardware part 18 using a program so that the dedicated graphic hardware part 18 can perform various kinds of rendering control, memory management and memory control in a asynchronous and parallel manner. Since the way that the process is carried out is established, it is necessary to execute the process in combination with the memory. While the process itself is executed by the dedicated graphic hardware part 18, data management compatible with various applications and the processing of audio data and other media data is executed by the microprogram execution part in synchronism with the dedicated graphic hardware part. In this way, it is possible to perform a high-speed and efficient information processing.

Figure 21:
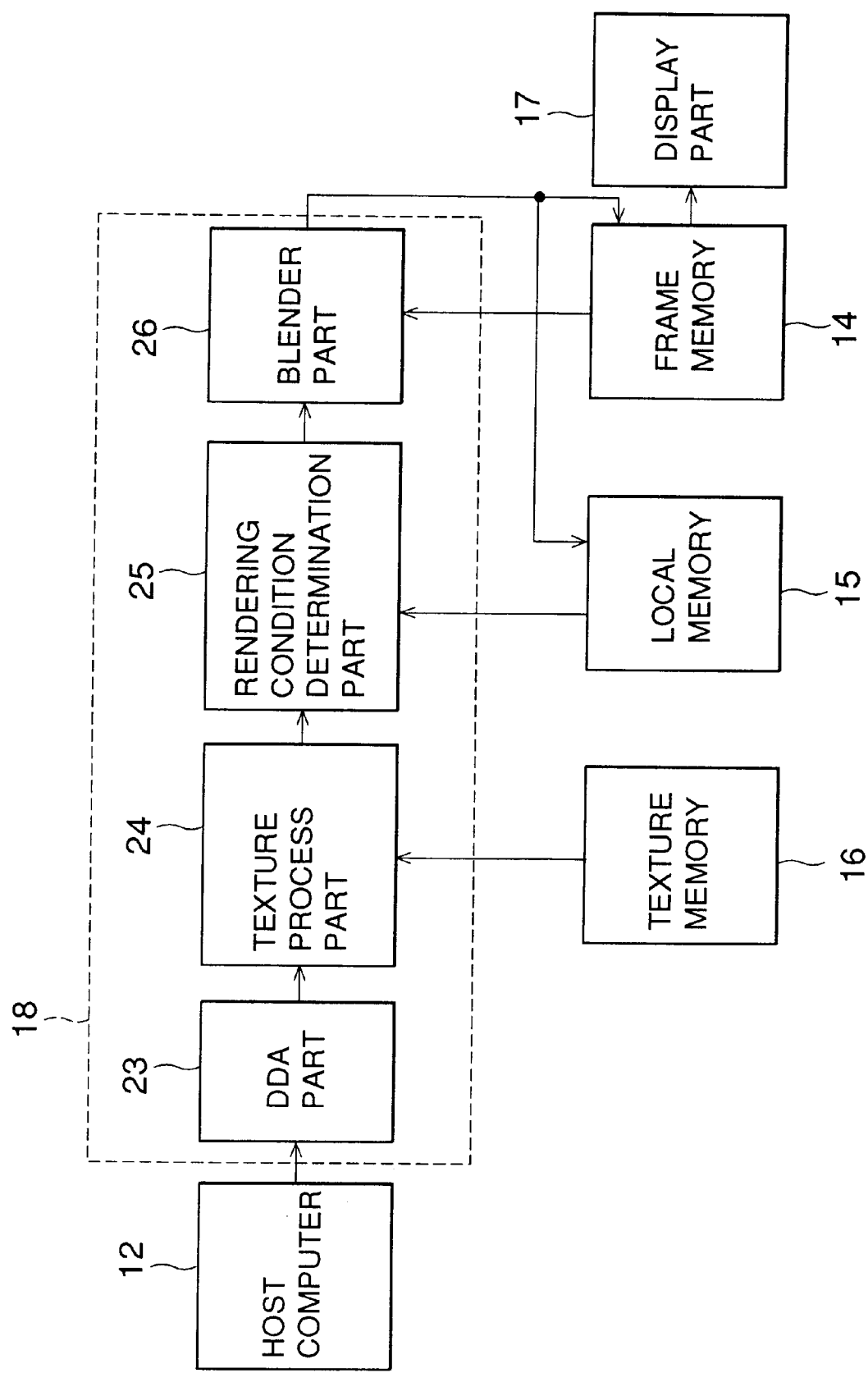
FIG. 21 is a block diagram showing a schematic construction of the dedicated graphic hardware part according to the first embodiment.

The dedicated graphic hardware part 18 shown in FIG. 3 basically has the construction shown in FIG. 21, where an illustration of the microprogram execution part 19, the frame memory control part 20, the local memory control part 21 and the texture memory control part 22 is omitted. In FIG. 21, those parts that are the same as the parts of FIG. 3 are designated by the same reference numerals and the description thereof is omitted.

As has been described, it is possible to use a memory such as an SDRAM which enables a high-speed access as the local memory 15. It is also possible to use a memory such as an SDRAM, an SRAM or a PROM which enables a high-speed access as the texture memory 16. However, a dual-port VRAM is generally used as the frame memory 14 in consideration of its connection to the display part 17. The dual-port VPRAM has a terminal dedicated to reading of data so that reading of data for display does not interfere with writing of data for generation of an image. The dual-port VRAM also a batch data writing function. However, an access speed thereof is not so high. Hence, the speed of the overall pipeline process is determined by the access speed of the frame memory 14.

This leads to an idea that a memory such as an SDRAM which enables a high-speed access be used as the frame memory 14. However, the use of an SDRAM as the frame memory 14 is not favorable in consideration of its connection to the display part 17. Specifically, the use of SDRAM causes a compatibility problem with the existing system and requires a modification in the construction of the display part 17.

In the construction shown in FIG. 21, the frame memory 14 accessed most frequently is embodied by a VRAM characterized by a relatively slow access speed. Hence, even if a memory characterized by a high-speed access is used as the local memory 15 and the texture memory 16, it is difficult to take full advantage of the high-speed memory. Further, an access wait time derived from a cause separate from any process flow such as a refresh is created in each memory. Hence, even if the local memory 15 is in a state where an access is allowed, the operation of the rendering condition determination part 25 has to wait until the operation of the texture process part 24 is completed, if the texture memory 16 is in a state where an access has to wait. In this way, the overall pipeline process is disturbed due to an access time imposed in each memory.

Accordingly, a description will now be given of an embodiment in which the speed of the overall pipeline process is increased while the compatibility with the existing system is maintained and a full advantage is taken of the high-speed memory.

Figure 22:
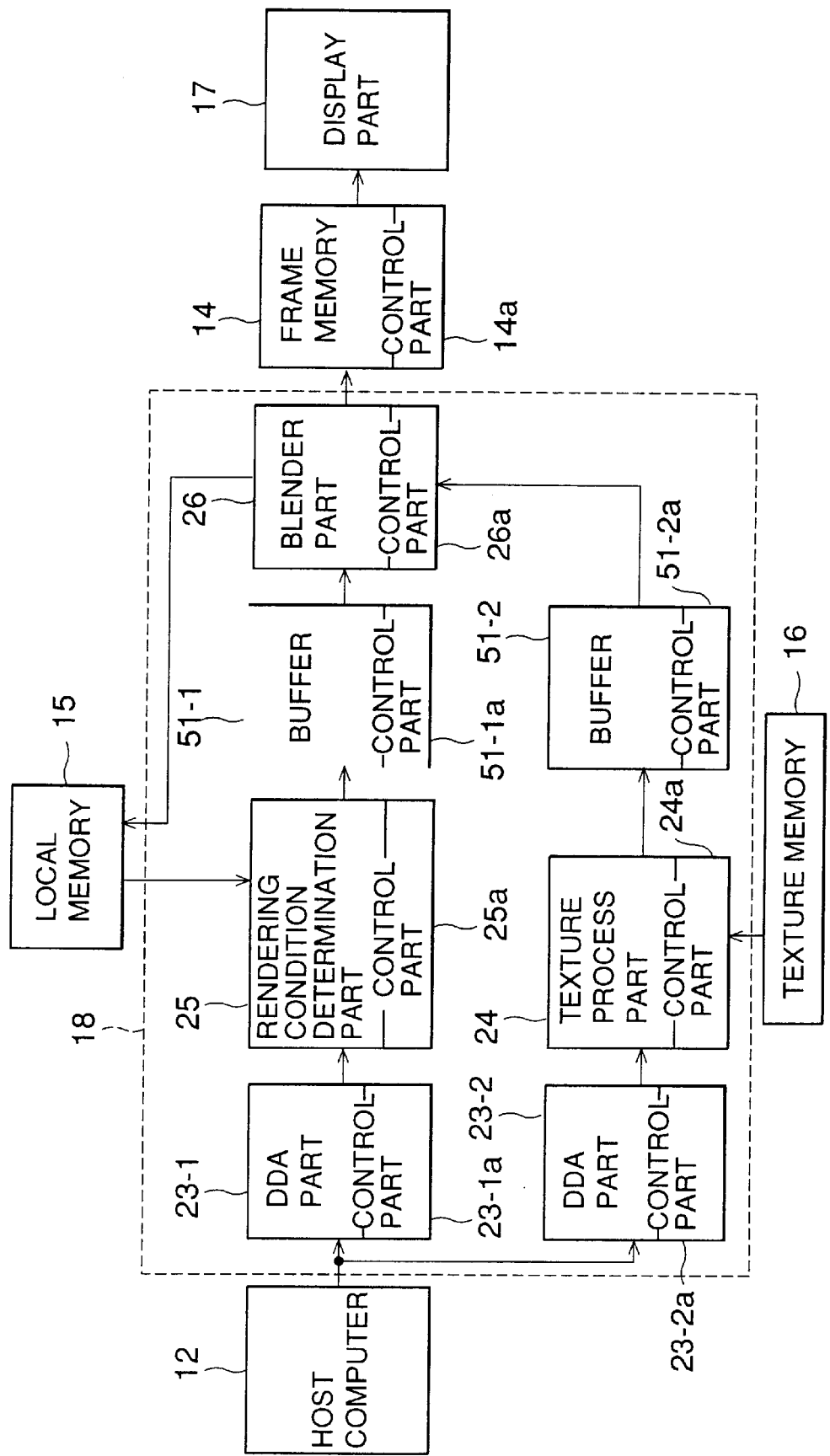
FIG. 22 is a block diagram showing a schematic construction of an important part of a second embodiment of the information processing apparatus according to the present invention.

FIG. 22 is a block diagram showing a schematic construction of an important part of a second embodiment of the information processing apparatus according to the present invention. In FIG. 22, those parts that are the same as the parts of FIG. 3 are designated by the same reference numerals and the description thereof will be omitted. In FIG. 22, a display control part for controlling the display part 17, the microprogram execution part 19, the frame memory control part 20, the local memory control memory 21 and the texture memory control part 22 are omitted from the illustration. In this embodiment, the texture process part 24 and the rendering condition determination part 25 are configured to carry out the process in a parallel manner.

The dedicated graphic hardware part 18 shown in FIG. 22 comprises DDA parts 23-1 and 23-2 having the same construction, the texture process part 24, the rendering condition determination part 25, buffers 51-1 and 51-2, and the blender part 26. The DDA parts 23-1 and 23-2 include control parts 23-1a and 23-2a, respectively, for controlling the operation thereof. The texture process part 24 includes a control part 24a for controlling the operation thereof. The rendering condition determination part 25 includes a control part 25a for controlling the operation thereof. The buffers 51-1 and 51-2 include control J parts 51-1a and 51-2a, respectively, for controlling the operation thereof. The blender part 26 includes a control part 26a for controlling the operation thereof. The frame memory 14 includes a control part 14a for controlling the operation thereof.

Figure 23:
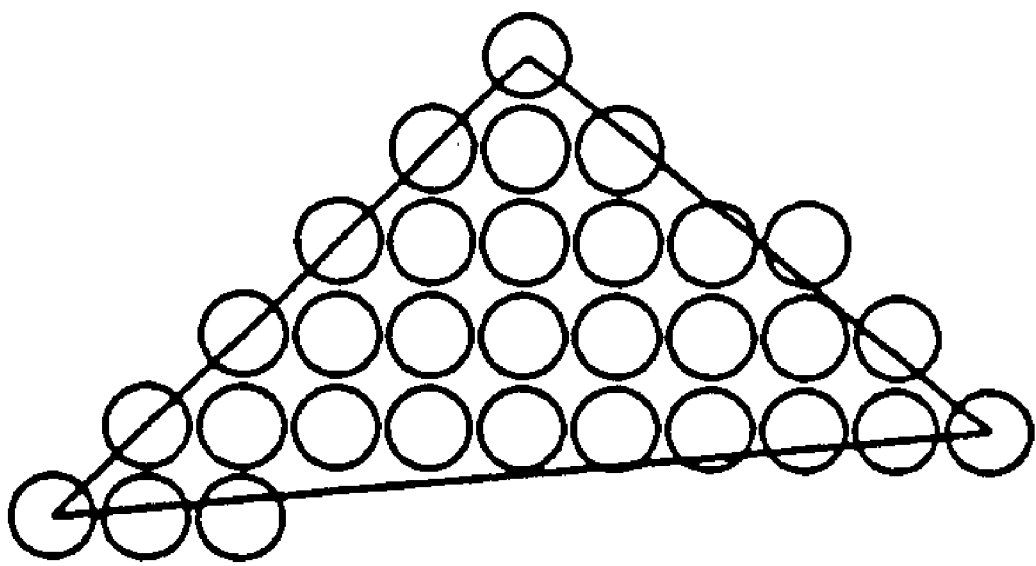
FIG. 23 is a diagram showing a polygon represented in approximation using pixels.

As shown in FIG. 23, a polygon is represented in approximation using pixels in the display part 17. The host computer 12, a host apparatus, determines a pixel from which a rendering in the horizontal direction is to be started and also calculates variations from the starting point. The host computer 12 supplies the resultant data to the DDA parts 23-1 and 23-2. On the basis of the information from the host computer 12, the DDA parts 23-1 and 23-2 make calculations to obtain data for the individual pixels rendered, whereupon the texture process part: 24, the rendering condition determination part 25 and the blender part 26 execute the following process for each pixel.

Texture data including an α value and color data prepared to paste a pattern etc. to the polygon is stored in the texture memory 16. The frame memory 14 stores color data of the polygon to be displayed in the display part 17. The local memory 15 stores user data and rendering data such as a microprogram, the color data, the α value, a Z value relating to depth. Of course, at least two of the frame memory 14, the local memory 15 and the texture memory 16 may be constituted of a single memory device.

The texture process part 24 reads texture data from the texture memory 16 and pastes a pattern to the pixels. The rendering condition determination part 25 reads depth data from the local memory 15 and makes a determination as to whether or not the pixels are to be rendered. The blender part 26 reads the depth data etc. of the pixels already rendered from the local memory and blends the read data with the color data of the pixels to be rendered, so as to obtain the final data to be written to the frame memory 14.

In this embodiment, the same color data and the α value as those stored in the frame memory 14 shown in FIG. 3 are stored in the local memory 15. The dedicated graphic hardware part 18 is only able to write to the frame memory 14. The color data and the a value that are read from the frame memory 14 in the first embodiment shown in FIG. 3 are read from the local memory 15 in this embodiment together with other data. That is, reading from the frame memory 14 is performed only by the display part 17. Since the local memory 15 is not directly connected to the display part 17, a memory such as an SDRAM that enables a high-speed access may be used as the local memory 15. As a result, even if the frame memory 14 is embodied by the dual-port VRAM as in the first embodiment of FIG. 3, a frequency of access to the frame memory 14 is about half as high as that of the first embodiment. Thus, the efficiency of the processing in the overall system can be improved.

The process by the rendering condition determination part 25 executed by accessing the local memory 15 and the process by the texture process part: 24 executed by accessing the texture memory 16 are parallel. For this reason, the rendering condition determination part 25 is capable of operating at timings optimal for the local memory 15, and the texture process part 24 is capable of operating at timings optimal for the texture memory 16.

The blender part 26 integrates the process result of the rendering condition determination part 25 and that of the texture process part 24. Thus, it is impossible to proceed with the blending process unless the blender part 26 receives the process result both from the rendering condition determination part 25 and from the texture process part 24. The processes by the rendering condition determination part 25 and the texture process part 24 are conducted in an asynchronous manner with respect to the process by the overall system. Therefore, a buffer 51-1 is provided between the blender part 26 and the rendering condition determination part 25, and a buffer 51-2 is provided between the blender part 26 and the texture process part 24.

The buffer 51-1 temporarily retains the process result of the rendering condition determination part 25. The buffer 51-1 temporarily stores data that the blender part 26 should receive, it is possible for the rendering condition determination part 25 to proceed with processing of next data, even when the process by the blender part 26 is terminated and the blender part 26 is incapable of receiving data. Similarly, the buffer 51-2 temporarily retains the process result of the texture process part 24. Since the buffer 51-2 temporarily stores data that the blender part 26 should receive, it is possible for the texture process part 24 to proceed with processing of next data, even when the process by the blender part 26 is terminated and the blender part 26 is incapable of receiving data. By configuring the buffers 51-1 and 51-2 to retain data for a plurality of pixels, it is possible to continue the process in advance of the state of the blender 26 by a margin of the plurality of pixels, irrespective of the state of the blender 26. In this way, an efficient arbitration is effected such that, while the rendering condition determination part 25 and the texture process part 24 are capable of executing the process in an asynchronous manner with respect to each other, the data is properly processed by blender part 26 in a synchronous manner.

Figure 24:
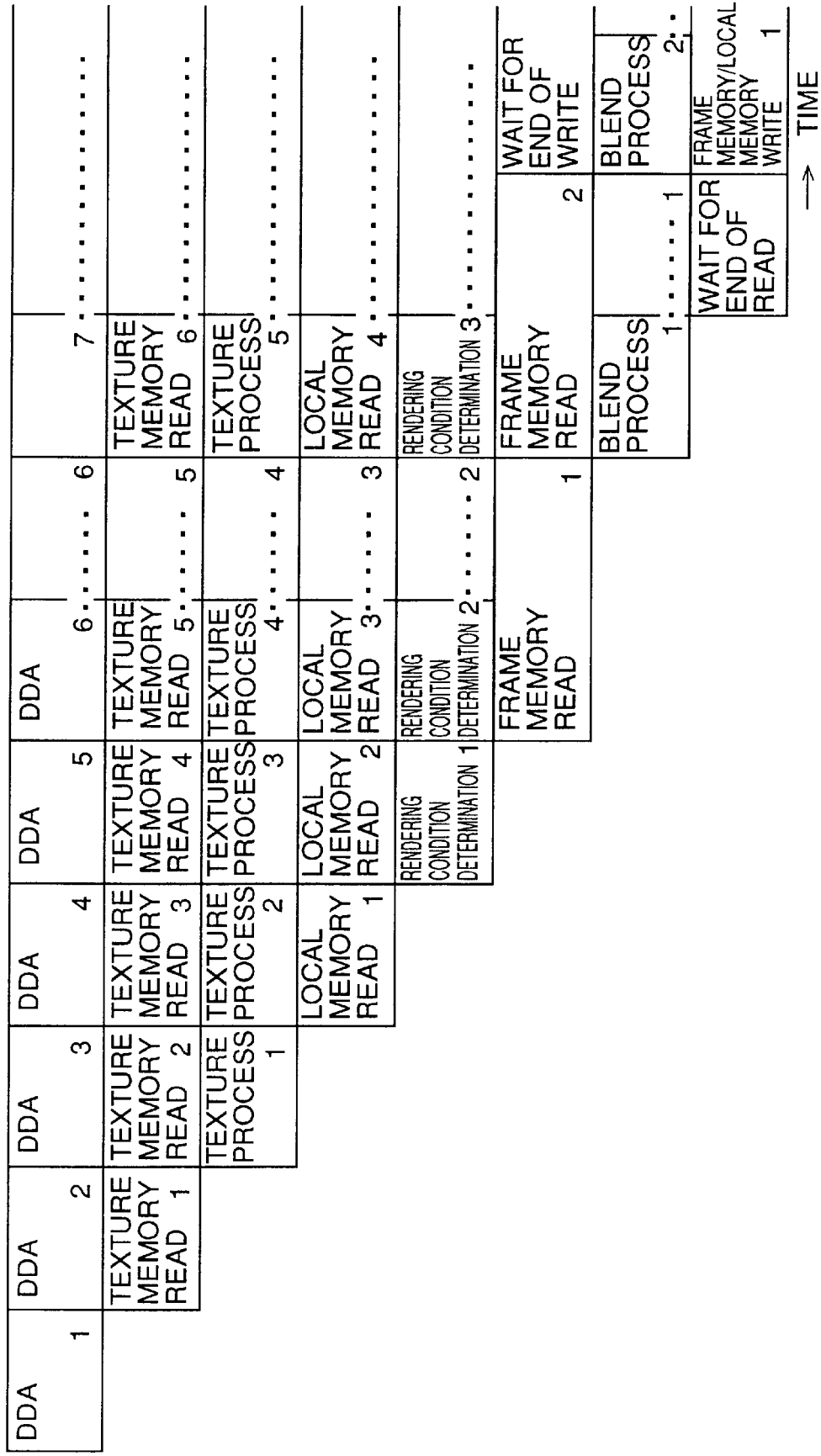
FIG. 24 is a diagram showing a process sequence of the dedicated graphic hardware shown in, FIG. 21.

A description will now be given, with reference to FIGS. 24 and 25, of process sequences in the dedicated graphic hardware part 18 shown in FIG. 21 and the dedicated graphic hardware part 18 shown in FIG. 22. FIG. 24 is a diagram showing a process sequence of the dedicated graphic hardware 18 shown in FIG. 21 and FIG. 25 is a diagram showing a process sequence of the dedicated graphic hardware 18 shown in FIG. 22.

Referring to FIG. 24, "DDA" indicates a process by the DDA part 23, "texture memory read" indicates a process of reading data from the texture memory 16, "texture process" indicates a process by the texture process part 24, "local memory read" indicates a process of reading data from the local memory 18, "rendering condition determination" indicates a process by the rendering condition determination part 25, "frame memory read" indicates a process of reading data from the frame memory 14, "blending process" indicates a process by the blender part 26. Numerals "1", "2" . . . indicate correspondence between the processes. For example, the "texture memory read 1" process is executed in correspondence to the "DDA 1" process. The "texture process 1" is executed in correspondence to the "texture memory read 1".

As indicated in FIG. 24, frequency of accesses to the frame memory 14 is relatively high. The "frame memory write 1" process waits until the "frame memory read 2" process by the frame memory 14 ends. For a similar reason, the "frame memory read 3" process waits until the "frame memory write 1" process by the frame memory 14 ends. Although FIG. 24 indicates that the read process and the write process by the frame memory 14 take twice as much time as the other processes, these processes actually takes more than twice as much time.

Figure 25:
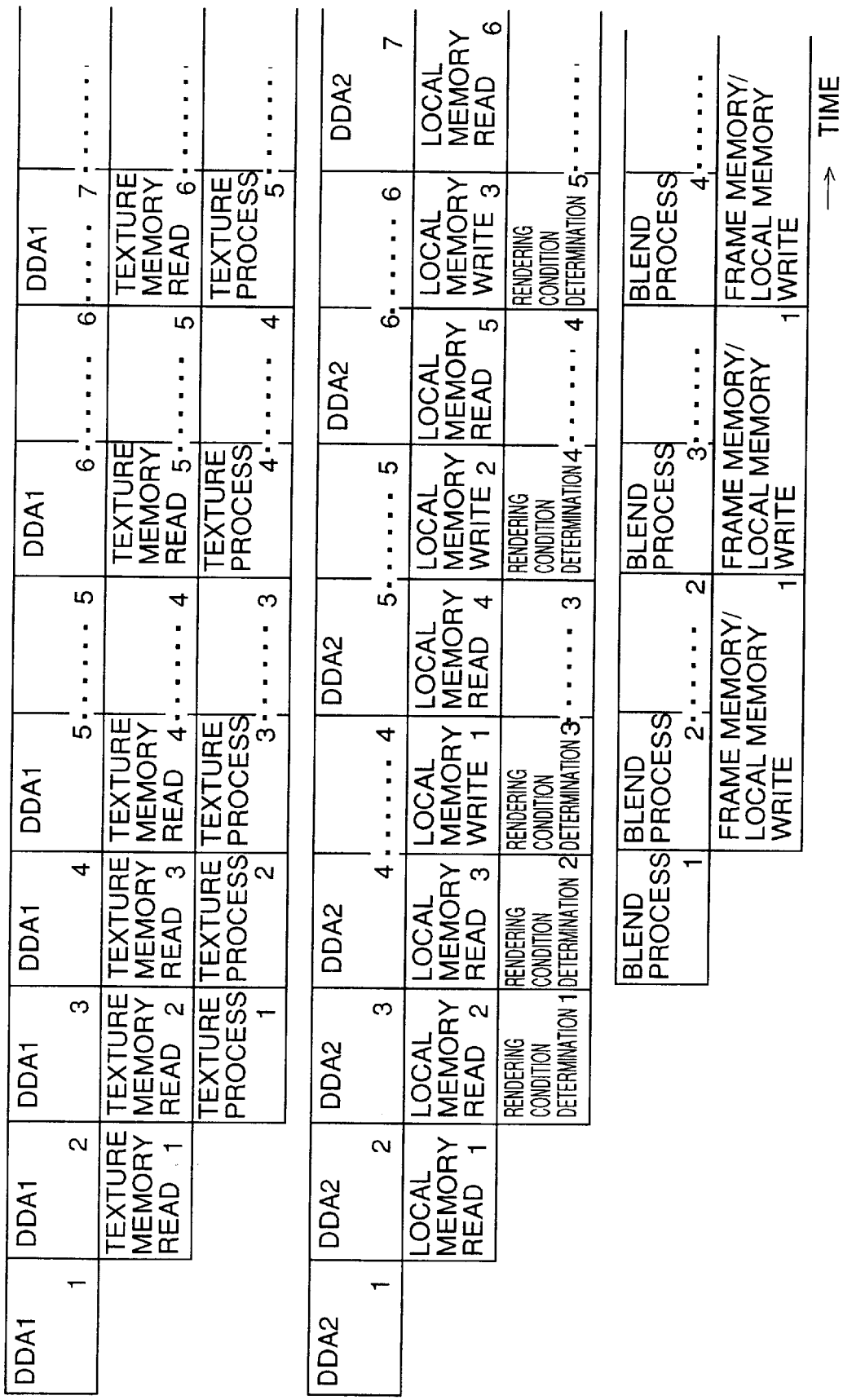
FIG. 25 is a diagram showing a process sequence of the dedicated graphic hardware shown in FIG. 22.

In FIG. 25, those parts that are the same as the parts of FIG. 24 are designated by the same reference numerals. "DDA 1" indicates a process executed by the DDA part 23-1 shown in FIG. 22. "DDA 2" indicates a process executed by the DDA part 23-2 shown in FIG. 22. In the case of FIG. 25, the process sequence is largely divided into three flows; the process flow relating to the texture process part 24; the process flow relating to the rendering condition determination part 25; and the process flow relating to the blender part 26.

A comparison between FIG. 24 and FIG. 25 tells us that, in FIG. 25, the overall length of the pipeline is small, and the dedicated graphic hardware part 18 does not perform a read process but only performs a write process with respect to the frame memory 14. The processing efficiency is improved as compared to the case of FIG. 24. There is little disturbance in the pipeline because the write process with respect to the frame memory 14 can be performed irrespective of the read process with respect to the frame memory 14. Since only the write process is executed by the dedicated graphic hardware part 18 with respect to the frame memory 14, it is possible to select a more efficient method of accessing the frame memory 14.

Figure 26:
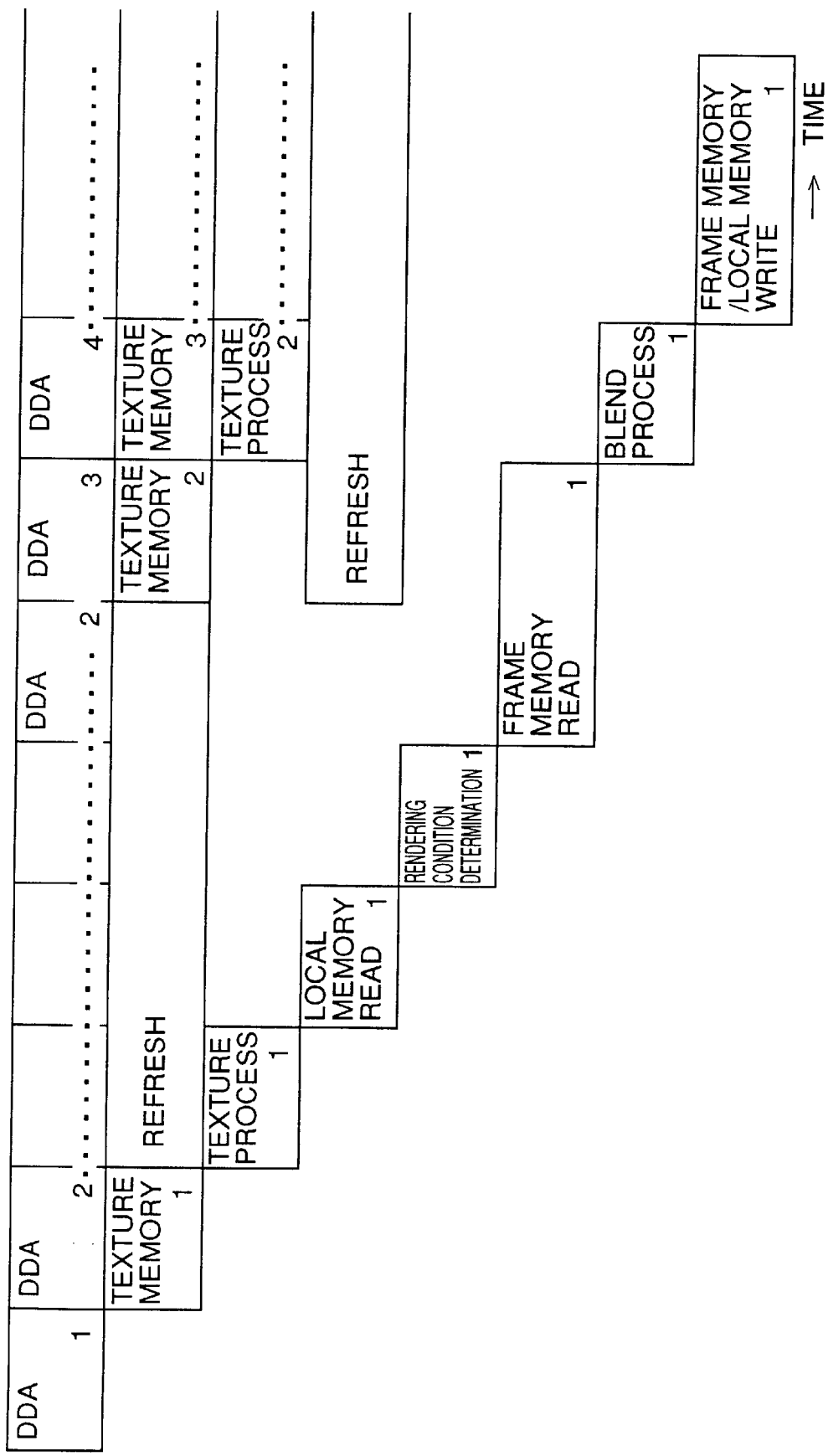
FIG. 26 is a diagram showing a sequence of the process executed by the dedicated graphic hardware part shown in FIG. 21 in case a factor, such as a refreshing, which may terminate an access has occurred.
Figure 27:
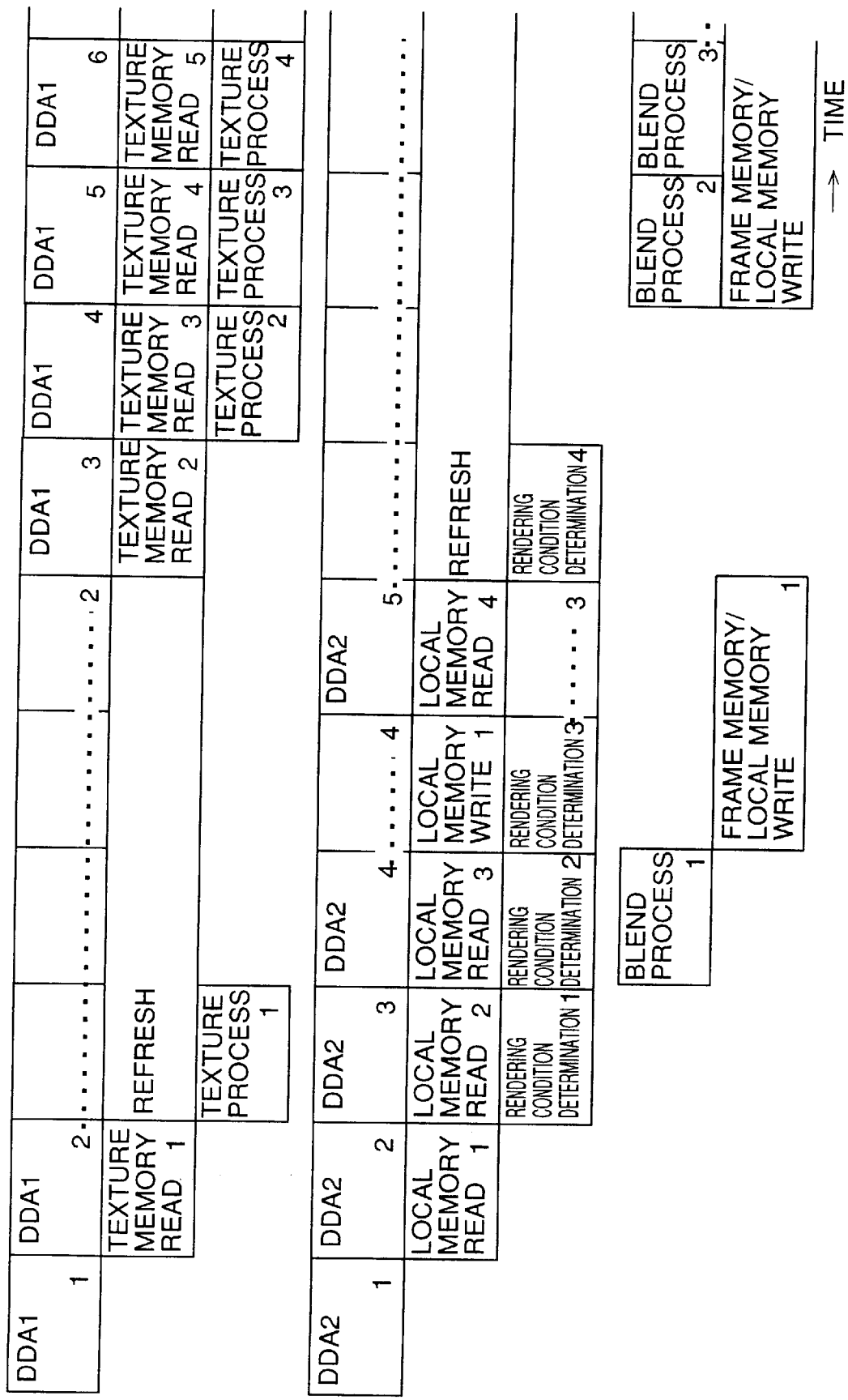
FIG. 27 is a diagram showing a sequence of the process executed by the dedicated graphic hardware part shown in FIG. 22 in case a factor, such as a refreshing, which may terminate an access has occurred.

FIG. 26 is a diagram showing a sequence of the process executed by the dedicated graphic hardware part 18 shown in FIG. 21 in case a factor, such as a refreshing, which may terminate an access has occurred. FIG. 27 is diagram showing a sequence of the process executed by the dedicated graphic hardware part 18 shown in FIG. 22 in case a factor, such as a refreshing, which may terminate an access has occurred. In FIGS. 26 and 27, those parts that are the same as the parts of FIGS. 24 and 25 are designated by the same reference numerals and the description thereof is omitted.

In the case of FIG. 26, a refresh of the texture memory 16 is started after the first "texture memory read 1" process.

Therefore, the subsequent texture process of unprocessed pixels is terminated. Consequently, the texture memory 16 is not accessed after the first "local memory read 1" despite the fact that the local memory 15 is accessible. Subsequently, the refresh of the texture memory 16 is completed so that the texture process is resumed. However, a refresh of the local memory 15 is started instead, causing the pipeline to stop.

In the case of FIG. 27, even when the texture process is terminated following a refresh of the texture memory 16 and the entire process beyond the "blending process 1" is halted, the process relating to the local memory 15 is being carried out. The result of the process preceding the process by the rendering, condition determination part 25 is latched in the buffers 51-1 and 51-2. Subsequently, when the refresh of the texture memory 16 is completed and the process by the texture process part 24 is restarted, a refresh of the local memory 15 is started. Even when the refresh of the local memory 15 is started and the process by the rendering condition determination part 25 is halted, the blender part 26 is capable of proceeding with the blending process because data for pixels that had been processed in advance are latched in the buffers 51-1 and 51-2.

The refresh is not necessarily performed as shown in FIGS. 26 and 27. While, in the construction shown in FIG. 21, the pipeline operation is significantly affected by a factor such as a refresh which causes the operation to stop, the construction shown in FIG. 22 is such that the pipeline operation is hardly affected by a factor such as a refresh which causes the operation to stop.

Figure 28:
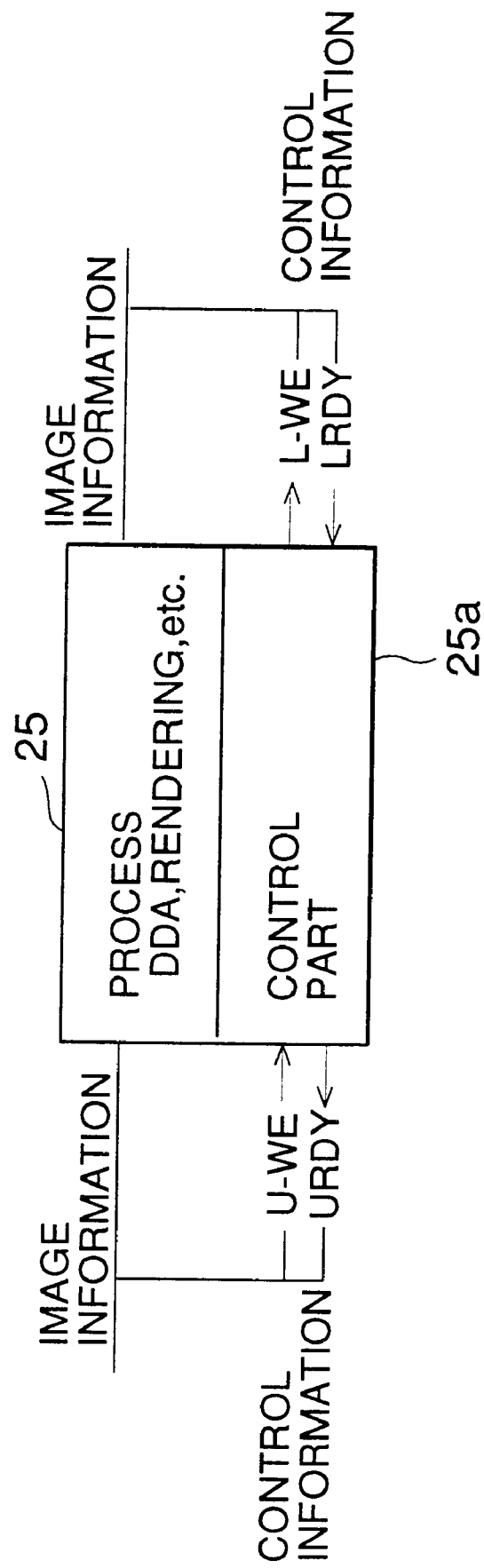
FIG. 28 shows an input/output configuration of the control parts other than the control part of the blender part.
Figure 29:
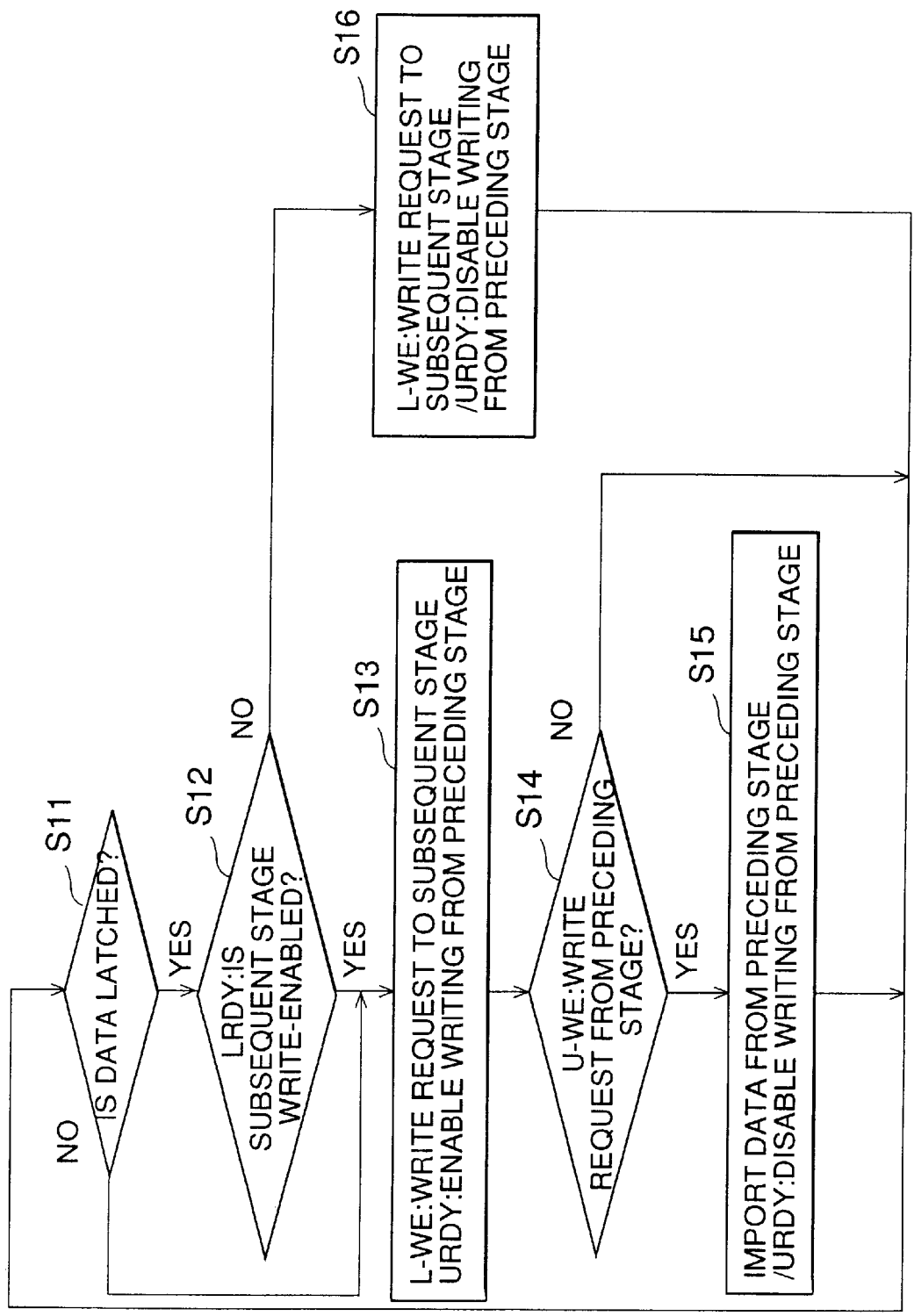
FIG. 29 is a flowchart which explains the operation of the control part shown in FIG. 28.

A description will now be given, with reference to FIGS. 28 and 29, of the operation of the control parts other than the control part 26a of the blender part 26, that is, the control parts 23-1a, 23-2a, 24a, 25a, 51-1a, 51-2a and 14a. FIG. 28 shows an input/output configuration of the control parts other than the control part 26a. FIG. 29 is a flowchart which explains the operation of the control part 25a shown in FIG. 28.

The control parts 23-1a, 23-2a, 24a, 25a, 51-1a, 51-2a, 14a have the same construction. Therefore, the control part 25a of the rendering condition determination part 25 is taken as an example and explained with reference to FIGS. 28 and 29, illustration and explanation of the other control parts 23-1a, 23-2a, 24a, 51-1a, 51-2a and 14a being omitted.

Referring to FIG. 28, the control part 25a is supplied with a write request U-WE from the preceding block, i.e. the DDA part 23-1 and a write enable response LRDY from the subsequent block, i.e. the buffer 51-1. The control part 25a outputs a write enable response URDY to the preceding block, i.e. the DDA part 23-1 and a write request L-WE to the subsequent block, i.e. the buffer 51-1. While the control part 25a inputs U-WE and LRDY from the preceding stage and the subsequent stage, respectively and outputs URDY and L-WE to the preceding stage and subsequent stage, respectively, the rendering condition determination part 25 itself processes image information.

The control part 25a performs the process as shown in FIG. 29. Referring to FIG. 29, a determination is made in step S11 as to whether data is latched in the control part 25a. If an YES answer is yielded in the determination, the control is passed to step S12, where a determination is made as to whether the subsequent stage is write-enabled on the basis of the write enable response LRDY from the subsequent stage. If a NO answer is yielded in the determination in step S11 or if a YES answer is yielded in the determination in step S12, the control is passed to step S13, where the control part 25a outputs the write request L-WE to the subsequent block to request a writing thereto and outputs the write enable response URDY to the preceding stage to enable a writing therefrom. In step S14, a determination is made as to whether or not the write request U-WE from the preceding block is present. If a YES answer is yielded in S14, the control is passed to step S15, where the control part 25a imports data from the preceding stage and outputs a write disable response /URDY to the preceding stage to indicate that a writing therefrom is disabled. If a NO answer is yielded in the determination in S12, the control is passed to step 16, where the write request L-WE is output to the subsequent stage and the write disable response /URDY is output to the preceding stage. If a NO answer is yielded in step S14 or after the process S15 or S16 ends, the control is returned to step S11.

Figure 30:
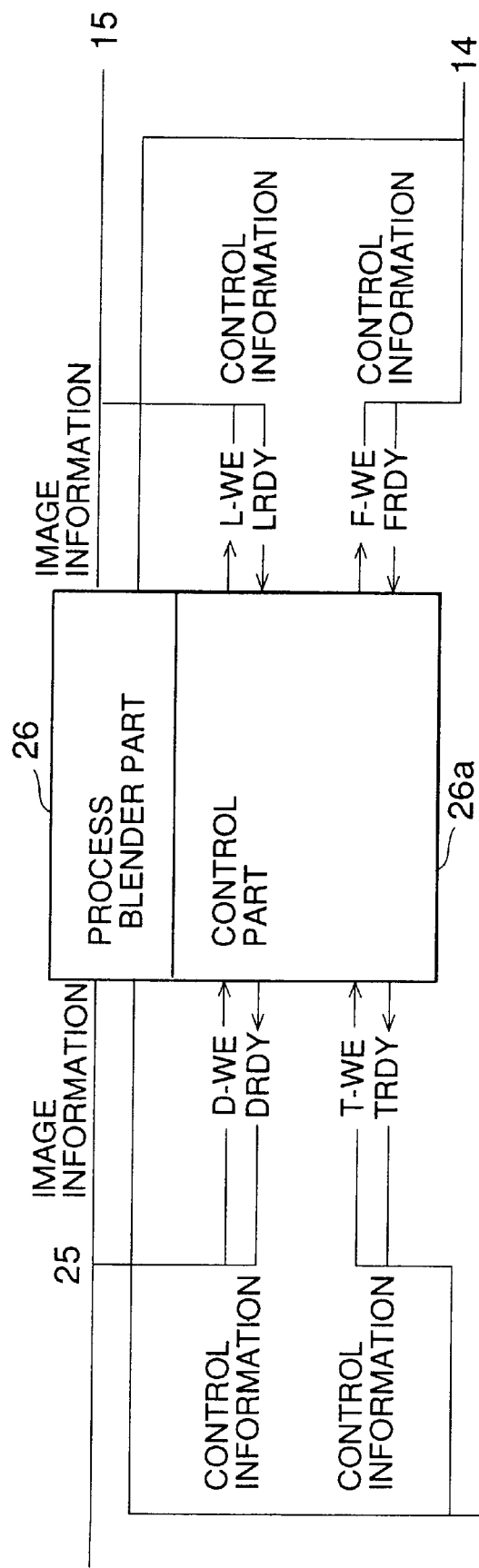
FIG. 30 is a diagram showing an input/output configuration of the control part of the blender part.

A description will now be given, with reference to FIGS. 30 and 31, of the operation of the control part 26a of the blender part 26. FIG. 30 is a diagram showing an input/output configuration of the control part 26a, and FIG. 31 is a flowchart which explains the operation of the control part 26a shown in FIG. 30.

Referring to FIG. 30, the control part 26a is supplied with a write request D-WE from the rendering condition determination part 25 (preceding stage), a write request T-WE from the texture process part 24 (preceding stage), a write enable response LRDY from the local memory 25 (subsequent stage), and a write enable response FRDY from the frame memory 14 (subsequent stage). The control part 26a outputs a write enable response DRDY to the rendering condition determination part 25 (preceding stage), a write enable response TRDY to the texture process part 24 (preceding stage), a write request to the local memory 15 (subsequent stage), and a write request F-WE to the frame memory 14 (subsequent stage). While the control part 26a inputs D-WE, T-WE, LRDY and FRDY from the preceding stage and outputs DRDY, TRDY, L-WE and F-WE to the subsequent stage, the blender part 26 itself processes image information.

Figure 31:
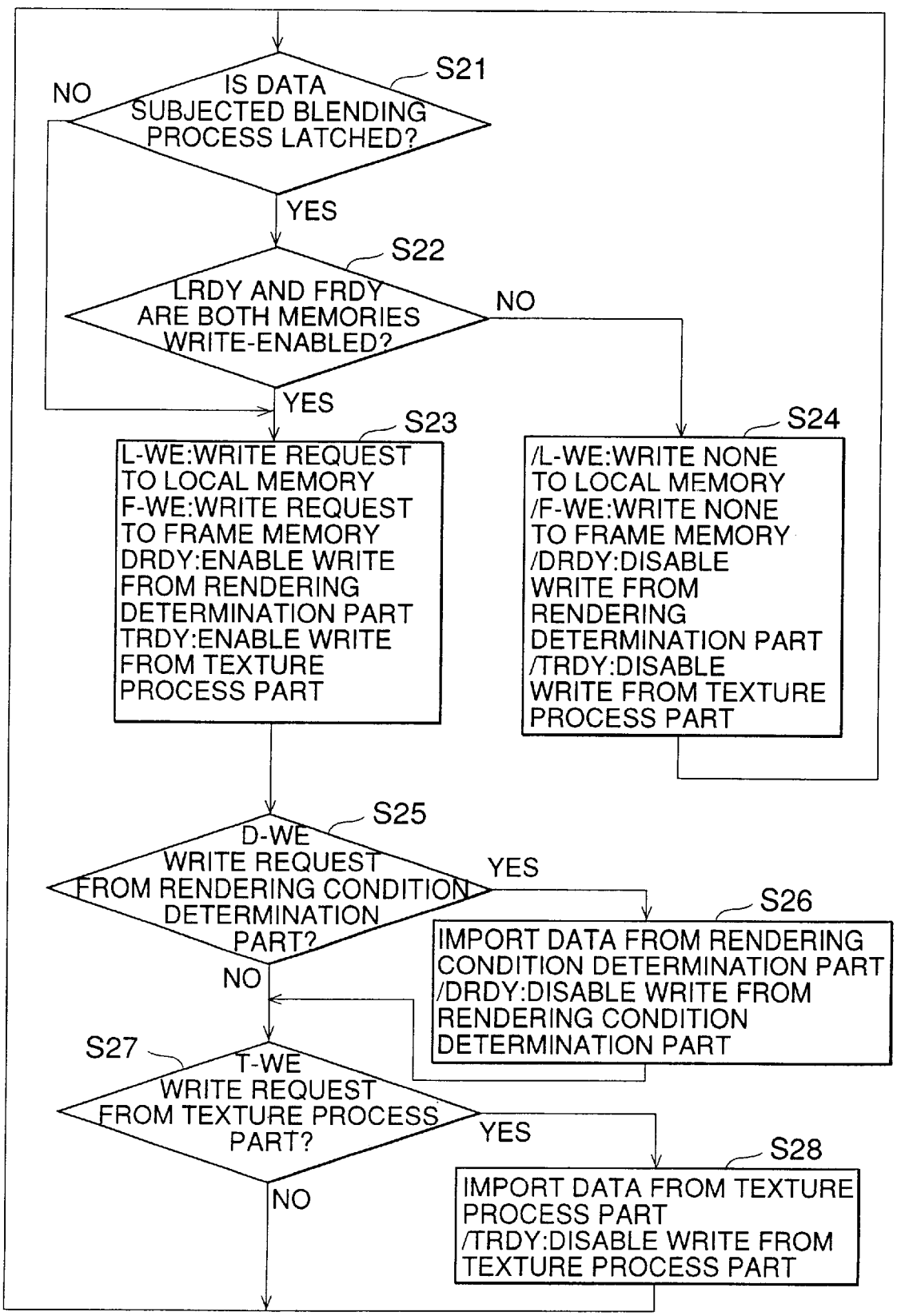
FIG. 31 is a flowchart which explains the operation of the control part shown in FIG. 30.

The control part 26a performs the process as shown in FIG. 31. Referring to FIG. 31, a determination is made in step S21 whether or not the blending process is completed and data is latched in the control part 26a. If a YES answer is yielded, the control is passed to step S22, where a determination is made as to whether writing to the local memory 15 and the frame memory 14 is enabled on the basis of the write enable response LRDY and FRDY. If a NO answer is yielded in step S21 or if a YES answer is yielded in step S22, the control is passed to step S23, where the write the control part 26 outputs the request L-WE to the local memory 15, the write request F-WE to the frame memory 14, the write enable response DRDY to the rendering condition determination part 25, and the write enable response TRDY to the texture process part. 24. If a NO answer is yielded in step S22, the control part 26a in step S24 outputs /L-WE to the local memory 15 to indicate that nothing is written thereto, outputs /F-WE to the frame memory 14 to indicate that nothing is written thereto, outputs /DRDY to the rendering condition determination part 25 to indicate that a write therefrom is disabled, and outputs /TRDY to the texture process part 24 to indicate that a write therefrom is disabled. After step S24, the control is returned to step S21.

Subsequent to step S23, the control part 26a makes a determination in step S25 as to whether or not there is a write request D-WE from the rendering condition determination part 25. If a YES answer is yielded, the control is passed to step S26, where the control part 26a imports data from the rendering condition determination part 25 and outputs /DRDY to the rendering condition determination part 25 to indicate that a write therefrom is disabled. If a NO answer is yielded in step S25 or after the step S26 ends, the control is passed to step S27, where a determination is made as to whether or not there is a write request T-WE from the texture process part 24. If a NO answer is yielded, the control is returned to step S21. If a YES answer is yielded in step S27, the control is passed to step S28, where the control part 26a imports data from the texture process part 24 and outputs /TRDY to the texture process part 24 to indicate that a write therefrom is disabled. The control is then returned to step S21.

Figure 32:
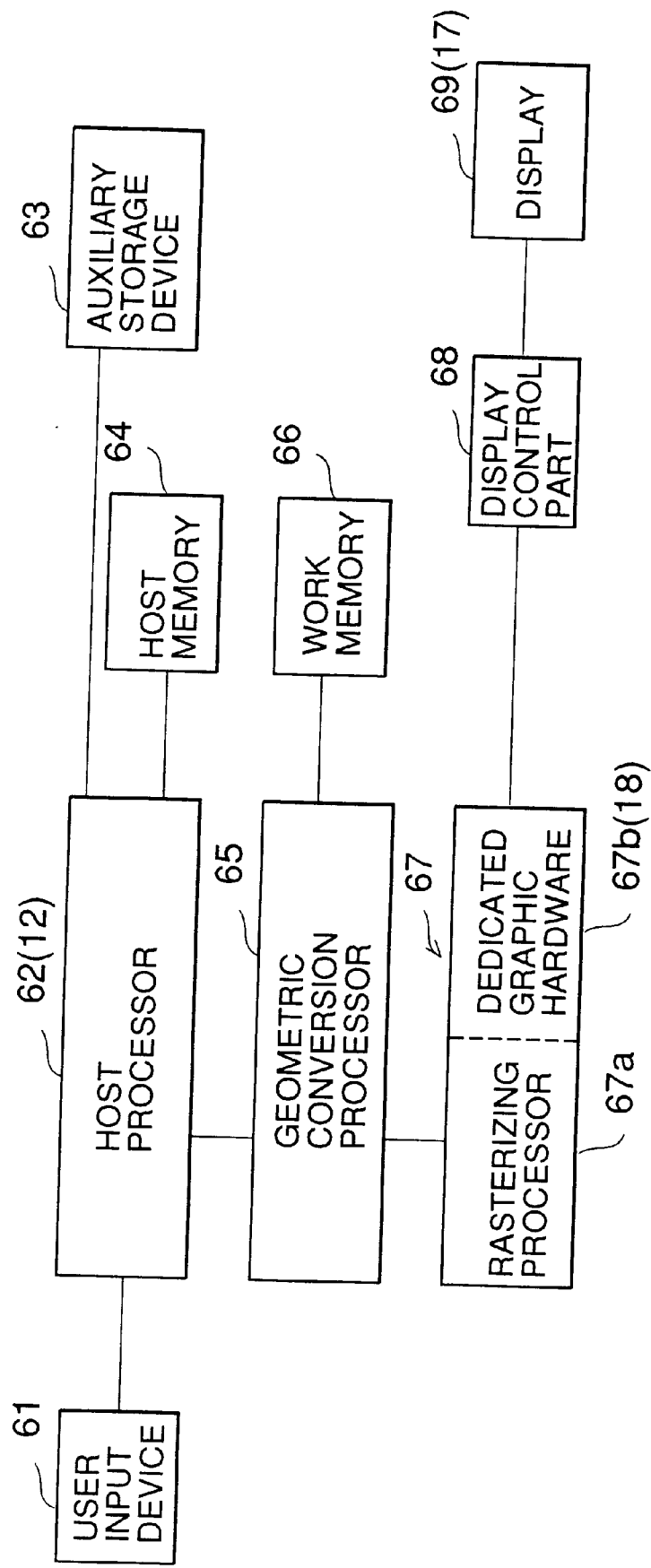
FIG. 32 is a block diagram showing the overall construction of a system to which the second embodiment is applied.

FIG. 32 is a block diagram showing the overall construction of a system to which the second embodiment is applied. In FIG. 32, a three-dimensional image generation and display system comprises a user input device 61, a host processor 62, an auxiliary storage device 63, a host memory 64, a geometric conversion processor 65, a work memory 66, an information processing unit 67, a display control part 68, and a display 69. The host processor 62 corresponds to the host computer 12 shown in FIG. 22. The information processing unit 67 includes a rasterizing processor 67a and a dedicated graphic hardware part 67b. The dedicated graphic hardware part 67b corresponds to the dedicated graphic hardware part 18 shown in FIG. 22. The display 69 corresponds to the display part 17 shown in FIG. 22.

The host processor 62 manages information relating to coordinates, viewpoints of a three-dimensional object and information relating to a light source. This information is stored in the host memory 64 or the auxiliary storage device 63. The host processor 62 executes processes like a deformation of F the object or a shift of a viewpoint in accordance with an input from the user input device 61 such as a keyboard and supplies information relating to a three-dimensional image to be rendered finally to the geometric conversion processor 65.

The geometric conversion processor 65 executes a process of converting information relating to a three-dimensional image of the object to information relating an image in the 2-D coordinate system on a display screen. The geometric conversion processor 65 may be omitted if the host processor 62 has a satisfactory operating power.

The rasterizing processor 67a of the information processing unit 67 has an instruction mode adapted for horizontally segmenting a polygon represented in the 2-D coordinate system and calculating a starting point and the number of rendering to be performed. The dedicated graphic hardware part 67b in the information processing unit 67 reduces the rasterized information into pixels and determines a color to be rendered, the resultant data being written to the frame memory 14. The display control part 68 reads information stored in the frame memory 14 and displays associated image in the display 69. In this way, a real-time generation and display of a three-dimensional image in response to the user input is achieved.

Figure 33:
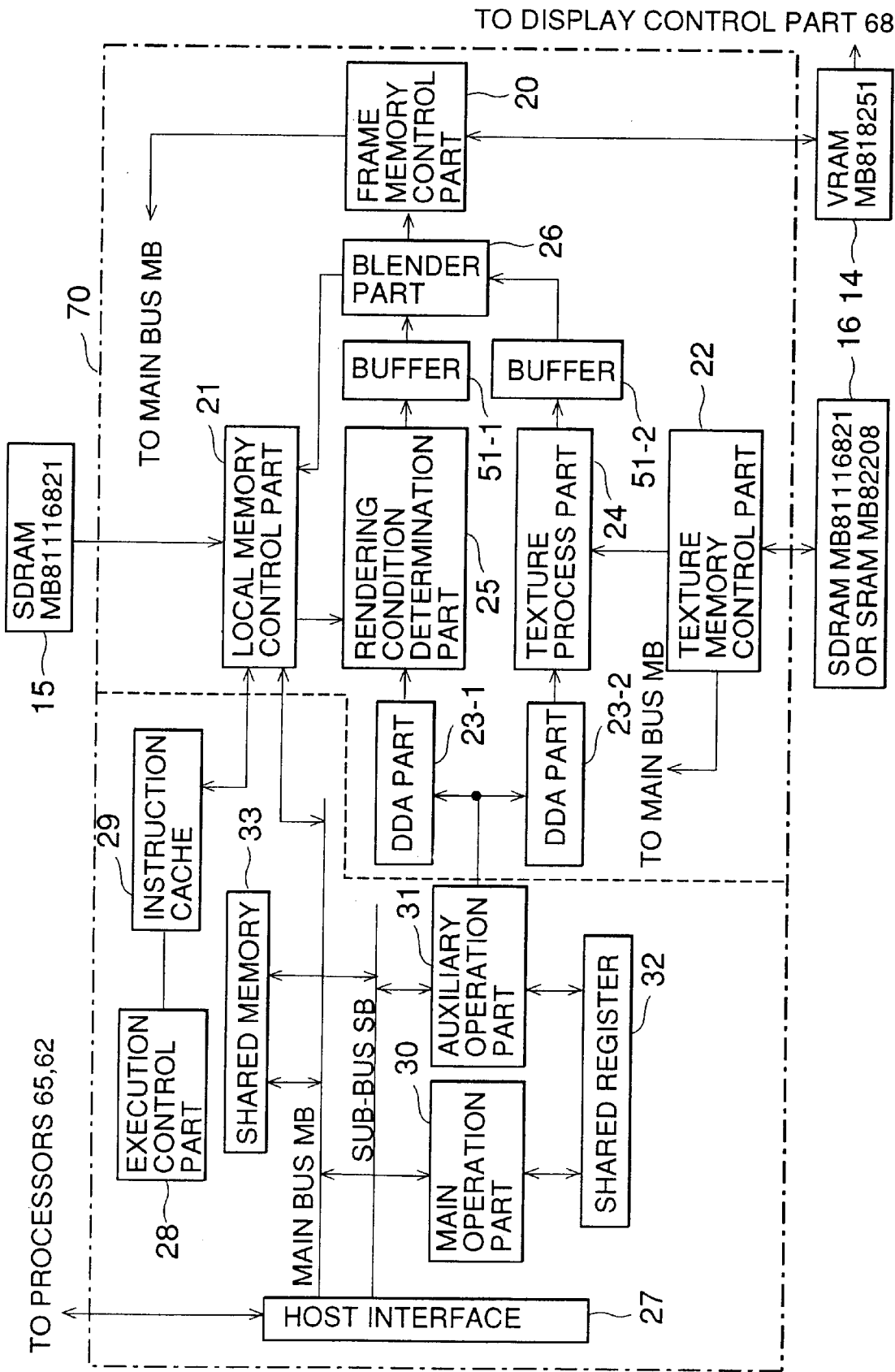
FIG. 33 is a block diagram showing an important part of the system shown in FIG. 32.

FIG. 33 is a block diagram showing the construction of the information processing unit 67 shown in FIG. 32. In FIG. 33, those parts that are the same as the parts of FIGS. 3 and 22 are designated by the same reference numerals and the description thereof is omitted.

Referring to FIG. 33, a portion surrounded by a dashed line is constructed of a semiconductor chip 70. The frame memory 14, the local memory 15 and the texture memory 16 are external with respect to the semiconductor chip 70. For example, the frame memory 14 may be embodied by a VRAM known as MB818251, the local memory 15 may be embodied by an SDRAM known as MB81116821 and the texture memory 16 may be embodied by an SDRAM known as MB81116821 or an SRAM known as MB82208.

Only a writing process can be effected by the semiconductor chip 70 with respect to the frame memory 14. Color data and an α value that is read from the frame memory 14 in the first embodiment shown in FIG. 3 is read from the local memory 15 together with other data. Reading of data from the frame memory 14 is conducted only by the display control part 68 for controlling the display control part 69. Since the local memory 15 is not directly connected to the display control part 68, a memory such as an SDRAM which enables a high-speed access may be used as the local memory 15. As a result, even if the dual-port VRAM is used as the frame memory 14 as in the first embodiment shown in FIG. 3, the frequency of accesses to the frame memory 15 is half that of the first embodiment, with the result that the overall processing efficiency of the system is improved.

The process by the rendering condition determination part 25 effected by accessing the local memory 15 and the process by the texture process part 24 effected by accessing the texture memory 16 are parallel with each other. For this reason, the rendering condition determination part 25 is capable of operating at timings optimal for the local memory 15. The texture process part 24 is also capable of operating at timings optimal for the texture memory 16.

Thus, according to this embodiment, it is possible to perform a high-speed image generation and display process. The processing speed of the overall system is improved regardless of the access time of the memory used.

Figure 34:
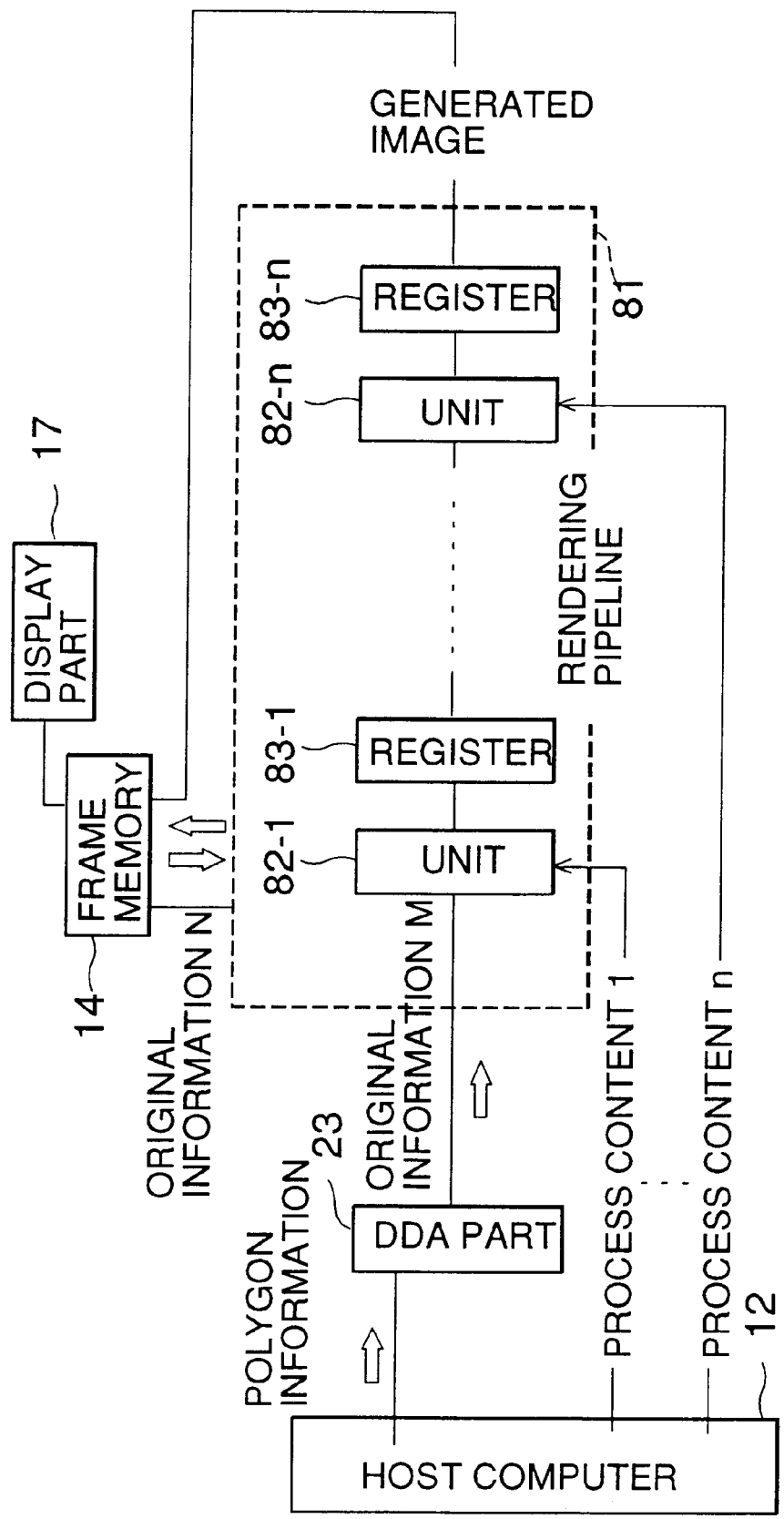
FIG. 34 is a block diagram which explains the pipeline process beyond the DDA part of the dedicated graphic hardware part shown in FIG. 21.

In a pipeline process in the dedicated graphic hardware part 18 shown in FIG. 21, different parts of the hardware are coupled in combinations determined by the flow of the process. FIG. 34 is a block diagram which explains the pipeline process beyond the DDA part 23 of the dedicated graphic hardware part 18 shown in FIG. 21. In FIG. 34, those parts that are the same as the parts of FIG. 21 are designated by the same reference numerals and the description thereof is omitted.

Referring to FIG. 34, the host computer 12 prepares polygon information including coordinates and color information for a polygon to be rendered. The polygon information is reduced by the DDA part 23 to information relating to individual points that constitute a screen of the display 17. The coordinates, color information and the like of the individual points are supplied to a rendering pipeline 81 as original information M. The information relating to the screen already produced is supplied as original information N to the rendering pipeline 81 as the case demands. The rendering pipeline 81 executes predetermined processes on the original information M and N and stores the resultant information relating to the polygon to be rendered, that is, information relating to a produced image, to the frame memory 14.

As shown in FIG. 34, the rendering pipeline 81 has process units 82-1–82-n and pipeline registers 83-1–83-n alternately connected in a series. The process units 82-1–82-n are dedicated hardware adapted for respective processes, that is, the operating parts for performing various operations. The pipeline registers 83-1–83-n constitute a pipeline register group.

The original information M and N is subjected to processes by the process units 82-1–82-n. The information relating to a produced image is output from the rendering pipeline 81. Each of the process units 82-1–82-n completes its process within one clock and writes the process result to the subsequent one of the pipeline registers 82-1–82-n. Thus, the process units 82-1–82-n are capable of proceeding with a next process at the end of a clock. A total of n clocks are necessary for the first produced image information that corresponds to the original information M to be output. However, the process result is produced at intervals of one clock thereafter.

As for the process that requires more than one clock, the process is divided and assigned to a plurality of process units and a plurality of pipelines, each process unit carrying out a process portion that takes a time slot of smaller than one clock. The process content of the individual process units 82-1–82-n is determined by a selection signal sent from the host computer 12 to indicate one of process contents 1–n.

The above-described pipeline process by the rendering pipeline 81 is suitable for processing the continuous information in accordance with a predetermined procedure. However, not every image generation is characterized by a repetition of the same process. There is a possibility that a switching of the process content takes place for each individual polygon produced.

Figure 35A:
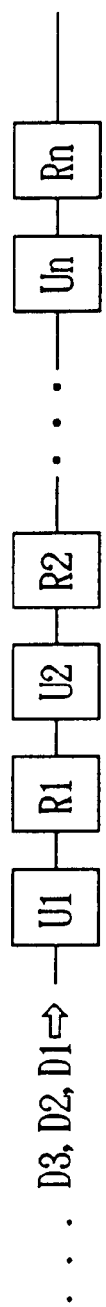
FIGS. 35A and 35B are diagrams which explain the pipeline process of a rendering pipeline including a total of n stages.

FIG. 35A is a diagram showing the process effected when the rendering pipeline 81 includes a total of n stages. Ui and Ri in FIG. 35A denote processes by a process unit 82-i and a pipeline register 83-i, respectively, where i=1–n. Input information D1, D2, D3, . . . is sequentially input to the n-stage rendering pipeline 81.

Figure 35B:
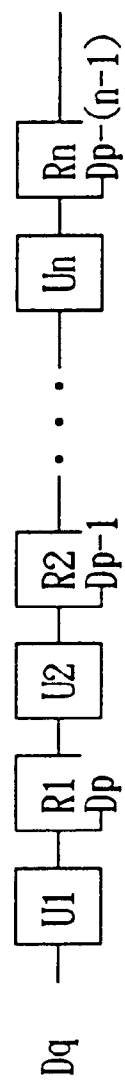

FIG. 35B is a diagram which explains the operation in the n-stage rendering pipeline 81 also shown in FIG. 35A, wherein the process content is switched after the input information D1–Dp has been processed and the input information Dp+1–Dq is to be processed. FIG. 35B shows a state where the input information Dp has been input to the rendering pipeline 81. In this state, the pipeline registers R1–Rn still contain the input information Dp–Dp–(n–1), respectively. Therefore, it is impossible to switch the process content of the process units U1–Un. For this reason, there is a first disadvantage in that it is possible to input the input information beyond Dp+1 to the rendering pipeline 81 only when the input information Dp–Dp–(n–1) has been processed in the rendering pipeline 81, that is, only after n clocks.

Figure 36:
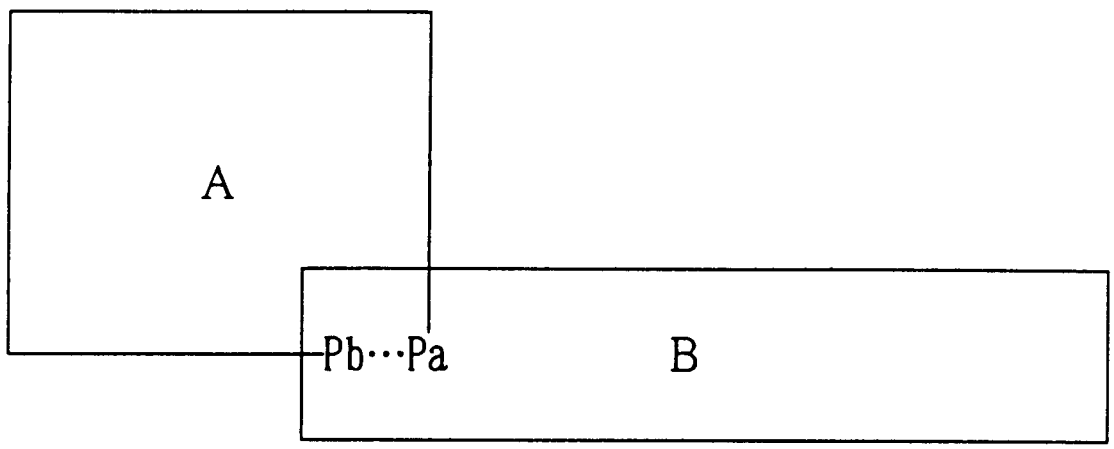
FIG. 36 is a diagram which explain how polygon images overlap in the screen display.

When a switching of the process content does not take place while two polygons are processed but two polygons produced overlap in the screen display as shown in FIG. 36, a second disadvantage as described below arises. Referring to FIG. 36, a polygon image B displayed on the screen overlaps a portion of a polygon image A, resulting in a portion of the polygon image Xi hidden from view on the screen.

When points of the polygon image A are processed so as to generate the polygon image A until the original information N relating to a terminal point Pa is input to the rendering pipeline 81, the original information N relating to a first point Pb of the polygon image B should then be input to the rendering pipeline 81. However, in the above-described pipeline process, it takes at least a time required for a completion of the pipeline process before the original information N relating to a point and input to the rendering pipeline 81 has been processed so that the image information is produced therefrom. In actuality, one should also take into account a time required to store the information in the frame memory 14 after the completion of the pipeline process. Accordingly, if the original information N relating to a first point Pb of the polygon image B is processed without the time required for the pipeline process and the time required for storing data in the frame memory 14 being taken into account, there is a possibility that not the original information N for the polygon image A but the preceding original information N is processed. In this case, an overlapping process of the polygons cannot be properly performed. That is, the pipeline which only processes the original information M and N is not capable of recognizing an overlap of polygons etc. The host computer 12 controlling the pipeline 81 may have to perform a queuing process for the polygons. Thus is the second disadvantage.

Aside from the above-described logic restrictions, there is a third disadvantage relating to the operation of the frame memory 14. It is necessary to store the image information produced in the rendering pipeline 81 in the frame memory 14. Further, there are cases where the information that is already stored in the frame memory 14 as the original information N is read for reuse.

FIGS. 37A and 37B are diagrams which explain reading and writing operations in the frame memory 14. FIG. 37A is a diagram which explains the reading operation. FIG. 37B is a diagram which explains the writing operation.

When data is read from the frame memory 14, the data that corresponds to an address supplied by the information processing unit is read and output, as shown in FIG. 37A. It takes a certain period of time referred to as an access time for the data k that corresponds to the address supplied by the information system to be read and output. It is necessary to provide a time referred as a pre-charge time between a completion of the reading of the data k that corresponds to the address and a start of an access to the address k+1. A period of time referred to as a cycle time is required for one access.

When data is written to the frame memory 14, both the address and the data are supplied by the information processing system, as shown in FIG. 37B. Therefore, there is no need to wait for an output of the data, unlike the case of the reading process. However, a minimum cycle time required for a completion of the writing process is preset. It is impossible to proceed with the writing process in the next address earlier than a timing specified by the cycle time.

In case a VRAM is used in the frame memory 14, the above-mentioned cycle time is approximately 30 nsec. Therefore, even if the cycle of the pipeline process is made shorter than the cycle time, the pipeline process has to wait because the next pipeline process cannot be carried out until the completion of the process in the frame memory 14. Conceivably, a high-speed memory such as a synchronous, memory that has been developed recently using a synchronization technology may be used as the frame memory 14 so as to increase the operating speed of the frame memory 14. However, since the operation of the synchronous memory is different from the VRAM or the like, the mere use of the synchronous memory as the frame memory 14 would not increase the speed of the pipeline process.

Further, the frame memory 14 used for the purpose of storing information relating to a produced image should satisfy two requirements described below. These requirement come from the fact that the frame memory 14 stores the information relating to the produced image. First, the frame memory 14 should be equipped with a function of dealing with an access from the display control part 68 for controlling the display part 17 so that the produced image information is displayed. Secondly, the frame memory 14 should have a function of enabling an en-bloc writing of data having certain values to a specific area so that a high-speed operation such as a high-speed clearing of the screen of the display part 17 can be performed. In the above-described embodiments, the VRAM is employed because it satisfies the above-described two requirements. In contrast, the synchronous memory does not satisfy above-described two requirements. Hence, it is difficult to employ the synchronous memory as the frame memory 14.

A description will now be given of the embodiments in which the aforementioned first through third disadvantages are eliminated.

Figure 38:
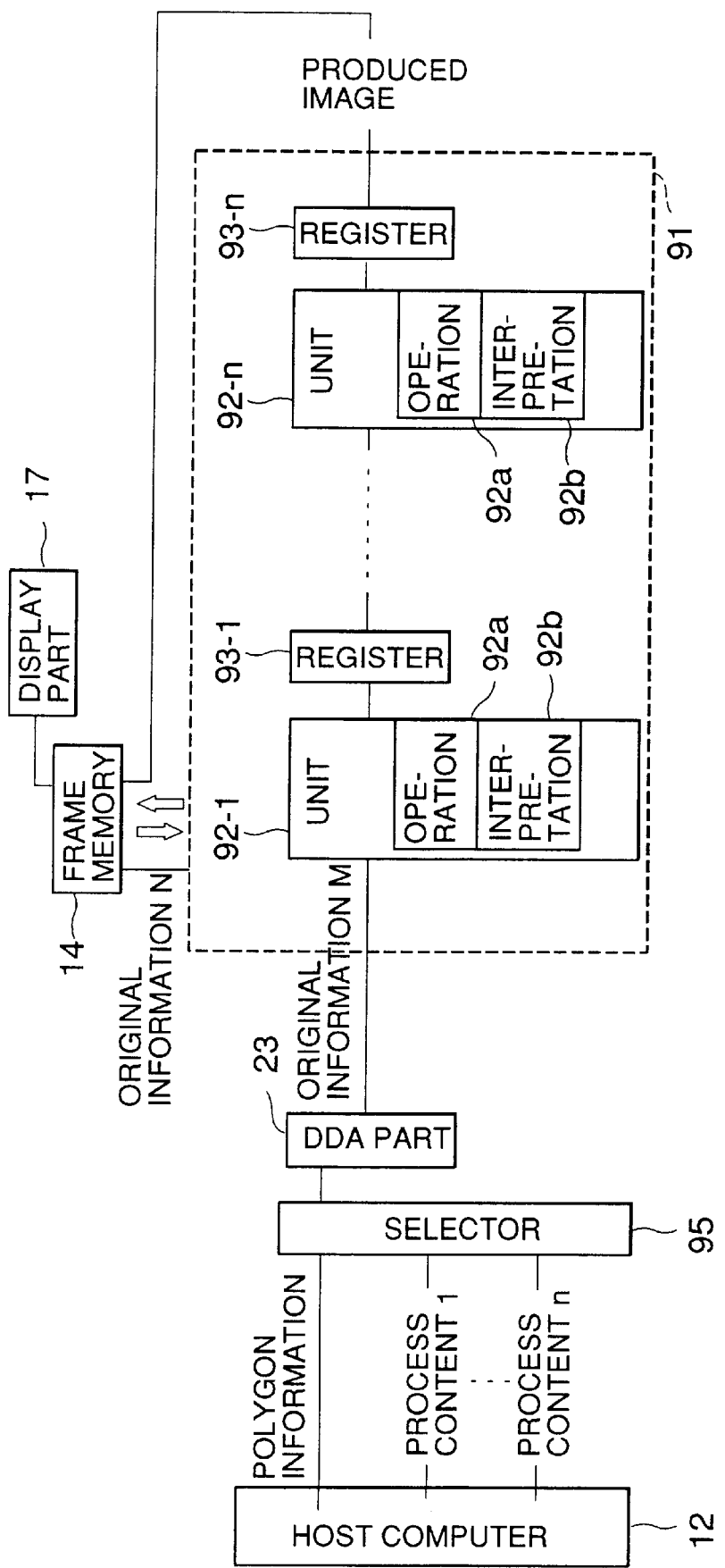
FIG. 38 is a block diagram showing an important part of a third embodiment of the information processing apparatus according to the present invention.

FIG. 38 is a block diagram showing an important part of a third embodiment of the information processing apparatus according to the present invention. In FIG. 38, those parts that are the same as the parts of FIG. 34 are designated by the same reference numerals and the description thereof is omitted. In this embodiment, the aforementioned first disadvantage is eliminated.

In this embodiment, information that indirectly relates to generation of image information is transferred together with information that directly relates to generation of image information via a path (rendering pipeline 91) similar to the path (rendering pipeline 81) of FIG. 34 that processes the information that directly relates to generation of image information. Each of the process units 92-1–92-n of the rendering pipeline 91 is equipped with an operation part 92a similar to the one of FIG. 34 and an interpretation part 92b which interprets information that indirectly relates to generation of image information. In this way, each of the process units 91-1–91-n of the pipeline 91 has the operation part 92a performing the operation of the information that directly relates to the generation of the image information and has the interpretation part 92b performing the interpretation of the information that indirectly relates to the generation of the image information. Pipeline registers 93-1–93-n of the rendering pipeline 91 are the same as the pipeline registers 83-1–83-n of FIG. 34. The processes executed by the rendering pipeline 91 corresponds to the processes executed by the texture process part 24, the rendering condition determination part 25 and the blender part 26 in the embodiments described earlier.

In this embodiment, the information that indirectly relates to the generation of the image information is transmitted via the same path as that for the information that directly relates to the generation of the image information. Therefore, the control lines indicating the process contents 1–n and connected directly to the process units 82-1–82-n, respectively, in FIG. 34 are collectively connected to a selector 95 in FIG. 38, the selector 95 supplying the process contents to the rendering pipeline 91. The selector 95 may be provided in the DDA part 23.

The information that directly relates to the generation of the image information is, for example, the information output by the DDA part 23. The information that indirectly relates to the generation of the image information is, for example, the information read by the blender part 26 from the frame memory 14 in the construction of FIG. 21, or the information read by the rendering condition determination part 25 from the local memory 15 in the construction of FIG. 22.

Assuming that the information that directly relates to the generation of the image information has a length of M bits, and the information that indirectly relates to the generation of the image information has a length of N bits, the rendering pipeline 91 may process the information having a length of M+N bits as shown in FIG. 39A. However, in a normal case, the information that indirectly relates to the generation of the image information does not change frequently. The information that indirectly relates to the generation of the image information remains unchanged for a period of time during which a polygon is being processed. For this reason, if the information that indirectly relates to the generation of the image information is always supplied to the rendering pipe 91, the number of required signal lines becomes large and the number of bits in the pipeline registers 93-1–93-n becomes large, thus creating a waste of the resource.

Accordingly, this embodiment is configured such that the rendering pipeline 91 is supplied with K+1-bit information that comprises: K-bit information for handling both the information that directly relates to the generation of the image information and the information that indirectly relates, to the generation of the image information; and 1-bit tag F which indicates whether the K-bit carries the information that directly relates to the generation or the information that indirectly relates to the generation. If there is a change in the process content, the information that indirectly relates to the generation of the image information and indicating the change in the process content is made to interrupt a stream of the information that directly relates to the generation of the image information. The composite information, wherein the tag F identifies the kind of information carried, is supplied to the rendering pipeline 91. Each of the process units 92-1–92-n detects the tag F and determines whether to process the supplied information in the operation part 92a or the interpretation part 92b.

It is necessary for the M-bit information that directly relates to the generation of the image information to be completely transmitted to the rendering pipeline 91. Therefore, it is required that K has a value greater than M. If the value of N in the N-bit information that indirectly relates to the generation of the image information is greater than N, a simple approach is to make K equal to N. Alternatively, the information is reconstructed by classifying the process contents 1–n into groups and associating the group with an identifier identifying the process content in which a change takes place. In this way, the information can be contained in a size smaller than M bits and K can be made equal to M.

FIGS. 40A–40D are diagrams that explain the pipeline process in the third embodiment.. FIGS. 40A–40D show a case where the n-stage rendering pipeline 81 is used. Ui and Ri in FIG. 40 denote processes of a process unit 92-i and a pipeline register 93-i, respectively, where i=1–n. S indicates a selector 95. Input information D1, D2 and D3 is sequentially input to the n-stage rendering pipeline 91.

FIG. 40A shows a state where the rendering pipeline 91 has processed the input information D1–Dp. FIG. 40B shows a state where the input information Dq and a process content X change. As shown in FIG. 40C, this change takes effect by the selector S transmitting the information Dx which indicates the change in the process content X to the rendering pipeline 91. FIG. 40D shows how the input information Dq is transmitted to the rendering pipeline 91 without waiting for the output of the input information preceding the input information Dp on the rendering pipeline 91.

Figure 41:
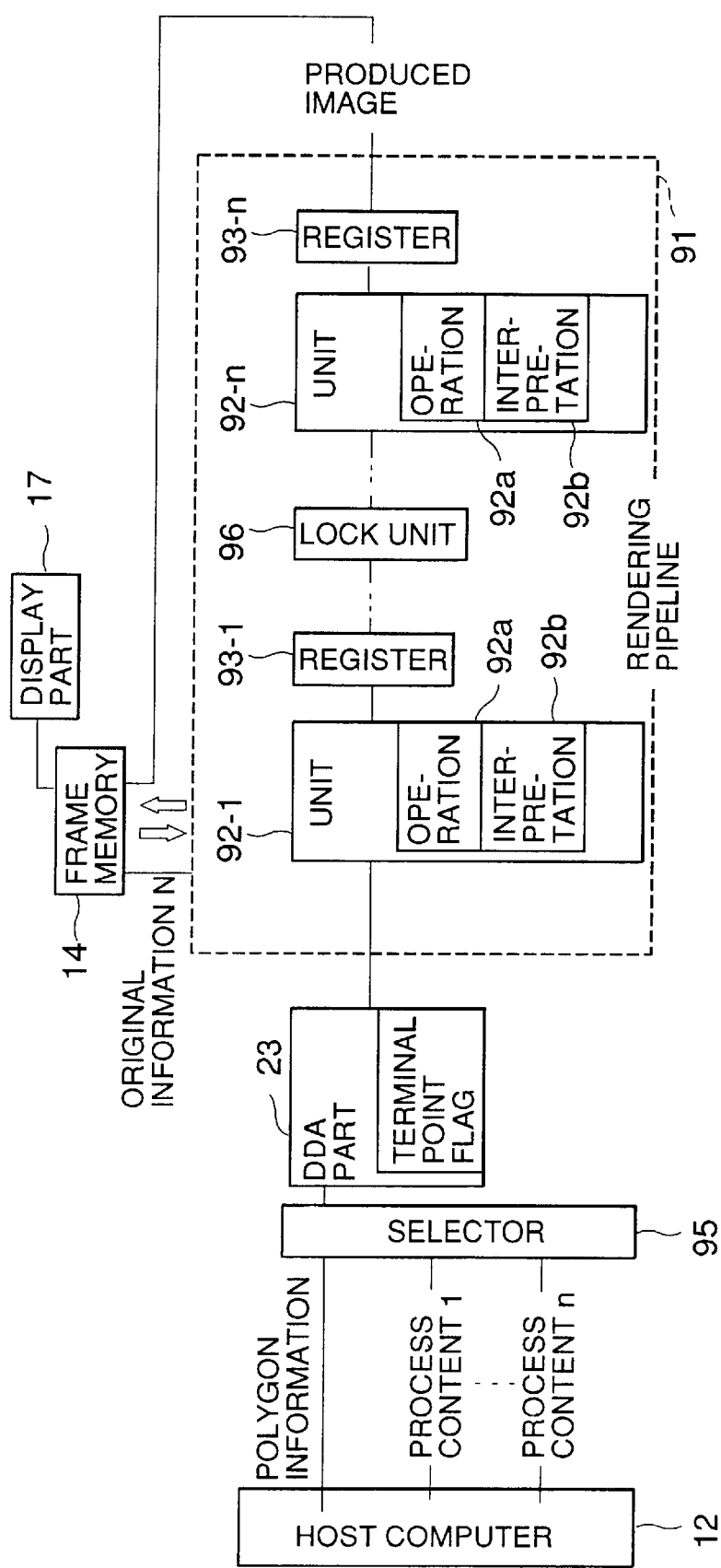
FIG. 41 is a block diagram showing an important part of a fourth embodiment of the information processing apparatus according to the present invention.

FIG. 41 is a block diagram showing an important part of a fourth embodiment of the information processing apparatus according to the present invention. In FIG. 41, those parts that are the same as the parts of FIG. 38 are designated by the same reference numerals and the description thereof is omitted. In this embodiment, the aforementioned second disadvantage is eliminated.

In this embodiment, a terminal point tag function is provided in the DDA part 23, as shown in FIG. 41. A lock unit 96 is provided in the rendering pipeline 91.

Figure 42:
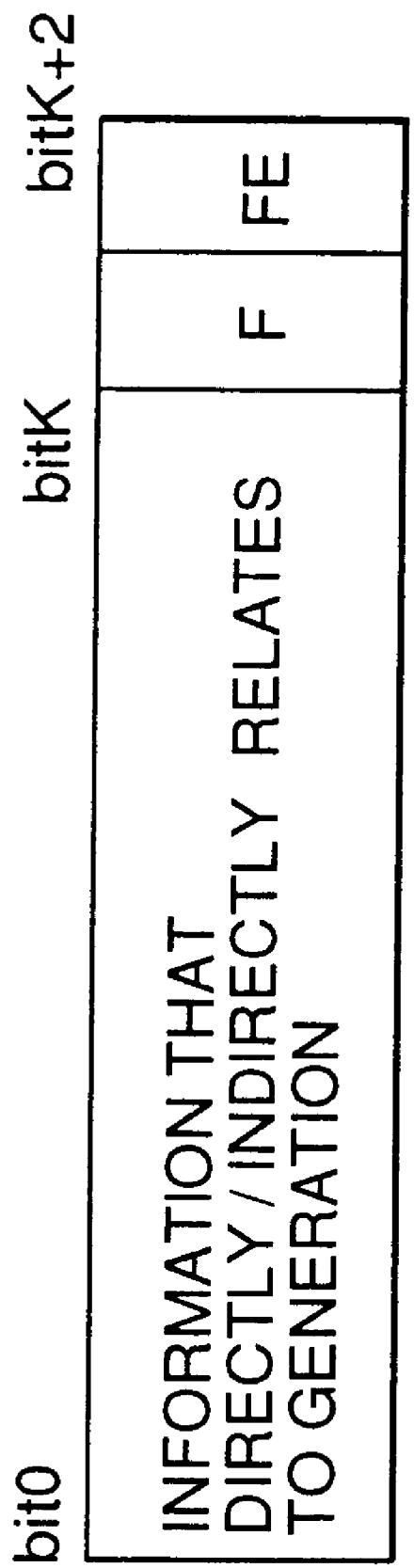
FIG. 42 is a diagram which explains information which directly relates to generation of image and is supplied to the rendering pipeline according to the fourth embodiment, and information which indirectly relates to generation of image and is supplied to the rendering pipeline according to the fourth embodiment.

In the case of the third embodiment shown in FIG. 38, the DDA part 23 simply reduces the polygon information from the host computer 12 into points and feeds the resultant information to the rendering pipeline 91. In contrast, reduction of the polygon information to points according to the fourth embodiment is such that a terminal point tag FE is added to the information relating to a terminal point (last point) of the polygon. FIG. 42 is a diagram showing the information in which the terminal point tag FE is added. The information shown in FIG. 42 is obtained by adding the terminal point tag FE to the information shown in FIG. 39B.

The lock unit 96 shown in FIG. 41 is provided in the rendering pipeline 91 so as to immediately precede a unit that require the original information N from the frame memory 14. When the terminal point tag FE added in the input information is ON, the lock unit 96 regards the information as the information indicating the terminal point of the polygon. The lock unit 96 blocks further information until the entirety of the information, including the terminal point, that remain in the rendering pipeline 91 is output from the rendering pipeline 91.

Since, as described above, information queuing is performed on the hardware level, it is not necessary for the host computer 12 to perform a queuing process. Supposing that the queuing process is performed by the host computer 12, a restart of the process occurs only after it is found that the process by the rendering pipeline 91 is completed. Upon restart, it is necessary to control the process such that the selector 95, the DDA part 23 and the rendering pipeline 91 operate in the stated order. When the lock unit 96 is provided in the rendering pipeline 91 as in this embodiment, it is possible to perform the process involving at least the selector 95, the DDA part 23, and the process unit of the rendering pipeline 91 that precedes the lock unit 96, even during the queuing process. Therefore, it is possible to start the process beyond the lock unit 96 immediately upon the completion of the queuing process, thereby minimizing the time lost due to the queuing process.

Some applications allow an assumption that no overlapping of polygons takes place as they are rendered. If this is the case, the aforementioned queuing process is unnecessary. Since the locking process is effected on the hardware level in this embodiment, it is desirable that the locking process is controlled in accordance with a necessity of the queuing process.

Figure 43A:
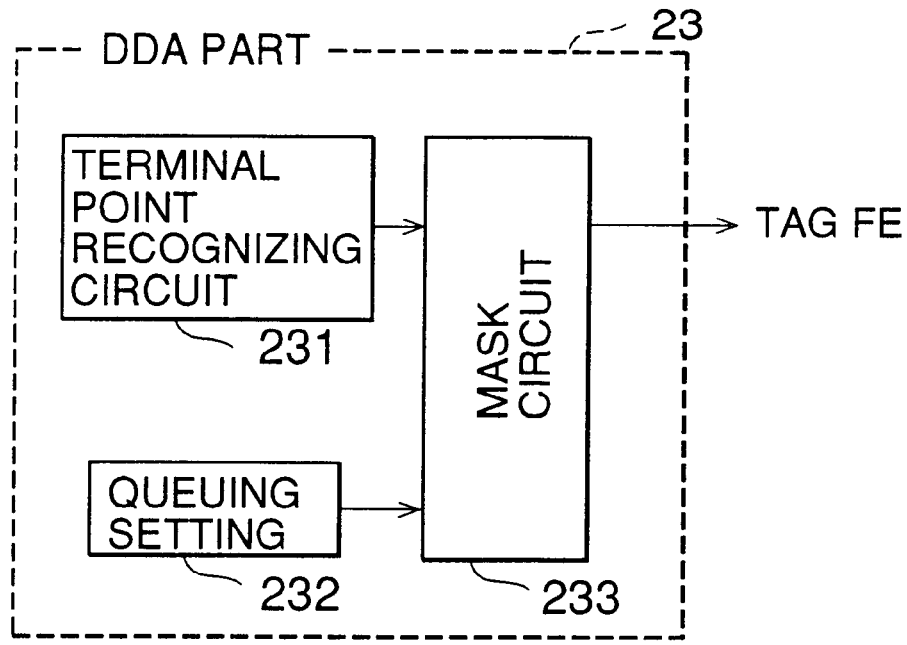
FIGS. 43A and 43B are diagrams which explain an queuing process in the fourth embodiment.

FIG. 43A is a diagram showing a construction wherein the terminal point tag FE is masked in the DDA part 23. Referring to FIG. 43A, a terminal point recognizing circuit 231, a queuing setting circuit 232 and a mask circuit 233 are provided in the DDA part 23. The terminal point recognizing circuit 231 detects a terminal point of a polygon in accordance with whether or not the terminal point tag FE is added to the input information and supplies the terminal point tag FE to the mask circuit 233. The queuing setting circuit 232 supplies a signal indicating whether or not the queuing process is carried out to the mask circuit 233. Thereupon, the mask circuit 233 outputs the terminal point tag FE only when the queuing process is necessary.

Figure 43B:
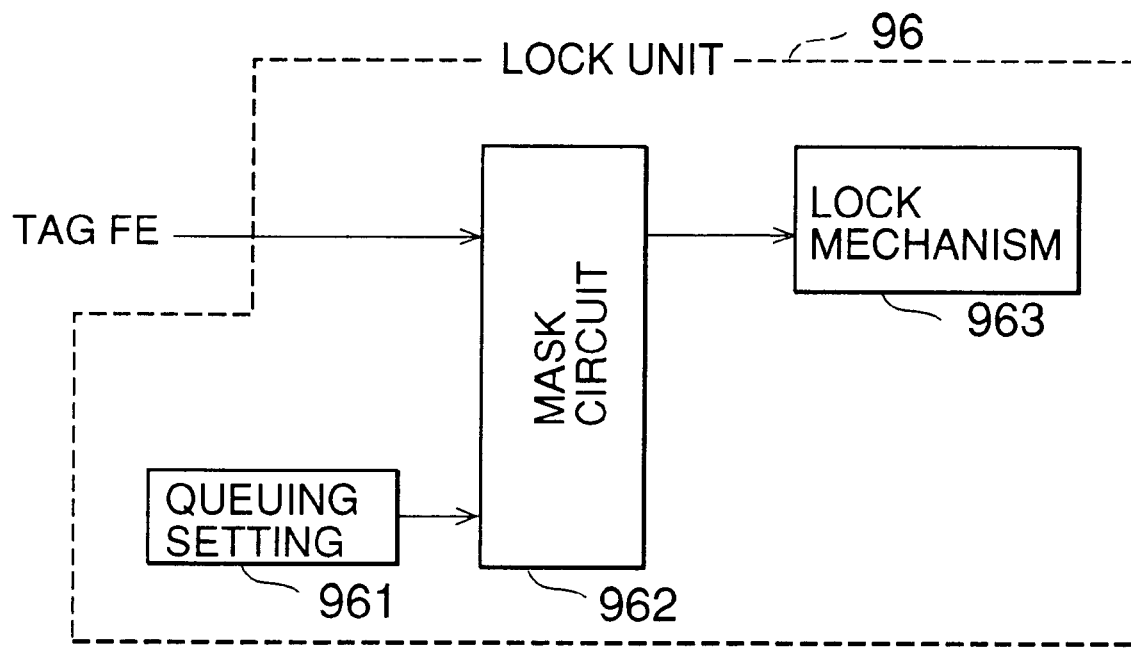

FIG. 43B is a diagram showing a construction wherein the terminal point FE is masked in the lock unit 96. Referring to FIG. 43B, a queuing setting circuit 961, a mask circuit 962 and a lock mechanism 963 are provided in the lock unit 96. The mask circuit 962 is supplied with the terminal point tag FE and a signal from the queuing setting circuit 961 indicating whether or not the queuing process is carried out. The mask circuit 962 supplies the terminal point tag FE to the lock mechanism 963 only when the queuing process is carried out so as to activate the lock mechanism 963.

Figure 44A:
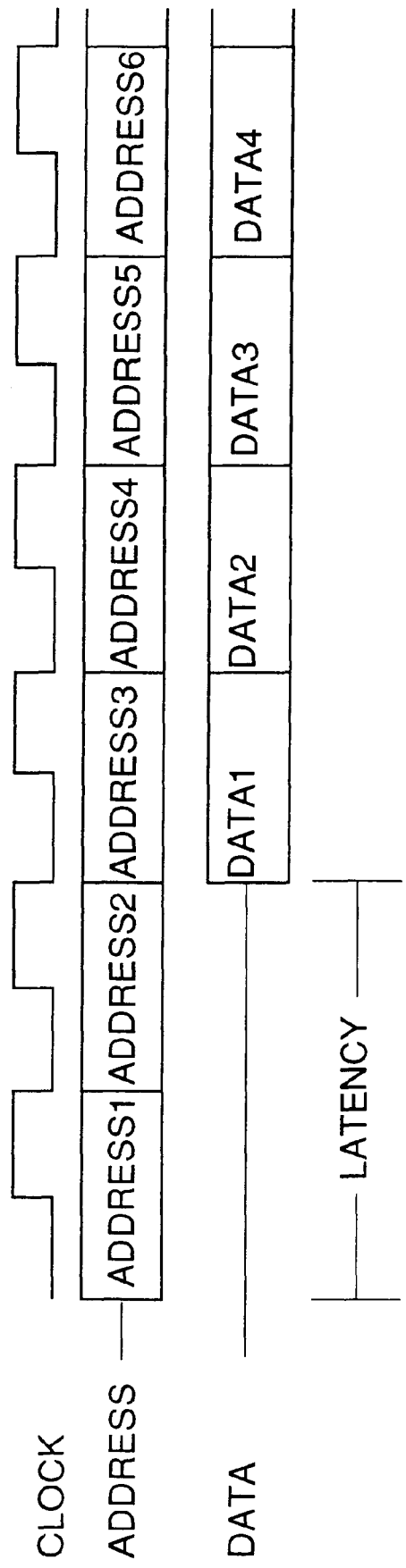
FIGS. 44A and 44B are diagrams which explain a reading operation and a writing operation conducted when a synchronous memory is used to construct the frame memory.
Figure 44B:
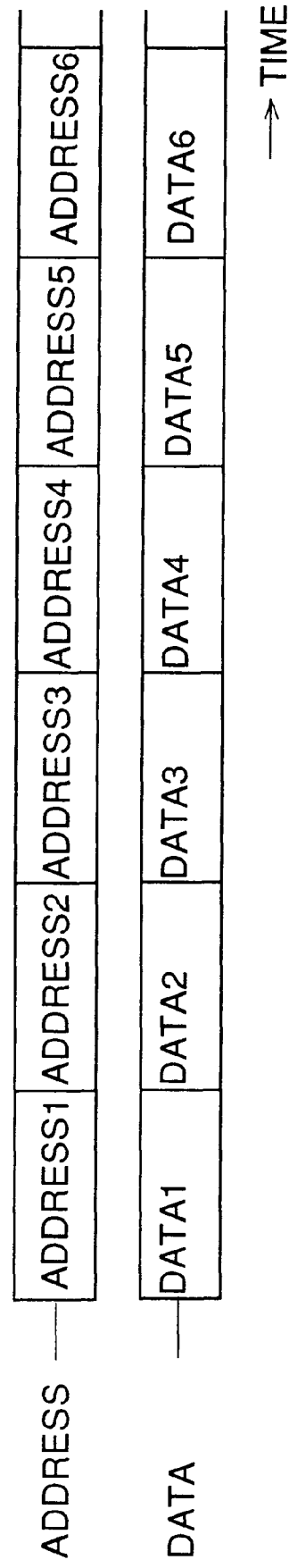

FIGS. 44A and 44B are diagrams which explain a reading operation and a writing operation conducted when a synchronous memory is used to construct the frame memory 14.

Figure 45:
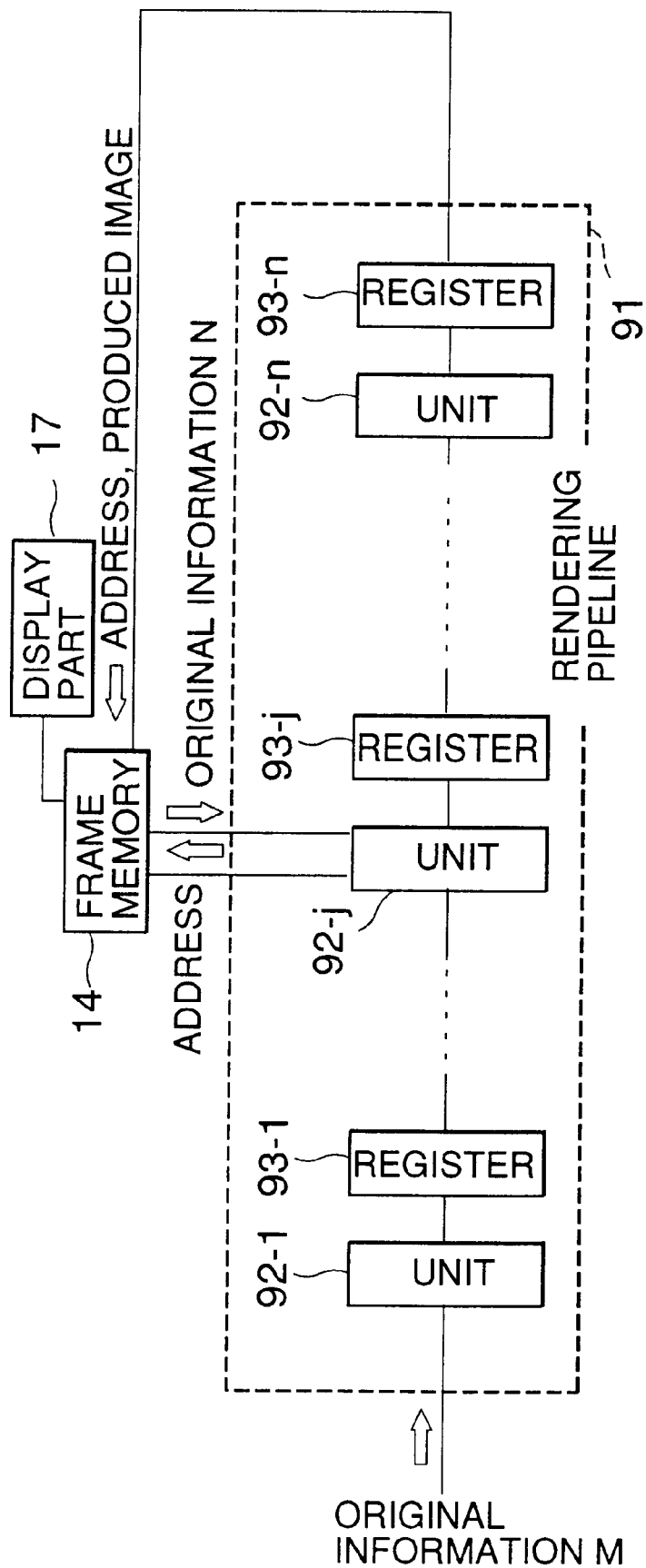
FIG. 45 is a block diagram showing an important part of a conceivable information processing apparatus.

FIG. 45 is a block diagram showing an important part of a conceivable information processing apparatus. In FIG. 45, those parts that are the same as the parts of FIG. 38 are designated by the same reference numerals and the description thereof is omitted.

FIG. 44A is a diagram which explains the reading operation in the frame memory 14. In the reading operation illustrated, the frame memory 14 outputs data to the address supplied by the information processing system after a period of time referred to as a latency which includes a certain number of clocks. The latency corresponds to the cycle time of a normal memory. The time required in the synchronous memory for the data k to be output after the address k is input is hardly different from that of the normal memory. That is, the operating speed of the synchronous memory is hardly different from that of the memory. However, unlike the normal memory, the synchronous memory allows the information processing system to provide the next address k+1 without waiting for the data k to be output. By supplying the address continuously, it is possible to output the data continuously. Therefore, the synchronous memory is capable of operating at a clock speed higher than the speed specified by the cycle time of the normal memory.

FIG. 44B is diagram which explains the writing operation in the frame memory 14 in which the synchronous memory incorporating the synchronization technology is used. In the writing operation, the information process system supplies both the address and the data to the frame memory 14 so as to effect the data writing. It takes a period of time that corresponds to the cycle time before the frame memory 14, that is, the synchronous memory to finish writing the data inside. However, like the case of the reading operation described, the information processing system does not wait for an end of the data writing before proceeding with the writing operation of the next data at the next clock.

Figure 46:
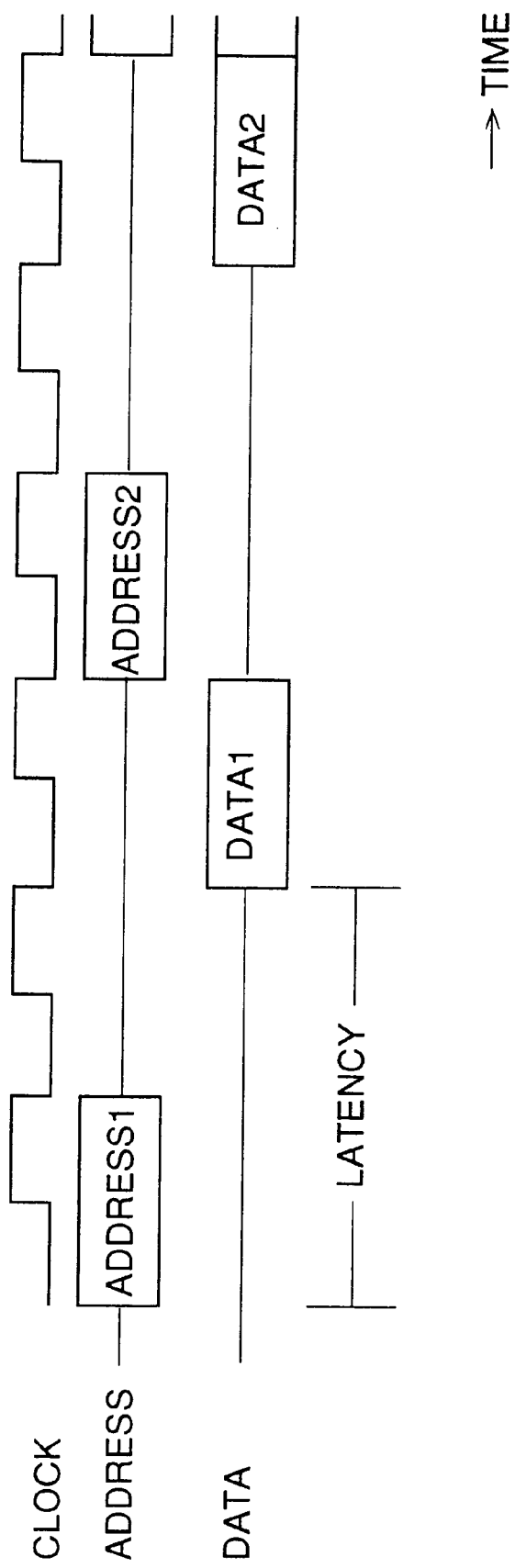
FIG. 46 is a diagram which explains an reading operation of the apparatus shown in FIG. 45.
Figure 47:
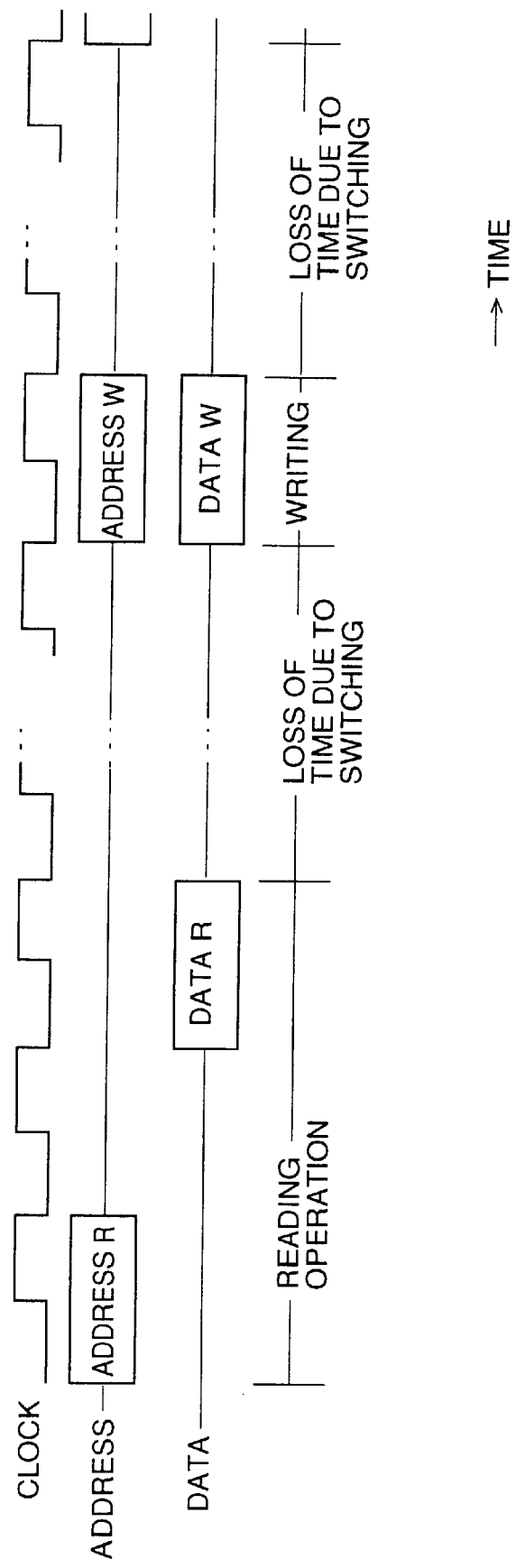
FIG. 47 is a diagram which explains a switching between the reading operation and the writing operation in the apparatus shown in FIG. 45.

By using the synchronous memory to construct the frame memory 14, it is possible to perform the operation at a speed higher than that of the normal memory. However, the mere use of the synchronous memory as the frame memory 14 as described in FIG. 45 and the exchange of information between the rendering pipe line 91 and the frame memory 14 using the process unit 92-j only does not achieve an effective operation. In the case of FIG. 45, it is impossible to proceed with the next operation from a moment that an address is provided to the frame memory 14 until a moment that the frame memory 14 receives data output from the rendering pipeline 91. For this reason, the reading timing of the frame memory 14 is as shown in FIG. 46 despite the fact that the synchronous memory is used to construct the frame memory 14. As for the writing operation in this case, the writing can take place according to the operating clock of the rendering pipeline 91, there being no need to wait for an end of the process by the rendering pipeline 91. However, when the writing operation is switched to the reading operation in the synchronous memory or when the reading operation is switched to the writing operation therein, a certain amount of time is lost. For this reason, it is impossible to take advantage of the high-speed writing operation, as shown in FIG. 47. In FIG. 47, R indicates a reading operation and W indicates a writing operation.

Figure 48:
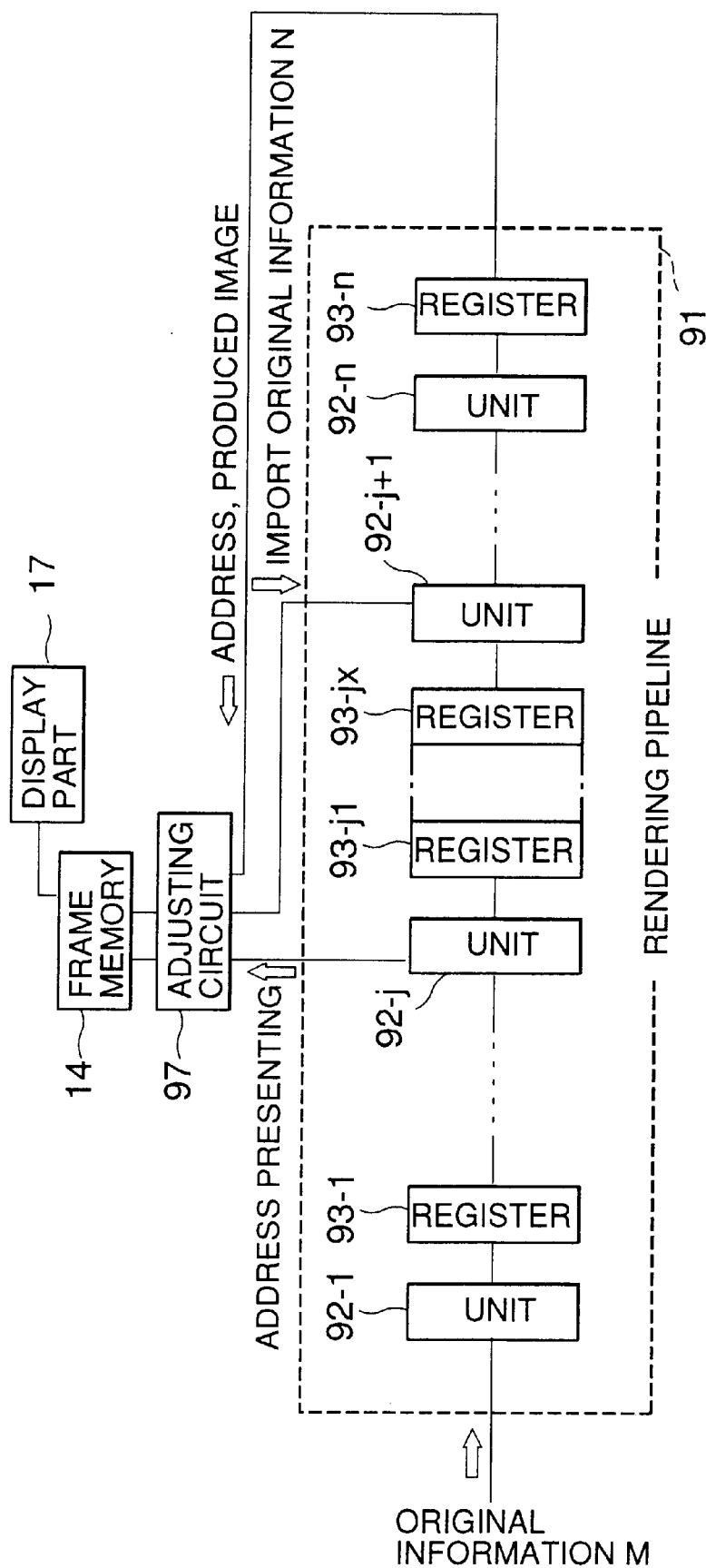
FIG. 48 is a block diagram showing an important part of a fifth embodiment of the information processing apparatus according to the present invention.

FIG. 48 is a block diagram showing an important part of a fifth embodiment of the information processing apparatus according to the present invention. In FIG. 48, those parts that are the same as the parts of FIG. 38 are designated by the same reference numerals and the description thereof is omitted. This embodiment eliminates the aforementioned third disadvantage.

In this embodiment, an arbitration circuit 97 is provided between the frame memory 14 constructed of the synchronous memory and the rendering pipeline 91, as shown in FIG. 48. A description will later be given, with reference to FIG. 48, of the construction of the arbitration circuit 97.

Improvement in the efficiency of the reading operation is achieved by a range of process units 92-j to 92-j+1 in the rendering pipeline 91 shown in FIG. 48. While the process unit 92-j shown in FIG. 45 reads from the frame memory 14, the process unit 92-j of this embodiment is used as an address presenting unit for supplying the address to the frame memory 14. It is the process unit 92-j+1 used as a data import unit that imports data output by the frame memory 14. In order to cancel a delay occurring between the process unit 92-j and the process unit 92-j+1 that corresponds to the latency, pipeline registers 93-j1–93-jx are provided. With this construction, the reading operation is fragmentized. As a result, it is possible to assume that the reading operation is substantially built into the rendering pipeline 91.

Figure 49:
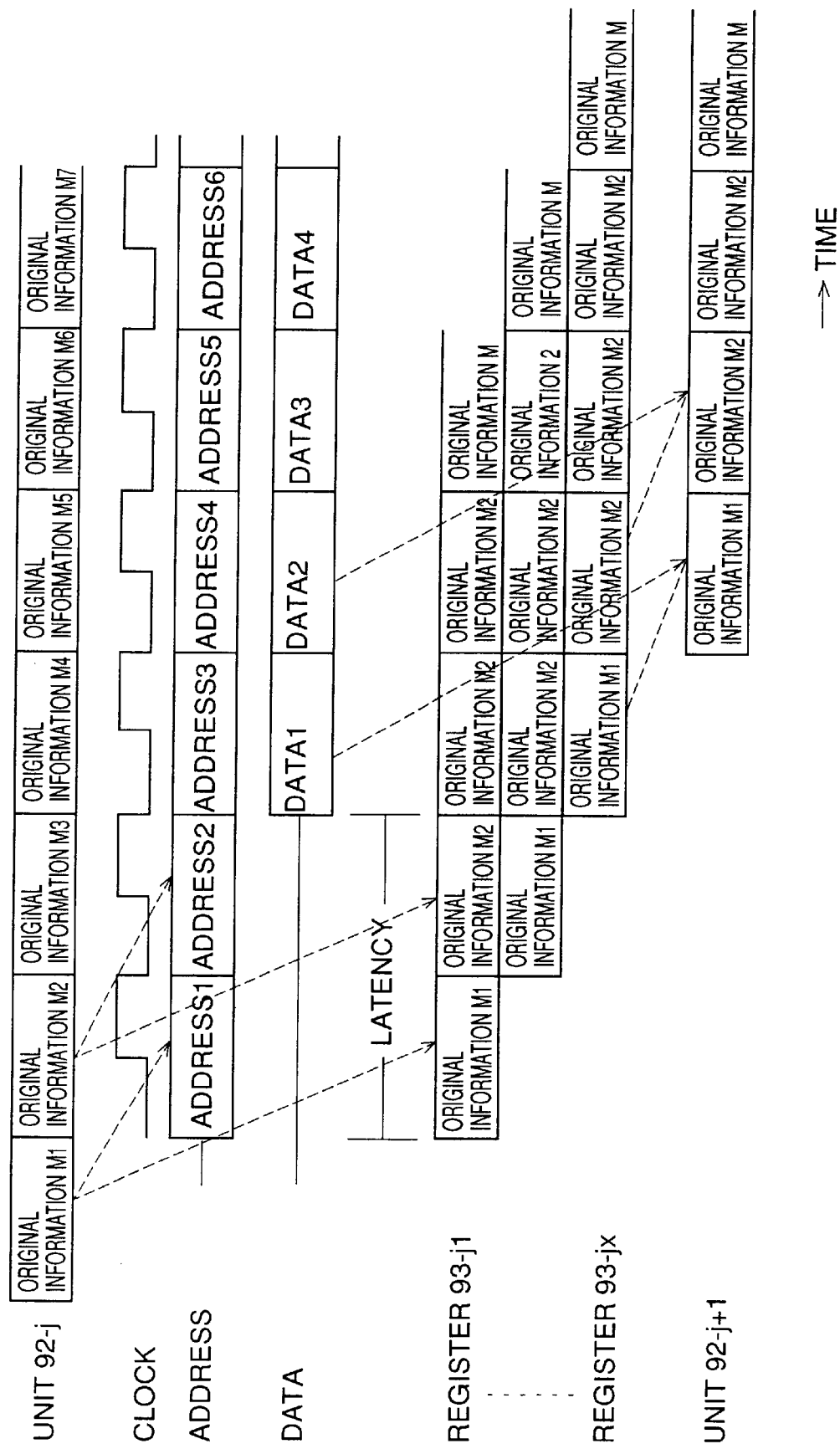
FIG. 49 is a diagram which explains the reading operation of the fifth embodiment.

FIG. 49 is a diagram which explains the reading operation of the fifth embodiment. The process unit 92-j receives original information Mi supplied from the DDA part 23 (not shown), supplies the address to the frame memory 14 and outputs the original information Mi to the pipeline register 93-j1. Thus, the process unit 92-j can process original information Mi+1 when the next clock arrives. The number of pipeline registers 93-j1–93-jx corresponds to the delay specified by the latency of the frame memory 14. Therefore, the original information Mi that has passed through the pipeline registers 93-j1–93-jx and the data j read from the frame memory 14 are delivered to the process unit 92-j+1 at the same time. In this way, the operating speed of the frame memory 14 and the rendering pipeline 91 can be improved.

In order to make the writing operation more efficient, it is necessary to join the writing operations as continuously as possible and to make sure that the loss of time is not created due to the switching to the reading operation. This can be achieved by the operation of the arbitration circuit 9)7 described below.

Figure 50:
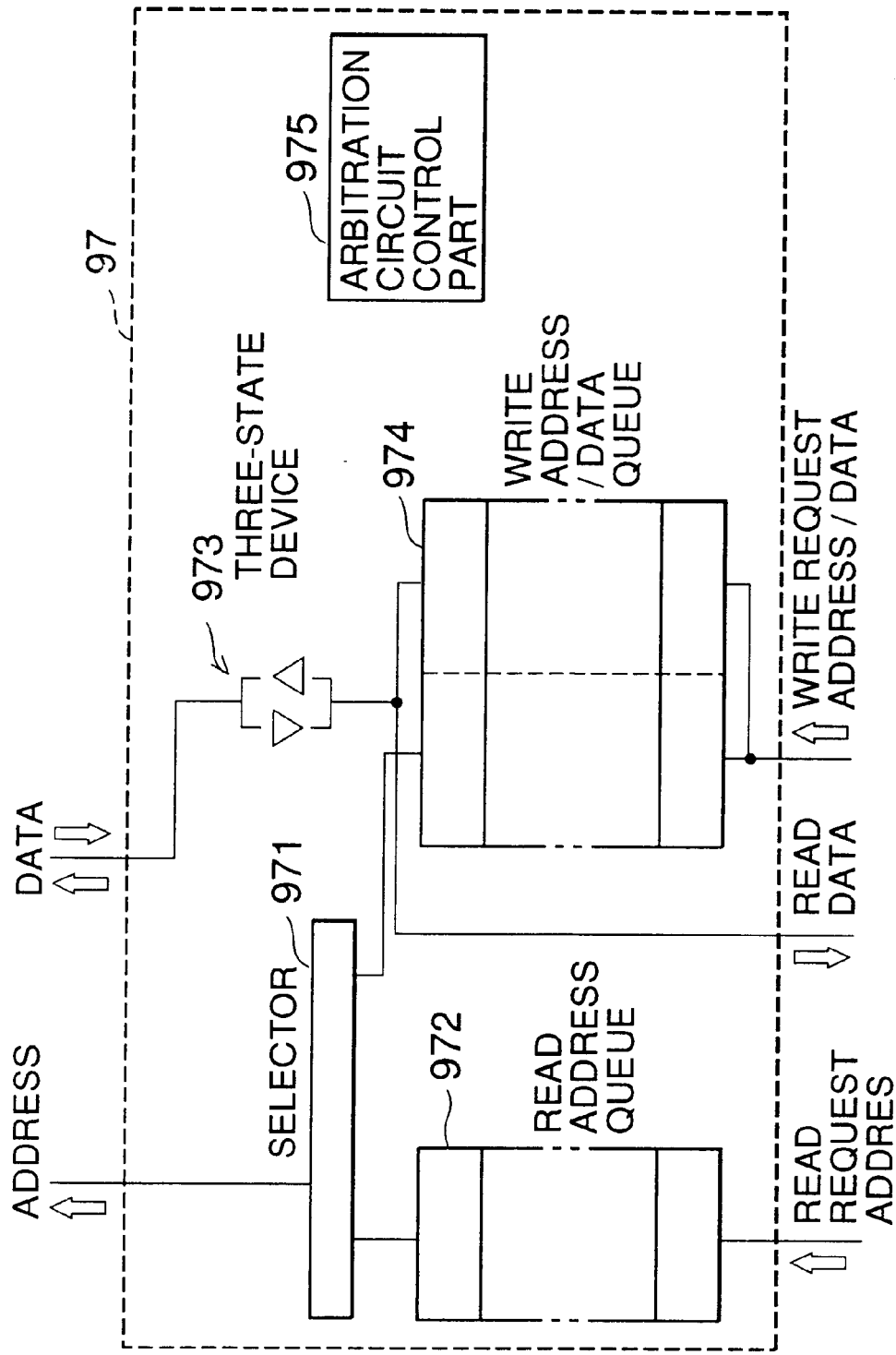
FIG. 50 is a block diagram showing a schematic construction of the arbitration circuit of the fifth embodiment.

FIG. 50 is a block diagram showing a schematic construction of the arbitration circuit 97. Referring to FIG. 50, the arbitration circuit 97 generally comprises a selector 971, a buffer 972 for storing a read address queue, a three-state device 973, a buffer 974 for storing a write address/data queue, and an arbitration circuit control part 975 for controlling the parts of the arbitration circuit 97.

The selector 971 selects, under the control of the arbitration circuit control part 975, one of two queues and issues the selected address to the frame memory 14. When the reading is requested, the three-state device 973 transmits, under the control of the arbitration circuit control part 975, the data output by the frame memory 14 to the rendering pipeline 91, which is a source of a read quest. When the writing is requested, the three-state device 973 selects, under the control of the arbitration circuit control part 975, the direction in which the data in the write data queue is written to the frame memory 14.

Figure 51:
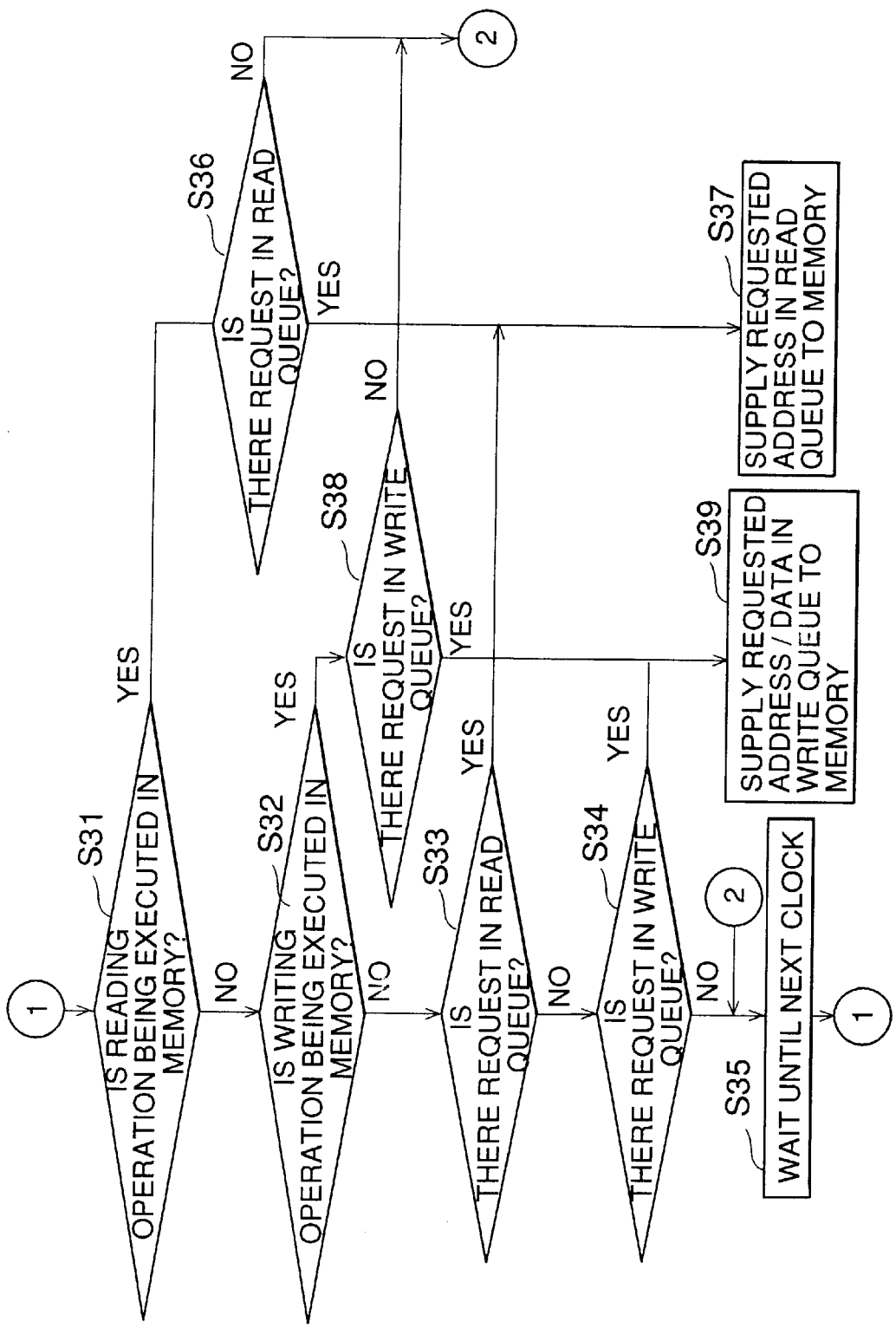
FIG. 51 is a flowchart which explains the operation of the arbitration circuit control part.

FIG. 51 is a flowchart which explains the operation of the arbitration circuit control part: 975. Referring to FIG. 51, a determination is made in step S31 as to whether or not a reading operation is being executed in the frame memory 14. If a NO answer is yielded, the control is passed to step S32, where a determination is made as to whether or not a writing operation is being executed in the frame memory 14. If a NO answer is yielded in step S32, the control is passed to step S33, where a determination is made as to whether there is a request in a read queue. If a NO answer is yielded, the control is passed to step S34, where a determination is made as to whether there is a request in a write queue. If a NO answer is yielded in step S34, the control is passed to step S35, where the operation waits for the next clock. Subsequently, the control is returned to step S31.

If a YES answer is yielded in step S31, the control is passed to step S36, where a determination is made as to whether or not there is a request in the read queue. If a YES answer is yielded, the control is passed to step S37, where a requested address in the read queue is supplied to the frame memory 14. If a NO answer is yielded in step S36, the control is passed to step S35. If a YES answer is yielded in step S32, the control is passed to step S383, where a determination is made as to whether or not there is a request in the write queue. If a YES answer is yielded, the control is passed to step S39, where requested address/data in the write queue is supplied to the frame memory 14. If a NO answer is yielded in step S38, the control is returned to step S35.

Thus, while the reading operation is being executed in the frame memory 14, processing of the request in the read queue is given a preference. Therefore, the reading operation can be performed continuously. While the writing operation is being executed in the frame memory 14, processing of the request in the write queue is given a preference. Therefore, the writing operation can be performed continuously. In this way, loss of time due to switching from the writing operation to the reading operation and vice versa can be minimized. Accordingly, the frame memory 14 constructed of the synchronous memory can be operated efficiently.

Figure 52:
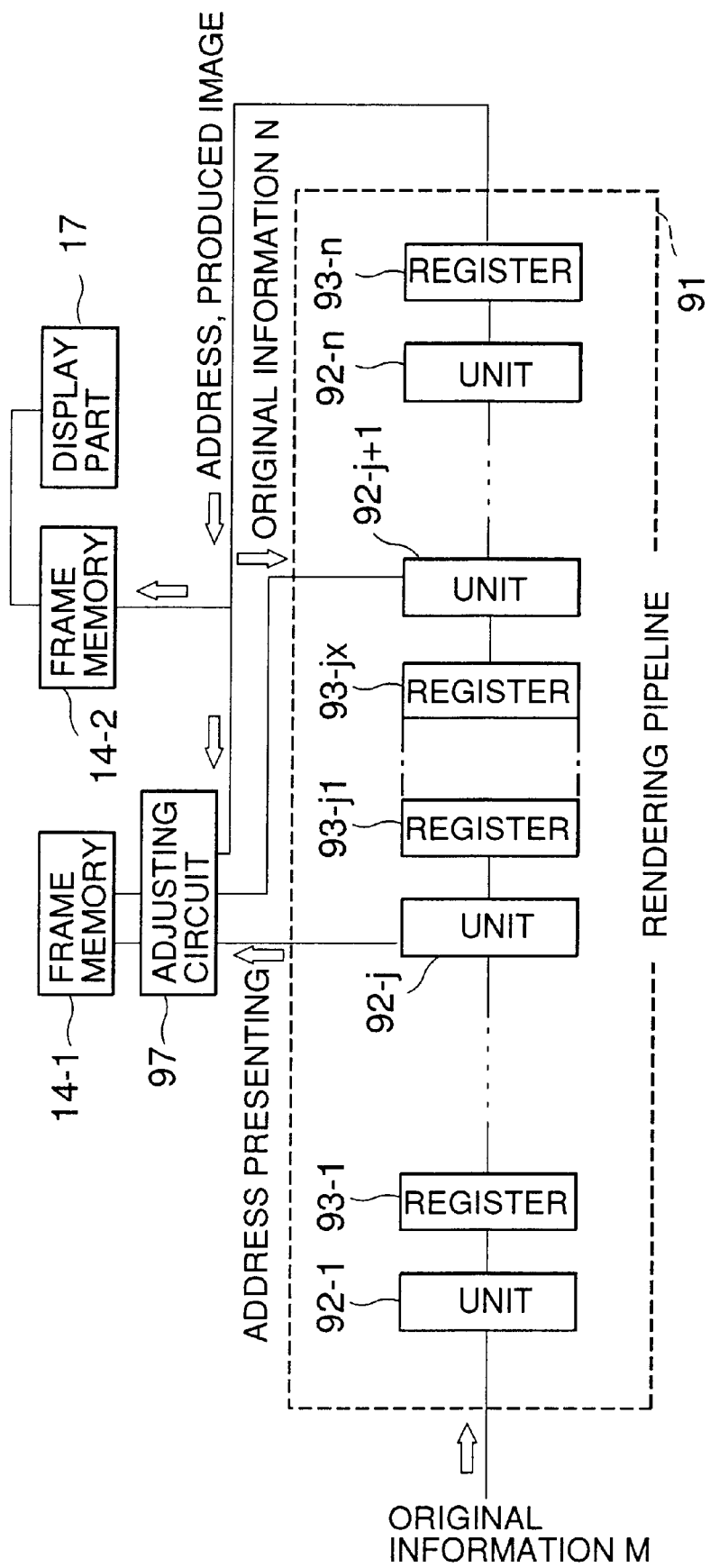
FIG. 52 is a block diagram showing an important part of a sixth embodiment of the information processing apparatus according to the present invention.

FIG. 52 is a block diagram showing an important part of a sixth embodiment of the information processing apparatus according to the present invention. In FIG. 52, those parts that are the same as the parts of FIG. 48 are designated by the same reference numerals and the description thereof is omitted.

In this embodiment, a frame memory 14-1 constructed of the synchronous memory is connected to the arbitration circuit 97, as shown in FIG. 52. A frame memory 14-2 constructed of the VRAM is connected to the display part 17. The rendering pipeline 91 performs both the reading operation and the writing operation in the frame memory 14-1. In the frame memory 14-2, the write operation by the rendering pipeline 91 and the access request process by the display part 17 (display control part) are executed. With this construction, the frame memory 14-1 is capable of operating independent of the display control part and can be assumed to be identical to the local memory 15. Accesses from the display part 17 are made to the frame memory 14-2, which is the VRAM. The frame memory 14-1, which is the synchronous memory, has only to deal with the process executed by the rendering pipeline 91. The frame memory 14-2 is provided for connection with the display control part. If the frame memory 14-1 includes the VRAM function, it is of course possible to construct the frame memory of a single memory.

However, while the synchronous memory used to construct the frame memory 14-1 has some of the functions, such as a global screen clearance, that the VRAM has, the synchronous memory does not include all the functions of the VRAM. Therefore, it is difficult to substitute the VRAM for the synchronous memory. Further, designing and production of the synchronous memory dedicated to the storing of image information causes the cost of the information processing apparatus to rise as compared to the use of a general-purpose synchronous memory. A description will now be given of a seventh embodiment of the information processing apparatus according to the present invention, in which a high-speed screen clearance function equivalent to the same function of the dedicated synchronous memory is realized even if a synchronous memory having no special function such as a global clearance is used.

Figure 53A:
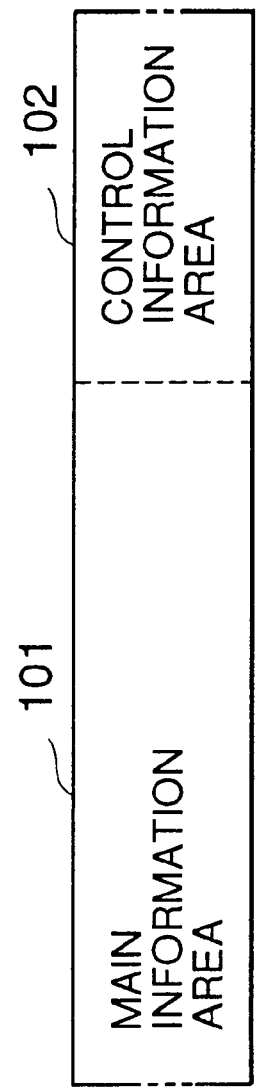
FIGS. 53A and 53B are diagrams which explain the construction of the frame memory according to a seventh embodiment of the information processing apparatus according to the present invention.
Figure 53B:
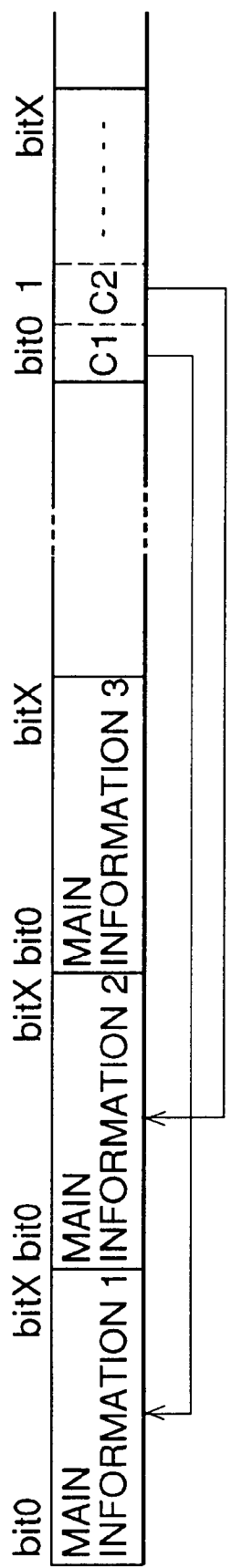

The construction of the seventh embodiment is equal to the construction of the sixth embodiment shown in FIG. 52. Therefore, illustration and description of the seventh embodiment is omitted. In this embodiment, as shown in FIG. 53A, in addition to an area 101 in which the main information for which the frame memory is intended is stored, a control information area 102 in which control information is stored is provided in the frame memory 14-1 constructed of the synchronous memory. FIG. 53B is diagram showing the relationship between the main information for which the frame memory is intended and the control information.

As shown in FIG. 53B, the main information has a length of X+1 bits (bit 0–bit X) and is stored in the frame memory 14-1. The control information stored has a length of 1 bit. The control information is stored in one-to-one correspondence to the main information such that a control information bit C1 is stored in correspondence to an main information item 1 and a control information bit C2 is stored in correspondence to an main information item 2. When the main information is read from the frame memory 14-1, the corresponding control information is also read. The process unit in the rendering pipeline 91 checks the control information bit thus read. If the checked control information bit is "1", the main information read is output unchanged to the unit in the next stage. If the checked control information bit is; "0", it is assumed that the information is cleared and a clear value is output to the unit of the next stage.

Since the control information bits C1–CX+1 reside on the same address, it is possible to obtain the control information bits C1–CX+1 by accessing the main information once. Setting the control information bits C1–CX+1 to "0" is equivalent to clearing the corresponding main information items 1–X+1. Therefore, it is possible to complete a clearing process in a period of time reduced by a factor of $1/(X+1)$ as compared to a case where a clearing of the screen is realized by writing a clear value in the main information. In this way, a high-speed clearing process is realized.

While the foregoing description concerns a clearing of the screen, it will be appreciated that this embodiment makes it possible to cause the main information to have other meanings using attached information. The control information can be used for a purpose other than the clearing by causing the process unit in the rendering pipeline 91 to interpret the information in different ways when reading from the frame memory 14-1. For example, the main information value may be doubled so that a portion of the screen becomes brighter than the other portions, or the main information value may be reduced to ½ so that a portion of the screen becomes darker than the other portions.

Since the total number of control information bits is X+1 so that each of the bit corresponds to the main information item, it is not necessary to read the control information every time the main information is accessed. The control information need only be read once and latched. Hence, it is convenient to build a cache function for caching the control information in the rendering pipeline 91.

Figure 54B:
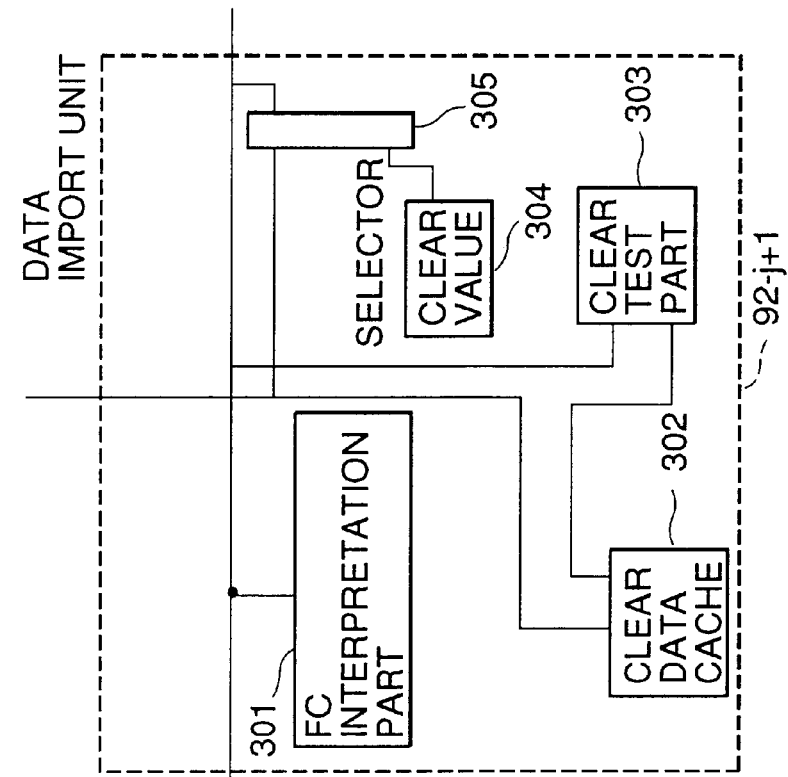
FIGS. 54A and 54B are block diagrams showing an important part of an eighth embodiment of the information processing apparatus according to the present invention.
Figure 54A:
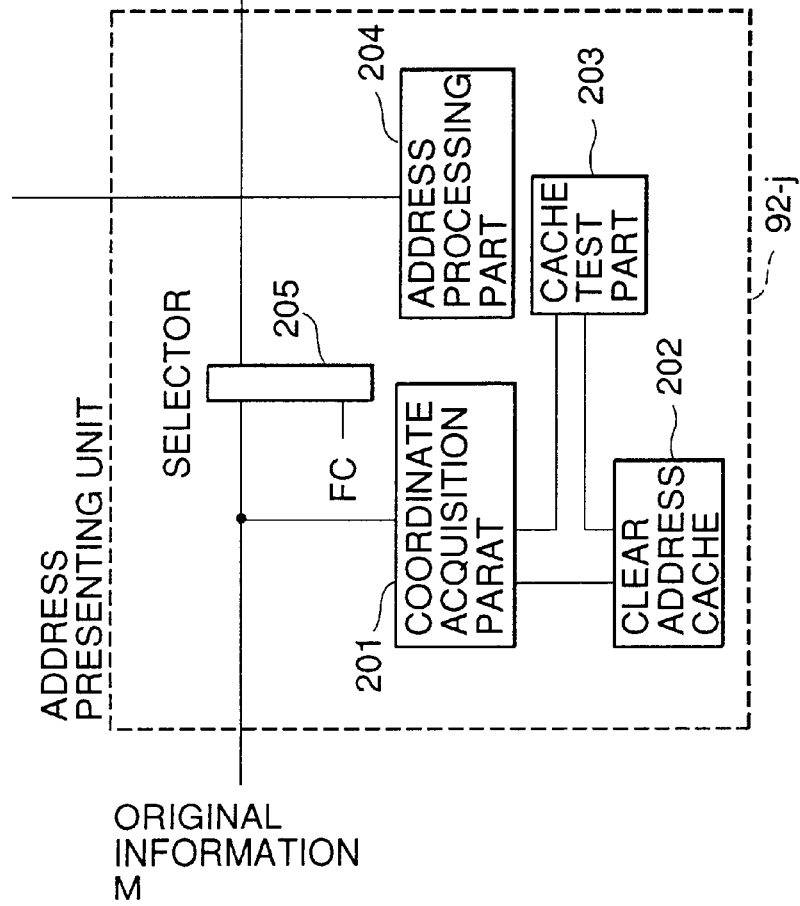

FIGS. 54A and 54B are block diagrams showing an important part of an eighth embodiment of the information processing apparatus according to the present invention. Since the schematic construction of the eighth embodiment is the same as the construction of the sixth embodiment shown in FIG. 52, illustration and description of the construction of the eighth embodiment is omitted. FIG. 54A shows an address presenting unit 92-j built into the rendering pipeline 91 shown in FIG. 52. FIG. 54B shows a data import unit 92-j+1 built into the rendering pipeline 91.

The address presenting unit shown in FIG. 54A comprises a coordinate acquisition part 201, a clear address cache (memory) 202, a cache test part 203, an address processing part 204 and a selector 2051. The coordinate acquisition part 201 acquires coordinate information from the original information M imported from the previous stage in the rendering pipeline 91 and builds an requested address from the read information. The requested address is issued to the frame memory 14-1. The clear address cache 202 latches information indicating the address in the control information area 102 shown in FIG. 53 in which the caching is effective. The address processing part 204 processes the address acquired by the coordinate acquisition part 201 so as to generate an address in which the main information is stored or an address in which the control information is stored. The cache test 203 compares the address acquired by the coordinate acquisition part 201 and the address where caching is effective. If the control information is already cached, the address which contains the main information and is generated by the address processing unit 204 is presented to the frame memory 14-1. If the control information is not cached, or if the control information in an address different from the address of the control information that is being cached is necessary, the address in which the control information is stored is presented to the frame memory 14-1. Further, in order for the data import unit 92-j+1 to be able to recognize that not the main information but the control information is accessed, the selector 205 attaches a tag FC to the original information M before transmitting it to the unit in the next stage.

The data import unit 92-j+1 shown in FIG. 54b comprises an FC interpretation part 301, a clear data cache (memory) 302, a clear test part 303, a register 304 for outputting a clear value, and a selector 305. The FC interpretation part 301 interprets, in other words, recognizes, whether or not the information read from the frame memory 14-1 is the main information or the control information, on the basis of the tag FC. The clear data cache 302 latches; the control information. When the FC interpretation part 301 recognizes that the control information is read, the data imported from the frame memory 14-1 is written in the clear data cache 302. The clear test part 303 acquires the coordinates from the original information M and retrieves the corresponding bits in the clear data cache 302 so as to determine whether the control information is set to "0" or "1". If the control information is set to "1", it is assumed that the main information is not in a clear state. The selector 305 then transmits the data imported from the frame memory 14-1 to the unit in the next stage in the rendering pipeline 91. If the control information set to "0", it is assumed that the main information is in a clear state. In this case, the clear value stored in the register 304 is transmitted to the unit in the next stage in the rendering pipeline 91.

According to this embodiment, by using the address presenting unit 92-j and the data import unit 92-j+1 having the above-described construction, any loss that accompanies the access to the control information is minimized.

The image information generated by the rendering pipeline 91 shown in FIG. 52 is finally written to the frame memories 14-1 and 14-2. It is to be noted that the control information should also be written at the same time. Since the number of control information bits is required to be the same as the number of main information items (X+1), it is possible to reduce the number of requests for writing the control information by latching the communicating state relating to the control information and writing the control information at the last stage. A description will now be given of a ninth embodiment of the information processing unit which realizes this.

Figure 55:
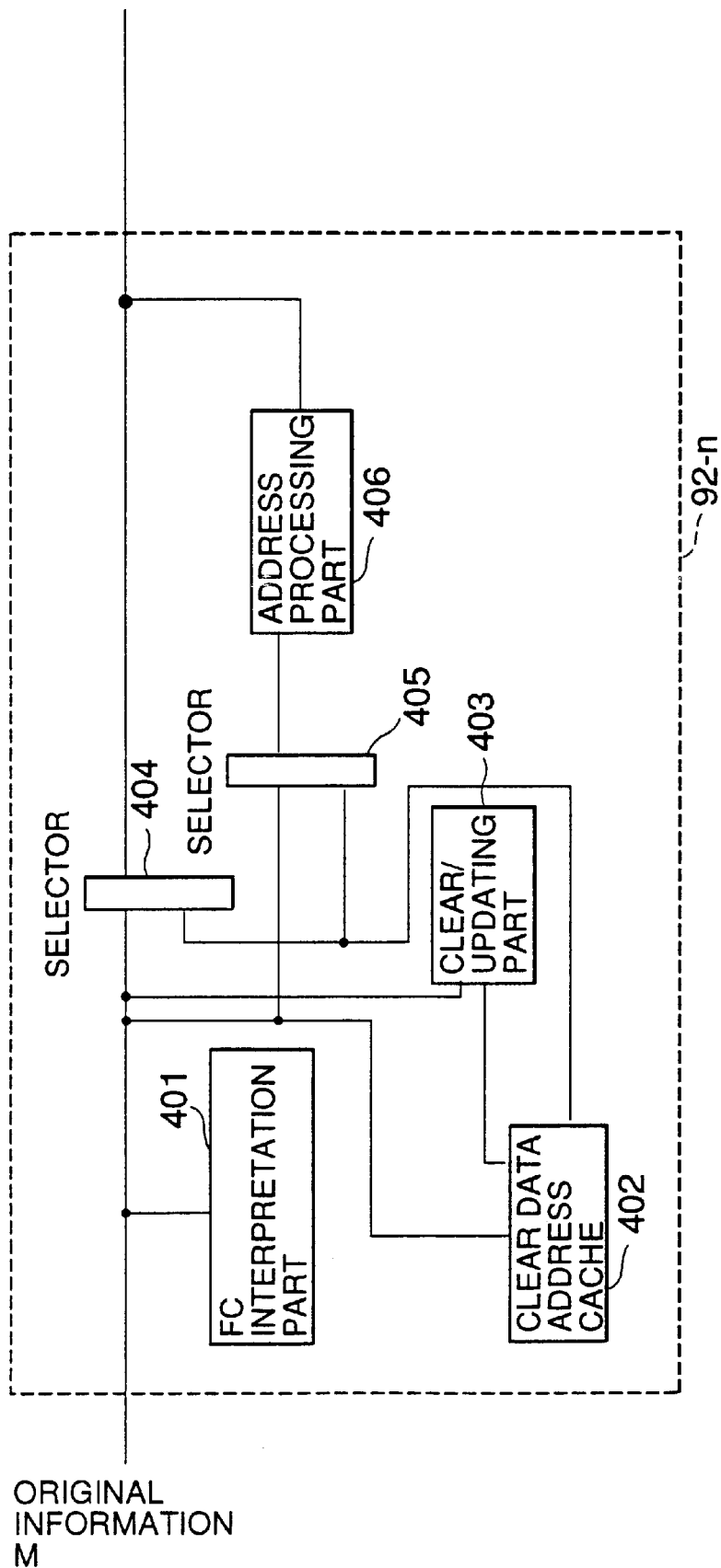
FIG. 55 is a block diagram showing an important part of a ninth embodiment of the information processing apparatus according to the present invention.

FIG. 55 is a block diagram showing an important part of the ninth embodiment. The schematic construction of the ninth embodiment is the same as the construction of the sixth embodiment shown in FIG. 52. Therefore, illustration and description of the construction of the sixth embodiment is omitted. FIG. 55 shows the construction of the process unit 92-n built in the rendering pipeline 91 shown in FIG. 52 in a final stage thereof and equipped with a caching function for caching the control information.

Referring to FIG. 55, the process unit 92-n comprises an FC interpretation part 401, a clear address cache (memory) 402, a clear/updating part 403, selectors 404 and 405, and an address processing part 406. The FC interpretation part 401 interprets, in other words, recognizes whether or not the information read from the frame memory 14-1 is the main information or the control information, on the basis of the tag FC. The clear data address cache 402 latches the control information. When the FC interpretation part 401 recognizes that the control information is read, the updated control information, if latched in the clear data address cache 402, should be written to the frame memory 14-1. For this purpose, the selectors 404 and 405 are supplied with the original information M, and the writing to the frame memory 14-1 is carried out in, accordance with the address and data latched in the clear data address cache 402. After the writing to the frame memory 14-1 is carried out, new control information is written to the clear data address cache 402. The clear/updating part 403 updates the control information relating to the clearing. That is, when the original information M is the main information and if the main information is written to the frame memory 14-1, the clear updating part 403 sets the a corresponding control information bit to "1". The address processing part 406 processes the address acquired via the selector 405 so as to generate the address in which the main information is stored and the address in which the control information address is stored.

According to this embodiment, it is possible to minimize the loss that accompanies the access to the control information, by using the process unit 92-n having the above-described construction.

It is of course possible to employ any combinations of the above-described embodiments. For example, the third through ninth embodiments are applicable to the second embodiment. If the sixth embodiment shown in FIG. 52 is applied to the second embodiment, the frame memory 14-1 of FIG. 52 is used as the local memory 15 of FIG. 22, and the frame memory 14-2 of FIG. 52 is used as the frame memory 14 of FIG. 22.

The present invention is not limited to the above-described embodiments, and variations and modifications may be made without departing from the scope of the present invention.

What is claimed is:

1. An information processing apparatus which executes a process according to input information, said information processing apparatus comprising:

a dedicated hardware part executing, by hardware, a first process on the input information, said first process being set exclusively with respect to said dedicated hardware part; and a program executing part executing, by software, a second process which is in accordance with process-related information on the input information, said second process being executed by said program executing part in parallel with the first process executed by said dedicated hardware part.

2. The information processing apparatus as claimed in claim 1, wherein said program executing part comprises process-related information storing means for storing the process-related information.

3. The information processing apparatus as claimed in claim 1, wherein said program executing part comprises communicating means for communicating with a host system.

4. The information processing apparatus as claimed in claim 1, wherein said second information processor comprises:
  a first operation part processing the input information in accordance with the process-related information; and
  a second operation part which processes the input information in accordance with the process-related information in parallel with said first operation part.

5. The information processing apparatus as claimed in claim 4, wherein said second information processor has shared storing means accessible by said first operation part and said second operation part.

6. The information processing apparatus as claimed in claim 4, wherein said second information processor has execution control means for controlling, on the basis of the process-related information, said first operation part, said second operation part and said first information processor to execute respective processes in a synchronous manner.

7. The information processing apparatus as claimed in claim 1, wherein said first information processor further comprises a three-dimensional image information processing part dedicated to processing three-dimensional image information.

8. The information processing apparatus as claimed in claim 7, wherein said three-dimensional image information processing part comprises:
  an interpolation calculation part executing interpolation calculations;
  a texture calculation part processing interpolated information, generated by said interpolation calculation part, in accordance with externally supplied texture information;
  a rendering condition determination part determining whether the interpolated information processed by said texture calculation part meets a predetermined rendering condition;
  a transparency calculation part setting a predetermined coefficient for the information determined., by said rendering condition determination part, to meet the predetermined rendering condition, so as to calculate a transparency; and
  an output part for outputting information obtained by calculation of said transparency calculation part.

9. The information processing apparatus as claimed in claim 1, further comprising information storing means accessible from said dedicated hardware part and said program executing part, said information storing means storing information necessary for executing processes in said dedicated hardware part and said program executing part.

10. The information processing apparatus as claimed in claim 9, wherein said information storing means comprises:
  first information storing means for storing control information, which controls processes in said first information processor and said second information processor, and for storing the process-related information;
  second information storing means for storing predetermined information used during the execution of processes in the first information processor and said second processor; and
  third information storing means for storing information relating to a result of the processes in said first information processor and said second information processor.

11. The information processing apparatus as claimed in claim 10, wherein said first information storing means stores all results of three-dimensional image processes executed by said first information processor and said second information processor, and wherein said third information storing means stores only color information and transparency information of the results of three-dimensional image processes executed by said first information processor and said second information processor.

12. An information processing apparatus, comprising:
first information processing means for executing a process on the input information;
  second information processing means for executing processes, in parallel with said first information processing means, according to process-related information related to the input information, said second information processing means setting a count equal to the number of times that said first information processing means needs to execute a process in accordance with the process-related information; and
  said first information processing means comprises:
    counting means for subtracting, from the counts each time a process is executed by said first information processing means; and
    end of process information generating means for ending the process of said first information processing means, when the count reaches zero, and supplying end-of-process information to said second information processing means.

13. An information processing apparatus comprising:
first information processing means for executing a process on the input information; and
second information processing means for executing processes, in parallel with said first information processing means, according to process-related information related to the input information, said second information processing means including:
  a first operation part processing information in accordance with the process-related information;
  a second operation part which processes information in accordance with the process-related information in parallel with said first operation part;
  execution control means for controlling, on the basis of the process-related information, said first operation part, said second operation part and said first information processing means to execute respective processes in a synchronous manner, said execution control means including:
    a first execution control part which controls an operation of said first operation part on the basis of the process-related information and generates control information;
    a second execution control part which controls an operation of said second operation part on the basis of the process-related information and generates control information;

a third execution control part which controls an operation of said first information processing means; and pipeline control means for controlling operations of said first, second and third execution control parts so that a whole operation proceeds as one pipeline operation, on the basis of said control information generated by said first and second execution control parts.

14. The information processing apparatus as claimed in claim 13, wherein:

when said process-related information includes stop information which causes processes to stop, said first execution control part or said second execution control part detects the stop information so as to issue an execution stop request to said pipeline control means; and said pipeline control means controls operations of said first and second operation parts and said first information processing means.

15. A method for processing information which executes a process according to input information, the information processing apparatus comprising a first information processing unit for executing an ALU process set exclusively with respect to the input information and a second information processing unit which is capable of executing product-sum processes, shifting and logical operations in parallel with, and synchronized with, the first information processing unit, for executing a process according to process-related information with respect to the input information, the method comprising the steps of:

generating rendering information, for rendering a three-dimensional image, in accordance with vertex information of a figure constituting a three-dimensional image, obtaining a set of endpoints, interpolated between predetermined vertices, in accordance with the vertex information, using a second information processing unit;

rendering lines interpolated between the set of said endpoints obtained by the second information processing unit and a side of the figure opposite to the set of the endpoints using a first information processing unit operating in parallel and synchronized with the second information processing unit; and obtaining a next set of endpoints, while the first information processing unit is rendering the lines, using the second information processing unit.

16. An information processing apparatus connectable to a texture memory storing texture data, a frame memory storing color data of a three-dimensional image to be displayed, and a local memory storing rendering data, a microprogram and user data, said information processing apparatus comprising:

texture processing means for reading the texture data from the texture memory so as to paste a pattern to associated pixels;

rendering condition determination means for reading rendering data from the local memory and making a determination as to whether the associated pixels should be rendered; and blending means for reading rendering data for pixels that are already rendered from the local memory so as to blend pixels to be rendered thereby obtaining data that should be family written in said frame memory, wherein:

only writing of data is enabled from said blending means to the frame memory, corresponding data is written in said frame memory and the local memory, and said rendering condition determination means makes access to the local memory in parallel with said texture processing means.

17. The information processing apparatus as claimed in claim 16, further comprising linear interpolation calculation means supplied by a host apparatus with data for a starting point of horizontally rendered pixels and with variations from the starting point, said linear interpolation calculation means calculating values for pixels to be rendered, on the basis of information supplied from said host apparatus, and supplying calculated values to said texture processing means and to said rendering condition determination means in a parallel manner.

18. The information processing apparatus as claimed in claim 16, further comprising:

first buffer means for temporarily storing results of a process in said rendering condition determination means; and second buffer means for temporarily storing results of a process in said texture processing means,, said rendering condition determination means and said texture processing means executing respective processes in an asynchronous manner, said determination means and said texture processing means operating asynchronously with respect to each other while maintaining synchronism with said blending means so that data is properly processed in said blending means.

19. The information processing apparatus as claimed in claim 16, wherein an access speed of said local memory is greater than an access speed of said frame memory.

20. The information processing apparatus as claimed in claim 16, wherein said rendering condition determination means, said texture processing means and said blending means constitute a rendering pipeline executing a pipeline process.

21. An information processing apparatus connectable to a memory storing first information indirectly relating to generation of information for an image to be displayed, said information processing apparatus comprising;

a rendering pipeline subjecting the first information and second information, directly relating to generation of information for an image to be displayed, to a pipeline process, and supplying generated image information to the memory; and said rendering pipeline being constructed of a plurality of stages formed by alternately disposed process units and registers, the process unit processing said second information in accordance with said first information as well as interpreting said first information, and the register storing an output of said process unit.

22. The information processing apparatus as claimed in claim 21, further comprising a selector connected to control lines, each control line carrying a process content for each process unit in the plurality of stages, said selector importing said second information from a host apparatus.

23. The information processing apparatus as claimed in claim 21, wherein said memory comprises a synchronous memory.

24. An information processing apparatus connectable to memory means for storing first information indirectly relating to generation of information for an image to be displayed, said information processing apparatus comprising:

a rendering pipeline subjecting the first information and second information, directly relating to generation of information for an image to be displayed, to a pipeline process, and supplying generated image information to the memory means, said rendering pipeline being constructed of a plurality of stages formed by alternately disposed process units and registers, each process unit comprising operating means for processing said second information in accordance with said first information and interpretation means responsible for interpretation of said first information and the register storing an output of said process unit; and means for supplying, to said rendering pipeline, information that includes information that can handle both said first information and said second information and a tag indicating whether said first information or said second information is carried, each process unit in said rendering pipeline detecting said tag so as to determine whether to process supplied information using said operating means or using interpretation means.

25. An information processing apparatus connectable to memory means for storing first information indirectly relating to generation of information for an image to be displayed, said information processing apparatus comprising:

a rendering pipeline subjecting the first information and second information, directly relating to generation of information for an image to be displayed, to a pipeline process, and supplying generated image information to the memory means, said rendering pipeline being constructed of a plurality of stages formed by alternately disposed process units and registers, each process unit comprising operating means for processing said second information in accordance with said first information and interpretation means responsible for interpretation of said first information and the register storing an output of said process unit;

outputting means, provided in a stage preceding said rendering pipeline, for adding a terminal point tag indicating a terminal point to information relating to a terminal point of a polygon while reducing polygon information from a host apparatus into points, and outputting said second information; and a lock unit in said rendering pipelines in a stage thereof preceding a process unit that requires said first information from said memory means, said lock unit assuming said second information to relate to the terminal point of the polygon, in case the terminal point tag added to said second information input is set ON, and halting subsequent input of information until all information that remains in said rendering pipeline, including said second information, has been output from said rendering pipeline.

26. The information processing apparatus as claimed in claim 25, wherein said outputting means comprises means outputting the terminal point tag only when a queuing process is necessary.

27. The information processing apparatus as claimed in claim 25, wherein said lock unit [has] comprises:

a lock mechanism halting input of information until all information that remains in said rendering pipeline has been output from said rendering pipeline; and means for activating said lock mechanism in response to said terminal point tag only when there is queuing process.

28. An information processing apparatus connectable to memory means for storing first information indirectly relating to generation of information for an image to be displayed, said information processing apparatus comprising:

a rendering pipeline subjecting the first information and second information, directly relating to generation of information for an image to be displayed, to a pipeline process, and supplying generated image information to the memory means, said rendering pipeline being constructed of a plurality of stages formed by alternately disposed process units and registers, each process unit comprising operating means for processing said second information in accordance with said first information and interpretation means responsible for interpretation of said first information and the register storing an output of said process unit; and said rendering pipeline comprising a first process unit, used only as an address presenting unit, supplying an address to said memory means, a second process unit, used as a data import unit, importing data from said memory means, and a plurality of pipeline registers canceling a delay corresponding to latency between said first and second process units.

29. The information processing apparatus as claimed in claim 28, further comprising means for reducing loss of time due to switching between a writing operation and a reading operation, by giving a preference to a request in a read queue while said memory means is being used in a reading mode so that the reading operation is executed in a continuous manner, and by giving a preference to a request in a write queue while said memory means is being used in a writing mode so that the writing operation is executed in a continuous manner.

30. An information processing apparatus connectable to memory means for storing first information indirectly relating to generation of information for an image to be displayed, said information processing apparatus comprising:

a rendering pipeline subjecting the first information and second information, directly relating to generation of information for an image to be displayed, to a pipeline process, and supplying generated image information to the memory means, said rendering pipeline being constructed of a plurality of stages formed by alternately disposed process units and registers, each process unit comprising operating means for processing said second information in accordance with said first information and interpretation means responsible for interpretation of said first information and the register storing an output of said process unit; and said memory means comprises a first, synchronous memory connected to an arbitration circuit and a second memory connected to display means, said rendering pipeline being enabled to read from and write to said first memory, said rendering pipeline being enabled to write to said second memory, and an access request from said display means being issued to said second memory.

31. The information processing apparatus as claimed in claim 30, wherein said first memory has a first storage area storing main information and a second storage area storing control information in one-to-one correspondence to said main information.

32. The information processing apparatus as claimed in claim 31, wherein said rendering pipeline comprises a data import unit and an address presenting unit connected to said arbitration circuit, each of said address presenting unit and said data import unit comprises means for caching the control information.

33. The information processing apparatus as claimed in claim 32, wherein:

said address presenting unit includes means for latching information that indicates which address of said second storage area is subject to caching and, if the control information is already cached, an address, in which the main information is stored, is presented to said first memory, if the control information is not cached, or if non-cached control information having a address different from that of the cached control information is necessary, the address, in which the non-cached control information is presented to said first memory, if the control information is not cached, or if non-cached control information having a address different from that of the cached control information is necessary, the address in which the non-cached control information is presented to said first memory, if the control information is set to a first value, said data import unit transmits data imported from said first memory to a unit in a subsequent stage in said rendering pipeline, and if the control information is set to a second value, said data import unit transmits a predetermined value to a unit in a subsequent stage in said rendering pipeline.

34. The information processing unit as claimed in claim 31, wherein said rendering pipeline has a process unit built therein in a final stage and equipped with a caching function for caching the control information.

35. A method of using an information processing apparatus connectable to a texture memory storing texture data, a frame memory storing color data for a three-dimensional image to be displayed, and a local memory storing rendering data, a microprogram and user data, said information processing method comprising the steps of:

a) reading the texture data from said texture memory so as to paste a pattern to associated pixels;

b) reading rendering data from said local memory, in parallel with the reading of the texture data from the texture memory, so as to make a determination as to whether associated pixels should be rendered; and c) reading rendering data for pixels that are already rendered from said local memory so as to blend read data with color data for pixels to be rendered to obtain data that is written in said frame memory, wherein:

writing of data to said frame memory is only enabled in step c), and corresponding data is written both in said frame memory and in said local memory.

36. A method of processing data, including first information indirectly relating to generation of information for an image to be displayed and second information directly relating to generation of information for an image to be displayed , said method comprising:

a) subjecting said first information and said second information to a pipeline process; and b) supplying generated image information to a memory using a rendering pipeline constructed of a plurality of stages formed by alternately disposed process units and registers, each process unit comprising an operating unit responsible for operation of said second information and an interpretation unit responsible for interpretation of said first information, a related register storing an output of a process unit.

37. An information processing apparatus for executing, with respect to input information, a process which is dependent on the input information, said information processing apparatus comprising:

first information processing means for executing, by hardware, a first, exclusively set process with respect to the input information; and second information processing means for executing, by software, a second process which is dependent on process-related information, with respect to the input information, in parallel with the first, exclusively set process executed by said first information processing means.

38. The information processing apparatus as claimed in claim 37, wherein said second information processing means executes a microprogram.

* * * * *

UNITED STATES PATENT AND TRADEMARK OFFICE
CERTIFICATE OF CORRECTION

PATENT NO.    : 6,388,671 B1
DATED         : May 14, 2002
INVENTOR(S)   : Hideki Yoshizawa et al.

It is certified that error appears in the above-identified patent and that said Letters Patent is hereby corrected as shown below:

<u>Column 43,</u>
Lines 14-21, please replace claim 4 with the following:
    4.    The information processing apparatus as claimed in claim 1, wherein said program executing part comprises:
    a first operation part processing the input information in accordance with the process-related information; and
    a second operation part which processes the input information in accordance with the process-related information in parallel with said first operation part.

Lines 22-25, please replace claim 5 with the following:
    5.    The information processing apparatus as claimed in claim 4, wherein said program executing part has shared storing means accessible by said first operation part and said second operation part.

Lines 33-36, please replace claim 7 with the following:
    7.    The information processing apparatus as claimed in claim 1, wherein said dedicated hardware part further comprises a three-dimensional image information processing part dedicated to processing three-dimensional image information.

<u>Column 43, line 64 to Column 44, line 11</u>
Please replace claim 10 with the following:
    10.    The information processing apparatus as claimed in claim 9, wherein said information storing means comprises:
    first information storing means for storing control information, which controls processes in said dedicated hardware part and said program executing part, and for storing the process-related information;
    second information storing means for storing predetermined information used during the execution of processes in dedicated hardware part and said program executing part; and
    third information storing means for storing information relating to a result of the processes in said dedicated hardware part and said program executing part.

UNITED STATES PATENT AND TRADEMARK OFFICE
CERTIFICATE OF CORRECTION

PATENT NO. : 6,388,671 B1
DATED : May 14, 2002
INVENTOR(S) : Hideki Yoshizawa et al.

It is certified that error appears in the above-identified patent and that said Letters Patent is hereby corrected as shown below:

<u>Column 44,</u>
Lines 12-20, please replace claim 11 with the following:
    11. The information processing apparatus as claimed in claim 10, wherein said first information storing means stores all results of three-dimensional image processes executed by said dedicated hardware part and said program executing part, and wherein said third information storing means stores only color information and transparency information of the results of three-dimensional image processes executed by said dedicated hardware part and said program executing part.

Lines 20-40, please replace claim 12 with the following:
    12. An information processing apparatus, comprising:
    first information processing means for executing a process on the input information;
    second information processing means for executing processes, in parallel with said first information processing means, according to process-related information related to the input information, said second information processing means setting a count equal to the number of times that said first information processing means needs to execute a process in accordance with the process-related information; and
        said first information processing means comprises:
            counting means for subtracting, from the count, each time a process is executed by said first information processing means; and
            end of process information generating means for ending the process of said first information processing means, when the count reaches zero, and supplying end-of-process information to said second information processing means.

UNITED STATES PATENT AND TRADEMARK OFFICE
CERTIFICATE OF CORRECTION

| | | |
|---|---|---|
| PATENT NO. | : 6,388,671 B1 | |
| DATED | : May 14, 2002 | |
| INVENTOR(S) | : Hideki Yoshizawa et al. | |

It is certified that error appears in the above-identified patent and that said Letters Patent is hereby corrected as shown below:

<u>Column 45,</u>
Lines 16-31, please replace claim 18 with the following:
      18.     The information processing apparatus as claimed in claim 16, further comprising:
      first buffer means for temporarily storing results of a process in said rendering condition determination means; and
      second buffer means for temporarily storing results of a process in said texture processing means, said rendering condition determination means and said texture processing means executing respective processes asynchronously, said determination means and said texture processing means operating asynchronously with respect to each other while maintaining synchronism with said blending means so that data is properly processed in said blending means.

Lines 19-47, please replace claim 15 with the following:
      15.     A method for processing information which executes a process according to input information, the information processing apparatus comprising a first information processing unit for executing an ALU process set exclusively with respect to the input information and a second information processing unit which is capable of executing product-sum processes, shifting and logical operations in parallel with, and synchronized with, the first information processing unit, for executing a process according to process-related information with respect to the input information, the method comprising the steps of:
      generating rendering information, for rendering a three-dimensional image, in accordance with vertex information of a figure constituting a three-dimensional image,
      obtaining a set of endpoints, interpolated between predetermined vertices, in accordance with the vertex information, using a second information processing unit;
      rendering lines interpolated between the set of said endpoints obtained by the second information processing unit and a side of the figure opposite to the set of the endpoints using the first information processing unit operating in parallel and synchronized with the second information processing unit; and
      obtaining a next set of endpoints, while the first information processing unit is rendering the lines, using the second information processing unit.

UNITED STATES PATENT AND TRADEMARK OFFICE
CERTIFICATE OF CORRECTION

PATENT NO.    : 6,388,671 B1
DATED         : May 14, 2002
INVENTOR(S)   : Hideki Yoshizawa et al.

It is certified that error appears in the above-identified patent and that said Letters Patent is hereby corrected as shown below:

<u>Column 45, line 48 - Column 46, line 5,</u>
Please replace claim 16 with the following:

16. (AS TWICE AMENDED) An information processing apparatus connectable to a texture memory storing texture data, a frame memory storing color data of a three-dimensional image to be displayed, and a local memory storing rendering data, a microprogram and user data, said information processing apparatus comprising:

texture processing means for reading the texture data from the texture memory so as to paste a pattern to associated pixels;

rendering condition determination means for reading rendering data from the local memory and making a determination as to whether the associated pixels should be rendered; and blending means for reading rendering data for pixels that are already rendered from the local memory so as to blend pixels to be rendered thereby obtaining data that should be finally written in said frame memory, wherein:

only writing of data is enabled from said blending means to the frame memory, corresponding data is written in said frame memory and the local memory, and said rendering condition determination means makes access to the local memory in parallel with said texture processing means.

<u>Column 48,</u>
Line 30, delete in its entirety.

Signed and Sealed this

Twenty-ninth Day of October, 2002

*Attest:*

*Attesting Officer*

JAMES E. ROGAN
*Director of the United States Patent and Trademark Office*